(12) United States Patent
Ueda et al.

(10) Patent No.: US 9,821,209 B2
(45) Date of Patent: Nov. 21, 2017

(54) GOLF SWING ANALYSIS APPARATUS

(71) Applicants: DUNLOP SPORTS CO. LTD., Kobe-shi, Hyogo (JP); SUMITOMO RUBBER INDUSTRIES, LTD., Kobe-shi, Hyogo (JP)

(72) Inventors: Masahiko Ueda, Kobe (JP); Kousuke Okazaki, Kobe (JP); Yuto Nakamura, Kobe (JP)

(73) Assignees: DUNLOP SPORTS CO. LTD., Kobe-shi, Hyogo (JP); SUMITOMO RUBBER INDUSTRIES, LTD, Kobe-shi, Hyogo (JP)

( * ) Notice: Subject to any disclaimer, the term of this patent is extended or adjusted under 35 U.S.C. 154(b) by 220 days.

(21) Appl. No.: 14/976,913

(22) Filed: Dec. 21, 2015

(65) Prior Publication Data

US 2016/0184632 A1    Jun. 30, 2016

(30) Foreign Application Priority Data

Dec. 26, 2014 (JP) .................................. 2014-264371
Sep. 8, 2015 (JP) .................................. 2015-177029
Oct. 19, 2015 (JP) .................................. 2015-205924

(51) Int. Cl.
    *A63F 9/24*     (2006.01)
    *A63B 69/36*     (2006.01)
    (Continued)

(52) U.S. Cl.
CPC .......... *A63B 69/36* (2013.01); *G06K 9/00342* (2013.01); *G06K 9/00536* (2013.01); *G06Q 10/0639* (2013.01); *G09B 19/0038* (2013.01)

(58) Field of Classification Search
None
See application file for complete search history.

(56) References Cited

U.S. PATENT DOCUMENTS 4,991,850 A * 2/1991 Wilhlem ............ A63B 69/3632
    473/233
5,233,544 A * 8/1993 Kobayashi ............. A63B 24/00
    473/223

(Continued)

FOREIGN PATENT DOCUMENTS

JP     2007-167549 A     7/2007
WO     WO 2009/069698 A1     6/2009

*Primary Examiner* — Paul A D'Agostino
(74) *Attorney, Agent, or Firm* — Birch, Stewart, Kolasch & Birch, LLP

(57) ABSTRACT

A golf swing analysis apparatus capable of estimating the strike point of the ball on the face in a simple manner when a golf club is swung is provided. The apparatus is provided with a derivation unit, a calculation unit, and an estimation unit to analyze a swing using a golf club having a grip, a shaft and a head. The derivation unit derives analytical data including at least one of time-series angular velocity data and time-series acceleration data in an analysis time interval near impact, from sensor data output from at least one of an angular velocity sensor and an acceleration sensor attached to at least one of the grip and the shaft. The calculation unit calculates a feature amount of a waveform of the analytical data. The estimation unit estimates an impact position of a ball on a face of the head, according to the feature amount.

23 Claims, 48 Drawing Sheets

(51) Int. Cl.
    *G06Q 10/06*     (2012.01)
    *G06K 9/00*     (2006.01)
    *G09B 19/00*     (2006.01)

(56) References Cited

U.S. PATENT DOCUMENTS

| | | | | |
|---|---|---|---|---|
| 5,779,555 A | * | 7/1998 | Nomura | A63B 69/3632 473/223 |
| 2005/0215340 A1 | * | 9/2005 | Stites | A63B 69/3614 473/233 |
| 2010/0144456 A1 | * | 6/2010 | Ahern | A63B 57/00 473/222 |
| 2010/0261542 A1 | * | 10/2010 | Maglaque | A63B 69/3617 473/300 |
| 2010/0304877 A1 | | 12/2010 | Iwahashi et al. | |
| 2011/0081981 A1 | * | 4/2011 | Okamoto | A63B 69/0002 473/233 |
| 2012/0046119 A1 | * | 2/2012 | Davenport | A63B 24/0006 473/223 |
| 2013/0065711 A1 | * | 3/2013 | Ueda | A61B 5/6895 473/409 |
| 2013/0344973 A1 | * | 12/2013 | Margoles | A63B 69/3623 473/223 |

\* cited by examiner

Fig.17A
Fig.17B
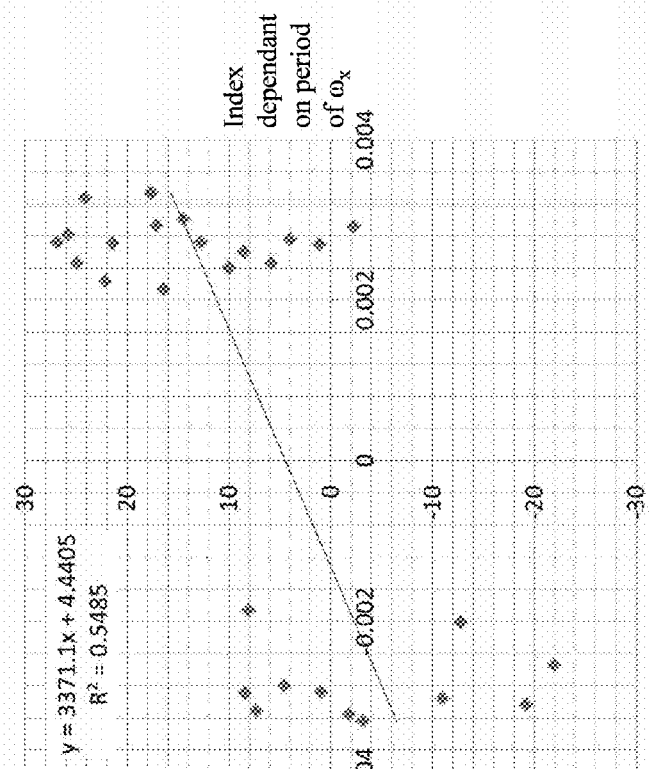
Correlation coefficient R=0.8272
Inside-out path
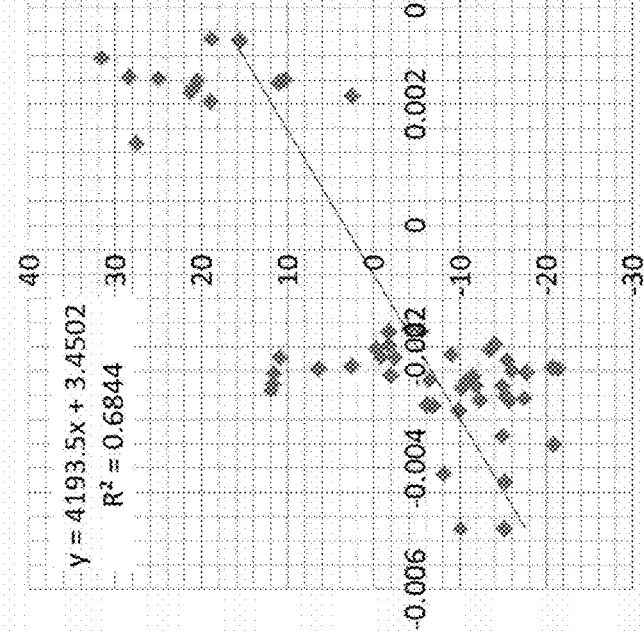
Correlation coefficient R=0.7406
Outside-in path

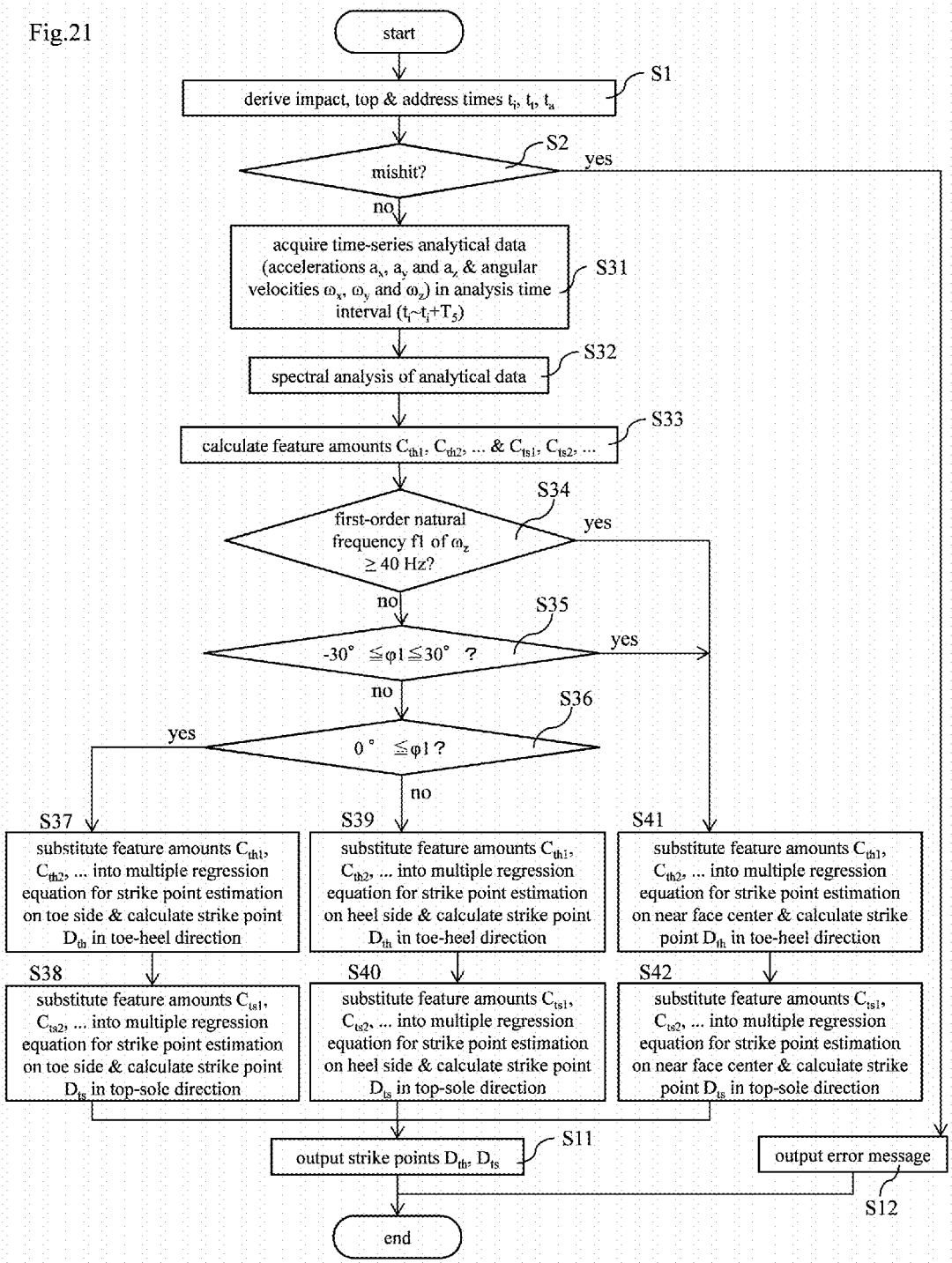

Fig.27
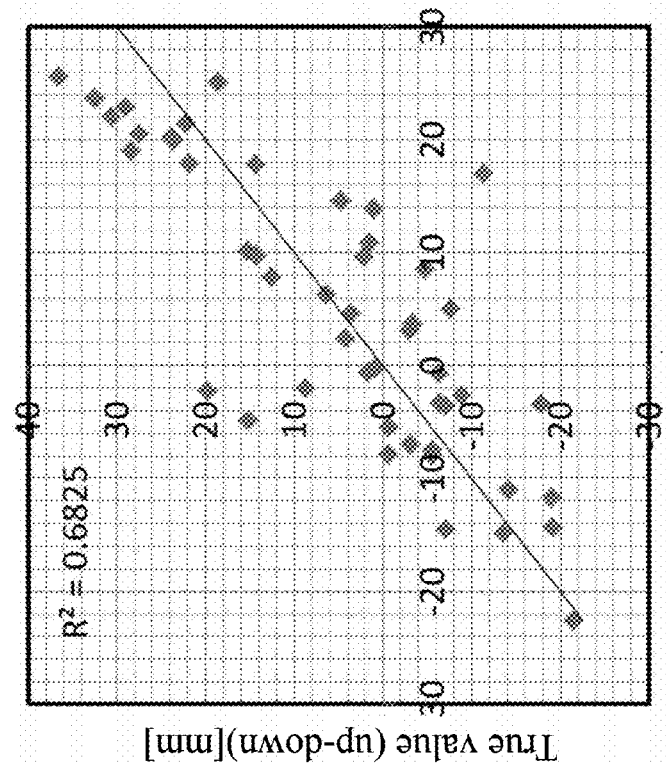
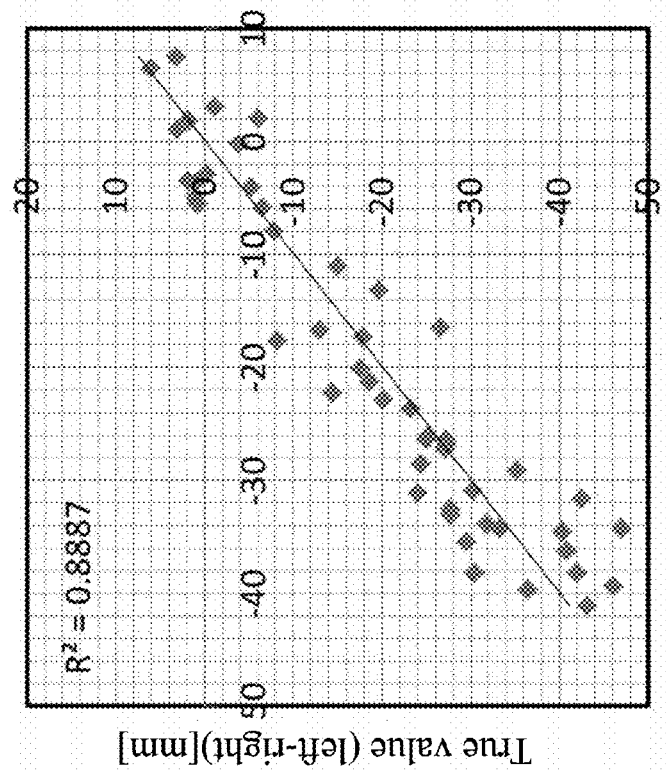

Fig.28
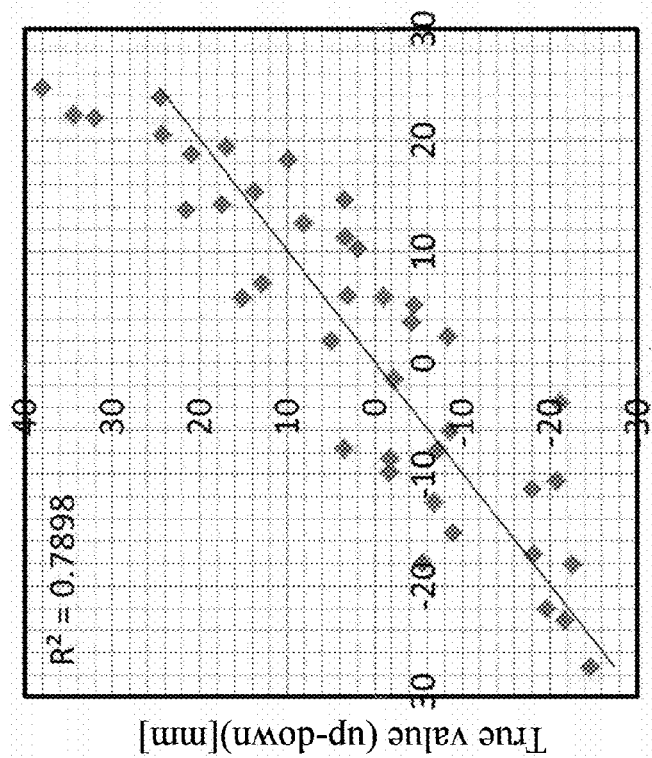
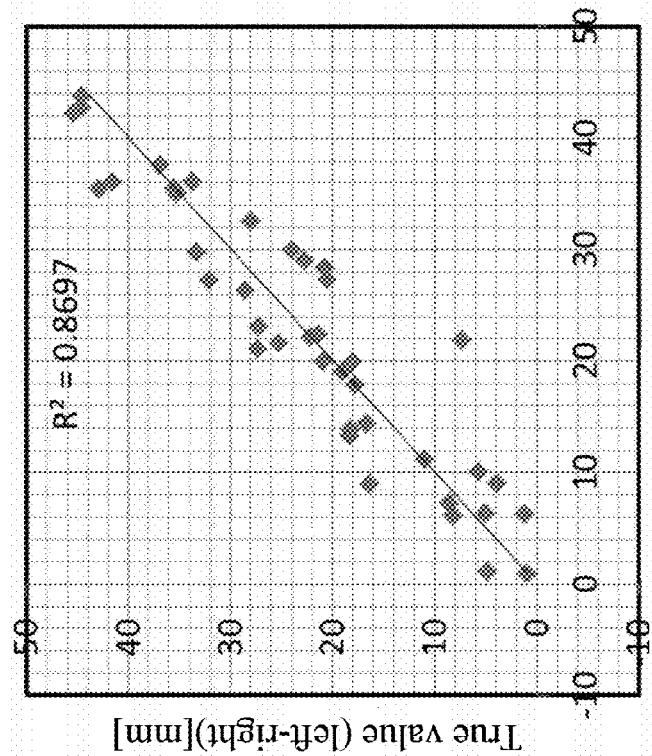
Heel side (use of multiple regression equation with 7 feature amounts)

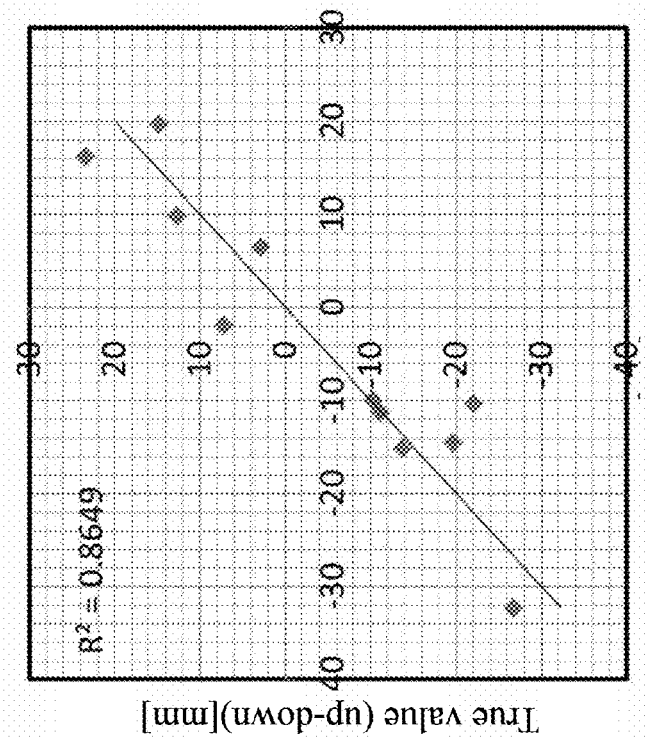
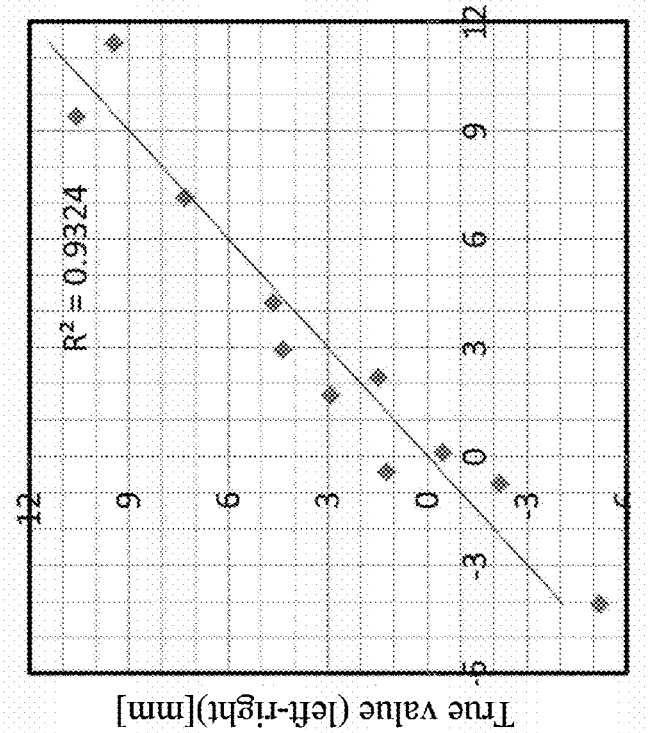
Fig.29

69/72 (95.8%) correctness rate at ±10 mm

24/24 (100%) correctness rate at ±10 mm

Fig. 37E

Center (lower)

N=24

±10 mm range

Up-down strike point (true value)

Estimated up-down strike point

24/24 (100%) correctness rate at ±10 mm

Fig. 37F

Heel (lower)

N=72

±10 mm range

Up-down strike point (true value)

Estimated up-down strike point

67/72 (93.1%) correctness rate at ±10 mm

Fig.41
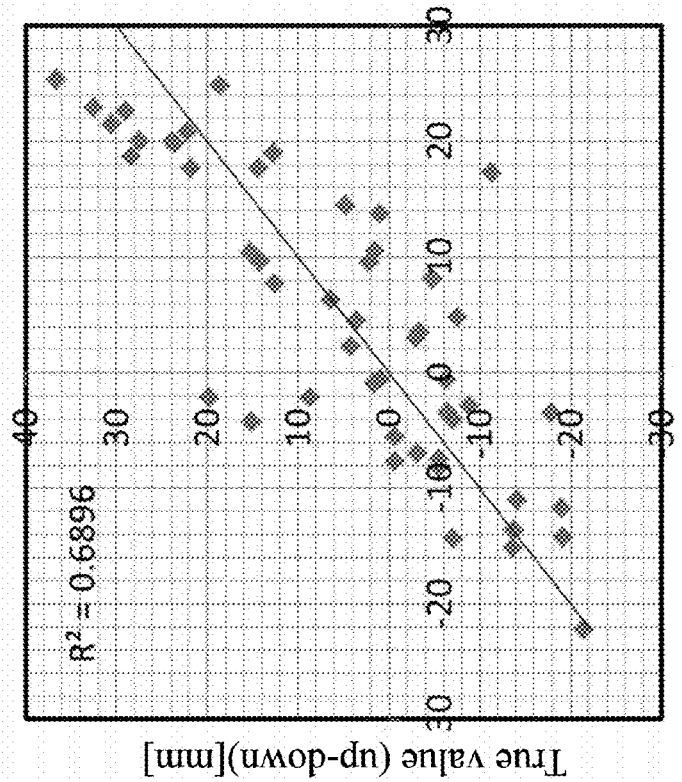
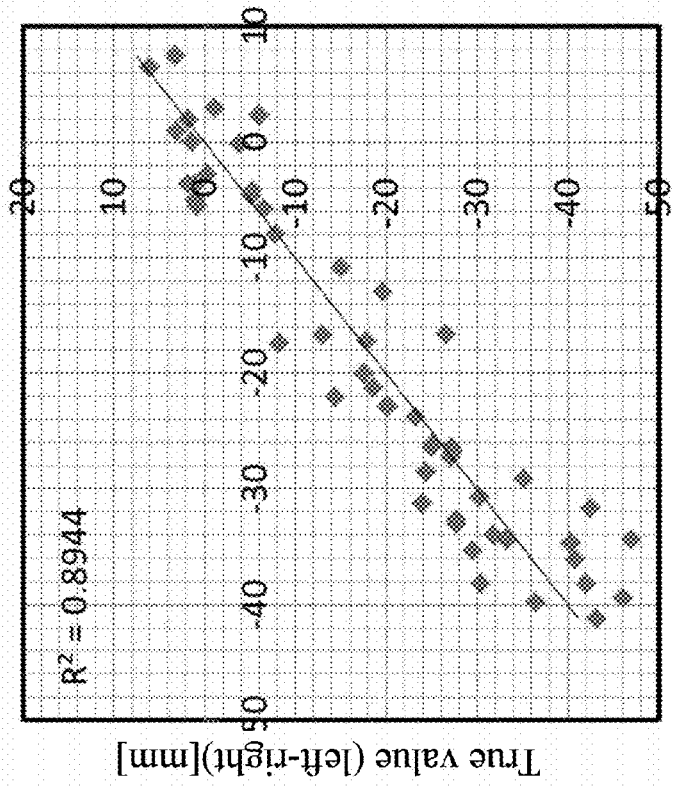

Heel side (use of multiple regression equation with 7 feature amounts)

Fig.44
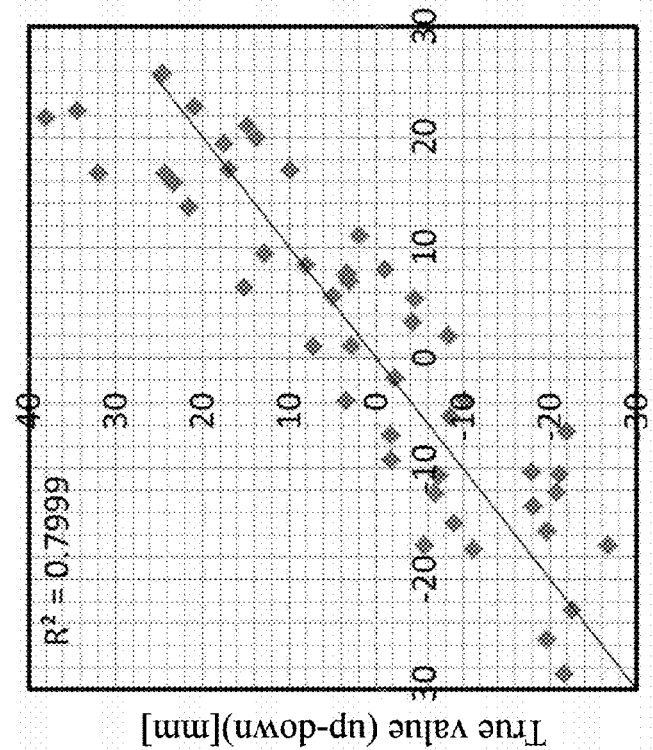
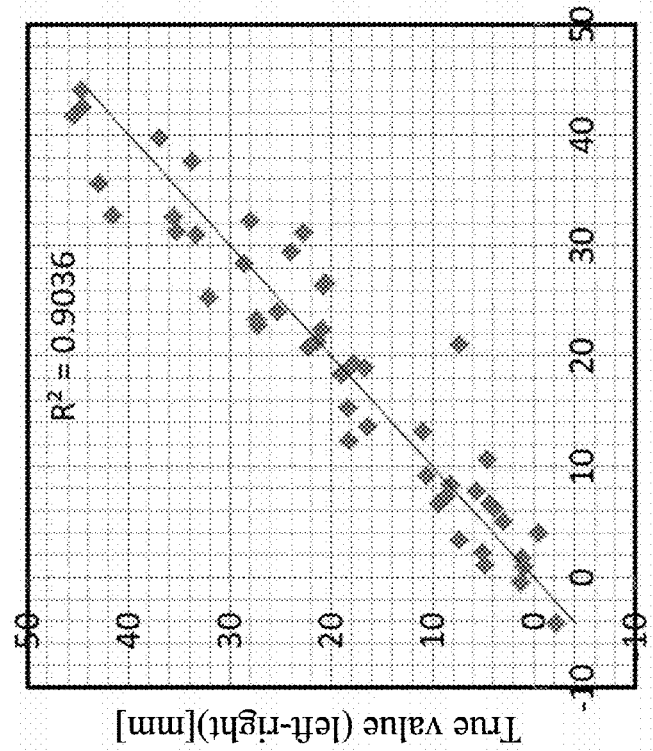

GOLF SWING ANALYSIS APPARATUS

CROSS REFERENCE TO RELATED APPLICATIONS

This application claims priorities to Japanese Patent Applications No. 2014-264371 filed on Dec. 26, 2014, No. 2015-177029 filed on Sep. 8, 2015 and No. 2015-205924 filed on Oct. 19, 2015, which are hereby incorporated by reference in their entirety.

FIELD OF INVENTION

The present invention relates to an apparatus, method and computer readable medium storing program for golf swing analysis that estimate an impact position of a ball on a face of a golf club.

BACKGROUND

Heretofore, methods for estimating the strike point of a ball on a club face when a golf club is swung have been proposed. For example, Patent Literature 1 (WO/2009/069698) discloses a plurality of sensors for detecting vibrations that occur at the time of hitting a ball being attached to the back surface of the face, and an apparatus that estimates the hit position from the output signals of these sensors. Also, Patent Literature 2 (JP 2007-167549A) discloses an apparatus that derives a strike point position, based on an image of the golf swing captured with two cameras.

SUMMARY OF INVENTION

However, with the method of Patent Literature 1, since sensors are attached to the back surface side of the face, attaching the sensors after the golf club has been manufactured may be difficult. Also, with the method of Patent Literature 2, since installation of cameras is required, the apparatus becomes large-scale, and securing a place for installing the cameras can be difficult.

An object of the present invention is to provide an apparatus, method and computer readable medium storing program for golf swing analysis that are capable of estimating the strike point of the ball on the face in a simple manner when a golf club is swung.

A golf swing analysis apparatus according to a first aspect of the present invention is a golf swing analysis apparatus for analyzing a golf swing that uses a golf club having a grip, a shaft and a head, the apparatus being provided with a derivation unit, a calculation unit, and an estimation unit. The derivation unit is configured to derive analytical data including at least one of time-series angular velocity data and time-series acceleration data in an analysis time interval near impact, from sensor data output from at least one of an angular velocity sensor and an acceleration sensor attached to at least one of the grip and the shaft. The calculation unit is configured to calculate a feature amount of a waveform of the analytical data. The estimation unit is configured to estimate an impact position of a ball on a face of the head, according to the feature amount.

A golf swing analysis apparatus according to a second aspect of the present invention is the golf swing analysis apparatus according to the first aspect in which the estimation unit is configured to estimate the impact position, based on a predetermined regression equation in which the feature amount is an explanatory variable and the impact position is an objective variable.

A golf swing analysis apparatus according to a third aspect of the present invention is the golf swing analysis apparatus according to the first aspect or the second aspect in which the analytical data includes the angular velocity data about a first axis that slopes relative to a first direction defined on the face, and the calculation unit is configured to calculate a first feature amount which is the feature amount of a waveform of the angular velocity data about the first axis. The estimation unit is configured to estimate the impact position in the first direction on the face, according to the first feature amount.

A golf swing analysis apparatus according to a fourth aspect of the present invention is the golf swing analysis apparatus according to the third aspect in which the first direction is a toe-heel direction, and the first axis is substantially parallel to a direction in which the shaft extends or a face-back direction.

A golf swing analysis apparatus according to a fifth aspect of the present invention is the golf swing analysis apparatus according to the third aspect in which the first direction is a top-sole direction, and the first axis is substantially parallel to a toe-heel direction or a face-back direction.

A golf swing analysis apparatus according to a sixth aspect of the present invention is the golf swing analysis apparatus according to any of the third aspect to the fifth aspect in which the analytical data includes the angular velocity data about a second axis that slopes relative to a second direction approximately orthogonal to the first direction defined on the face. The calculation unit is configured to calculate a second feature amount which is the feature amount of a waveform of the angular velocity data about the second axis. The estimation unit is configured to estimate the impact position of the second direction on the face, according to the second feature amount.

A golf swing analysis apparatus according to a seventh aspect of the present invention is the golf swing analysis apparatus according to any of the first aspect to the sixth aspect further including a classification unit configured to classify a behavior of the head near impact into a plurality of patterns, based on the sensor data. The estimation unit is configured to estimate the impact position, using an algorithm corresponding to a pattern classified by the classification unit.

A golf swing analysis apparatus according to an eighth aspect of the present invention is the golf swing analysis apparatus according to any of the first aspect to the seventh aspect further including a mishit determination unit configured to determine a mishit in which the ball impacts an edge portion of the face, based on at least the acceleration data after impact included in the sensor data. The estimation unit is configured to estimate the impact position if it is not determined that the mishit occurred.

A golf swing analysis apparatus according to a ninth aspect of the present invention is the golf swing analysis apparatus according to any of the first aspect to the eighth aspect in which the feature amount is an amplitude of a waveform of the analytical data.

A golf swing analysis apparatus according to a tenth aspect of the present invention is the golf swing analysis apparatus according to any of the first aspect to the ninth aspect in which the feature amount is a length of time between feature times included in the analysis time interval. Each of the feature times is an impact time or a time at which an amplitude peak appears.

A golf swing analysis apparatus according to an eleventh aspect of the present invention is the golf swing analysis apparatus according to any of the first aspect to the tenth aspect in which the calculation unit is configured to calculate a plurality of the feature amounts from the analytical data. The estimation unit is configured to estimate the impact position, based on a predetermined multiple regression equation in which the plurality of the feature amounts are explanatory variables and the impact position is an objective variable.

A golf swing analysis apparatus according to a twelfth aspect of the present invention is the golf swing analysis apparatus according to the second aspect or the eleventh aspect further including a toe-heel classification unit. The toe-heel classification unit is configured to classify the impact position in a toe-heel direction on the face into a plurality of regions, according to at least one of a first-order mode peak frequency of an amplitude spectrum of an angular velocity about an axis in a direction in which the shaft extends and a phase angle corresponding to the peak frequency. The estimation unit is configured to estimate the impact position, based on the regression equation or the multiple regression equation corresponding to a pattern classified by the toe-heel classification unit.

A golf swing analysis apparatus according to a thirteenth aspect of the present invention is the golf swing analysis apparatus according to the twelfth aspect in which the toe-heel classification unit is configured to determine that the impact position is included near the center on the face, if the peak frequency is within a predetermined range.

A golf swing analysis apparatus according to a fourteenth aspect of the present invention is the golf swing analysis apparatus according to the twelfth aspect or the thirteenth aspect in which the toe-heel classification unit is configured to determine that the impact position is included in a region on a toe side of the face in a case where the phase angle is greater than or equal to a predetermined value, and to determine that the impact position is included in a region on a heel side of the face in a case where the phase angle is smaller than the predetermined value.

A golf swing analysis apparatus according to a fifteenth aspect of the present invention is the golf swing analysis apparatus according to either the second aspect, the eleventh aspect or the twelfth aspect further including a top-sole classification unit. The top-sole classification unit is configured to classify the impact position in a top-sole direction on the face into a plurality of regions, according to a phase angle corresponding to a predetermined frequency greater than or equal to 150 Hz of a phase spectrum of an acceleration in a face-back direction or a phase angle corresponding to a predetermined frequency greater than or equal to 150 Hz of a phase spectrum of an angular velocity about an axis in a toe-heel direction. The estimation unit is configured to estimate the impact position, based on the regression equation or the multiple regression equation corresponding to a pattern classified by the top-sole classification unit.

A golf swing analysis apparatus according to a sixteenth aspect of the present invention is the golf swing analysis apparatus according to the fifteenth aspect in which the top-sole classification unit is configured to determine that the impact position is included in a region on the top side of the face in a case where the phase angle is greater than or equal to a predetermined value, and to determine that the impact position is included in a region on the sole side of the face in a case where the phase angle is smaller than the predetermined value.

A golf swing analysis apparatus according to a seventeenth aspect of the present invention is the golf swing analysis apparatus according to any of the first aspect to the sixteenth aspect in which the calculation unit is configured to calculate a feature amount of a spectrum of the analytical data, as the feature amount of the waveform of the analytical data.

A golf swing analysis apparatus according to an eighteenth aspect of the present invention is the golf swing analysis apparatus according to the seventeenth aspect in which the calculation unit is configured to calculate a first-order or second-order mode peak amplitude of a spectrum of the angular velocity data, as the feature amount of the waveform of the analytical data.

A golf swing analysis apparatus according to a nineteenth aspect of the present invention is the golf swing analysis apparatus according to the seventeenth aspect or the eighteenth aspect in which the calculation unit is configured to calculate a first-order or second-order mode peak amplitude of a spectrum of the acceleration data, as the feature amount of the waveform of the analytical data.

A golf swing analysis apparatus according to a twentieth aspect of the present invention is the golf swing analysis apparatus according to any of the first aspect to the nineteenth aspect in which the calculation unit is configured to calculate an amplitude of the angular velocity data, as the feature amount of the waveform of the analytical data.

A golf swing analysis apparatus according to a twenty-first aspect of the present invention is the golf swing analysis apparatus according to any of the first aspect to the seventh aspect and the ninth aspect to the twentieth aspect further including a mishit determination unit. The mishit determination unit is configured to determine a mishit in which the ball impacts an edge portion of the face, in a case where the feature amount is outside a predetermined range. The estimation unit is configured to estimate the impact position, if it is not determined that the mishit occurred.

A method according to a twenty-second aspect of the present invention is a method for analyzing a golf swing that uses a golf club having a grip, a shaft and a head, the method including the following steps.

(1) A step of deriving analytical data including at least one of time-series angular velocity data and time-series acceleration data in an analysis time interval near impact, from sensor data output from at least one of an angular velocity sensor and an acceleration sensor attached to at least one of the grip and the shaft.

(2) A step of calculating a feature amount of a waveform of the analytical data.

(3) A step of estimating an impact position of a ball on a face of the head, according to the feature amount.

A non-transitory computer readable medium according to a twenty-third aspect of the present invention stores a program for analyzing a golf swing that uses a golf club having a grip, a shaft and a head, the program causing a computer to execute the following steps.

(1) A step of deriving analytical data including at least one of time-series angular velocity data and time-series acceleration data in an analysis time interval near impact, from sensor data output from at least one of an angular velocity sensor and an acceleration sensor attached to at least one of the grip and the shaft.

(2) A step of calculating a feature amount of a waveform of the analytical data.

(3) A step of estimating an impact position of a ball on a face of the head, according to the feature amount.

According to the present invention, the strike point is estimated from an output value of at least one of an angular velocity sensor and an acceleration sensor attached to at least one of the grip and the shaft. More specifically, analytical data to be analyzed is at least one of time-series angular velocity data and acceleration data in an analysis time interval near impact. A feature amount of a waveform of the analytical data is calculated, and the impact position of the ball on the face of the head is estimated, according to the feature amount. Accordingly, the strike point of the ball on the face can be estimated in a simple manner, without needing a large-scale apparatus.

BRIEF DESCRIPTION OF DRAWINGS

FIGS. 17A and 17B are other graphs showing the relationship between the strike point in the top-sole direction and an index dependant on the period of angular velocity about the x-axis.

FIG. 21 is a flowchart showing the flow of strike point estimation processing according to a second embodiment.

FIG. 27 is a graph showing verification results of the relationship between true values and estimated values of strike points according to the second embodiment (in the case where the strike points are included in a region on the toe side).

FIG. 28 is a graph showing verification results of the relationship between true values and estimated values of strike points according to the second embodiment (in the case where the strike points are included in a region on the heel side).

FIG. 29 is a graph showing verification results of the relationship between true values and estimated values of strike points according to the second embodiment (in the case where the strike points are included in a region near the face center).

FIG. 37E is a graph plotting the relationship between estimated values and true values of up-down strike points with respect to data classified as lower center.

FIG. 37F is a graph plotting the relationship between estimated values and true values of up-down strike points with respect to data classified as lower heel.

FIG. 41 is a graph showing verification results of the relationship between estimated values and true values of strike points according to a modification (in the case where the strike points are included in a region on the toe side).

FIG. 44 is a graph showing verification results of the relationship between estimated values and true values of strike points according to the modification of FIG. 43 (in the case where the strike points are included in a region on the heel side).

REFERENCE SIGNS LIST

1 Sensor unit
11 Acceleration sensor
12 Angular velocity sensor
2 Analysis apparatus (computer)
3 Analysis program
4 Golf club
24B mishit determination unit
24C Data derivation unit (derivation unit)
24D Pattern classification unit (classification unit)
24E Feature amount calculation unit (calculation unit)
24F Strike point estimation unit (estimation unit)
40 Shaft
41 Head
41 Face
42 Grip

DETAILED DESCRIPTION OF THE PREFERRED EMBODIMENTS

Hereinafter, a golf swing analysis apparatus, method and program according to some embodiments of the present invention will be described, with reference to drawings.

1. First Embodiment 1-1. Schematic Configuration of Analysis Apparatus

Figure 1:
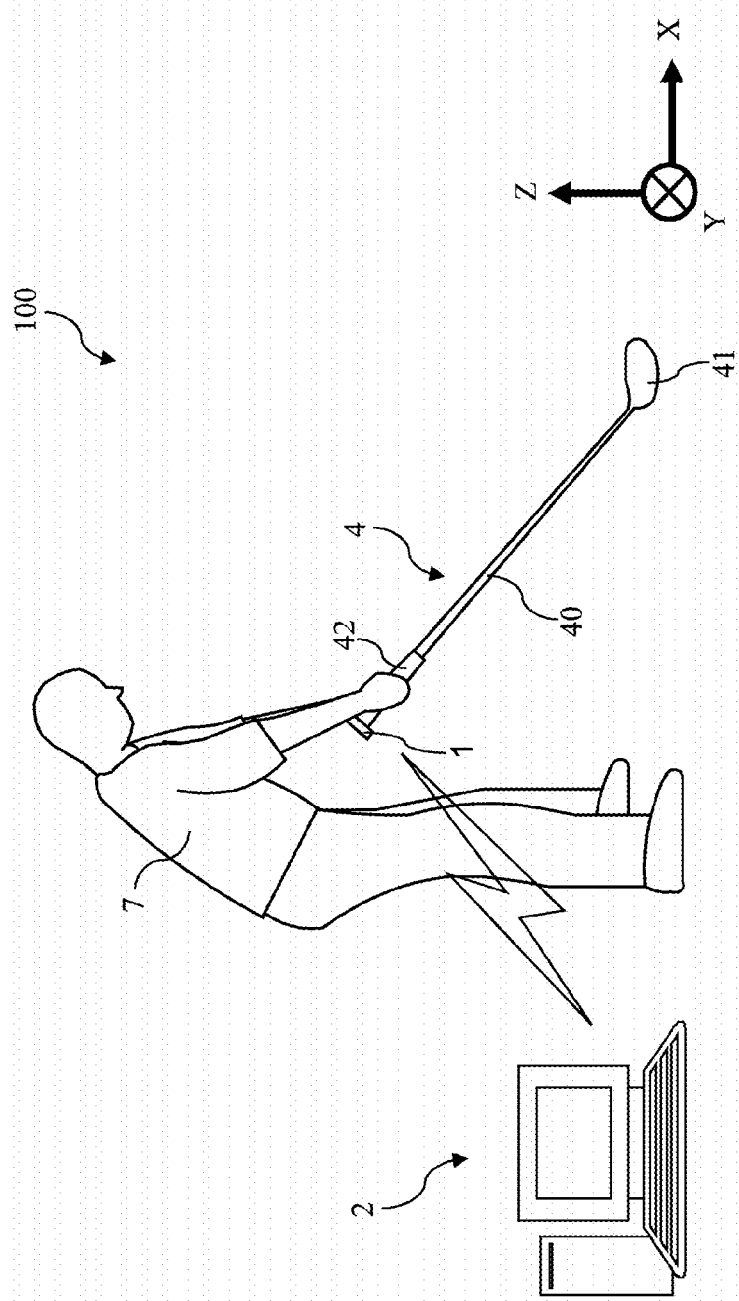
FIG. 1 is a diagram showing a swing analysis system provided with a golf swing analysis apparatus according to a first embodiment of the present invention.
Figure 2:
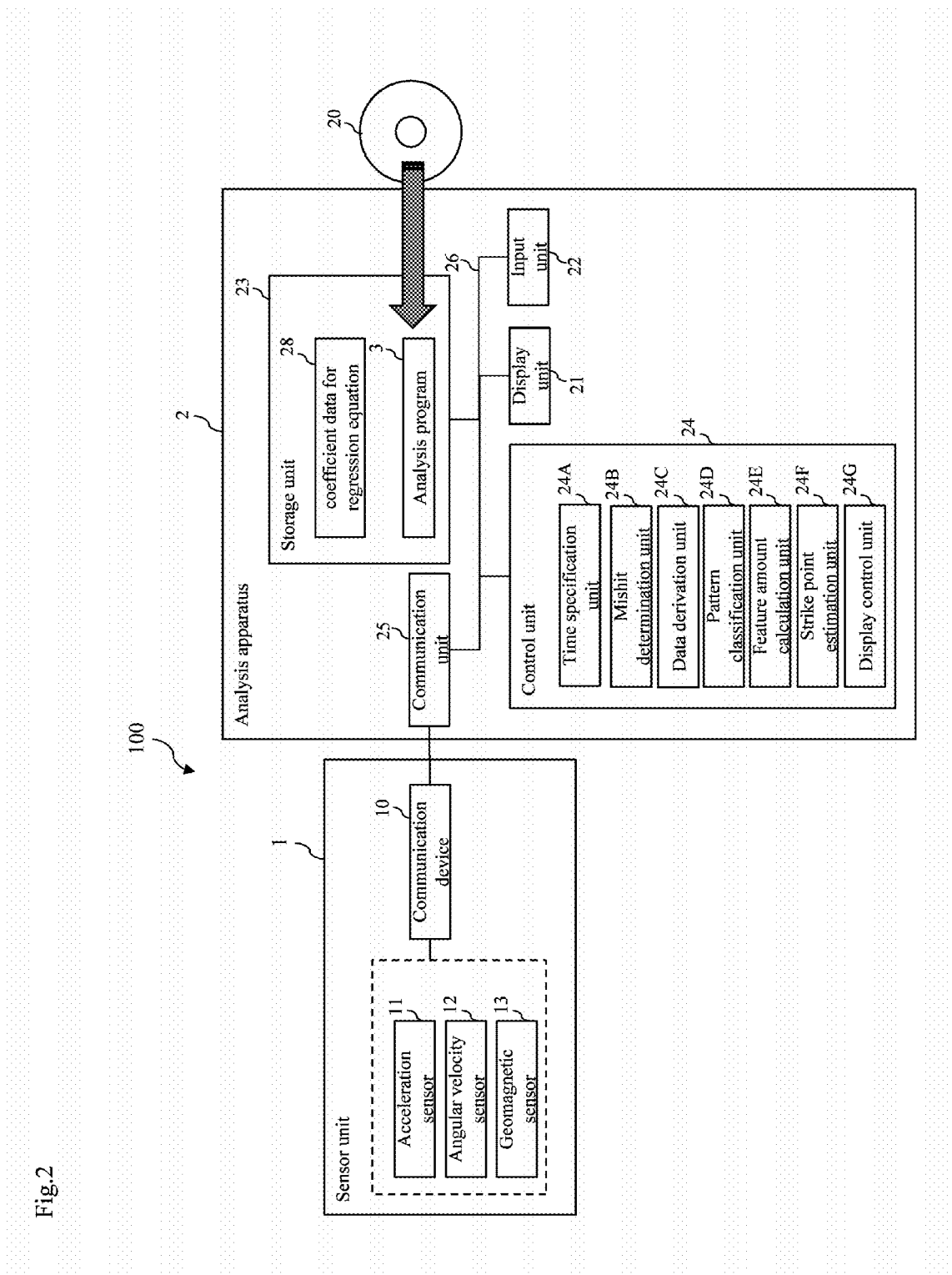
FIG. 2 is a functional block diagram of the swing analysis system of FIG. 1.

The overall configuration of a swing analysis system 100 that is provided with a golf swing analysis apparatus 2 according to the present embodiment is as shown in FIGS. 1 and 2. The golf swing analysis apparatus 2 is an apparatus that analyzes a golf swing by a golfer 7 using a golf club 4. More specifically, the golf swing analysis apparatus 2 has a function of estimating an impact position (strike point) of the ball on a face 41a of a head 41 (see FIG. 6). Information on the strike point estimated by the golf swing analysis apparatus 2 can be used, for example, for grasping how often the golfer 7 is hitting the sweet area on the golf club during practice, or the like. Alternatively, this information can also be used for assisting with fitting of the golf club 4. Collection of the data to be analyzed is performed using a sensor unit 1 attached to a grip 42 of the golf club 4, and the golf swing analysis apparatus 2 constitutes the swing analysis system 100 together with this sensor unit 1.

Hereinafter, the configuration of the sensor unit 1 and the golf swing analysis apparatus 2 will be described, followed by description of the flow of golf swing analysis processing.

1-1-1. Configuration of Sensor Unit

Figure 3:
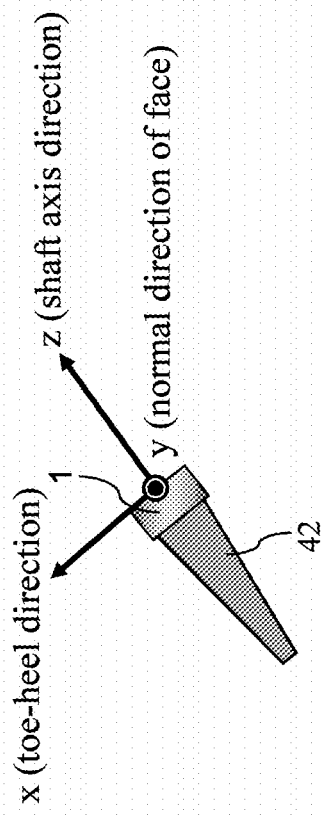
FIG. 3 is a diagram illustrating an xyz local coordinate system that is based on the grip of a golf club.

The sensor unit 1 is attached to an end portion of the grip 42 of the golf club 4 on the opposite side to the head 41 as shown in FIGS. 1 and 3, and measures the behavior of the grip 42. Note that the golf club 4 is a typical golf club, and consists of a shaft 40, the head 41 provided at one end of the shaft 40, and the grip 42 provided at the other end of the shaft 40. The sensor unit 1 is configured to be small and light so as to not interfere with the swing action. As shown in FIG. 2, an acceleration sensor 11, an angular velocity sensor 12, and a geomagnetic sensor 13 are mounted in the sensor unit 1 according to the present embodiment. A communication device 10 for transmitting sensor data that is output from these sensors 11 to 13 to the external analysis apparatus 2 is also mounted in the sensor unit 1. Note that, in the present embodiment, the communication device 10 is a wireless communication device so as to not interfere with the swing action, but may be configured to be connected to the golf swing analysis apparatus 2 in a wired manner via a cable.

The acceleration sensor 11, the angular velocity sensor 12 and the geomagnetic sensor 13 respectively measure acceleration, angular velocity and geomagnetism in an xyz local coordinate system. More specifically, the acceleration sensor 11 measures accelerations $a_x$, $a_y$ and $a_z$ of the grip 42 in x-axis, y-axis and z-axis directions. The angular velocity sensor 12 measures angular velocities $\omega_x$, $\omega_y$ and $\omega_z$ of the grip 42 about the x-axis, the y-axis and the z-axis. The geomagnetic sensor 13 measures geomagnetisms $m_x$, $m_y$ and $m_z$ in the x-axis, y-axis and z-axis directions. This sensor data is acquired as time series data at a predetermined sampling period $\Delta t$. Note that the xyz local coordinate system is a three-axis orthogonal coordinate system that is defined as shown in FIG. 3. That is, the z-axis coincides with the direction in which the shaft 40 extends, and the direction from the head 41 toward the grip 42 is the positive z-axis direction. The x-axis is oriented as close as possible in the toe-heel direction of the head 41, and the y-axis is oriented as close as possible in the normal direction (face-back direction) of the face of the head 41.

Note that the toe-heel direction, the face-back direction and the top-sole direction are defined on the basis of a reference state. The reference state is a state where the direction in which the shaft 40 extends is contained in a plane perpendicular to a horizontal plane (hereinafter, reference perpendicular plane), and the head 41 is placed on the horizontal plane at a predetermined lie angle and a predetermined real loft angle. The toe-heel direction is the direction of the line of intersection of the reference perpendicular plane and the horizontal plane, and the face-back direction is the direction perpendicular to the toe-heel direction and parallel to the horizontal plane. Also, the direction perpendicular to the horizontal plane is referred to as the top-sole direction. Note that in the present embodiment, unless particularly stated otherwise, "left-right" indicates the toe-heel direction, with the toe side being to the left and the heel side being to the right. Also, unless particularly stated otherwise, "up-down" indicates the top-sole direction, with the top side being up and the sole side being down.

In the present embodiment, sensor data from the acceleration sensor 11, the angular velocity sensor 12 and the geomagnetic sensor 13 is transmitted to the golf swing analysis apparatus 2 via the communication device 10 in real time. However, the sensor data may, for example, be stored in a storage device within the sensor unit 1, and may then be retrieved from the storage device after the end of the swing action and delivered to the golf swing analysis apparatus 2.

1-1-2. Configuration of Analysis Apparatus

The configuration of the golf swing analysis apparatus 2 will be described with reference to FIG. 2. The golf swing analysis apparatus 2 is manufactured by installing an analysis program 3 according to the present embodiment stored in a computer-readable recording medium 20 such as a CD-ROM or a USB memory in a general-purpose personal computer. The analysis program 3 is software for analyzing a golf swing based on sensor data sent from the sensor unit 1 and estimating the strike point on the face 41a. The analysis program 3 causes the golf swing analysis apparatus 2 to execute operations discussed later.

The golf swing analysis apparatus 2 is provided with a display unit 21, an input unit 22, a storage unit 23, a control unit 24, and a communication unit 25. These units 21 to 25 are connected via a bus line 26 and can communicate with each other. In the present embodiment, the display unit 21 is constituted by a liquid crystal display or the like, and displays information discussed later to a user. Note that "user" as referred to here is a general term for a person who requires analysis results, such as the golfer 7 or his or her instructor. Also, the input unit 22 can be constituted by a mouse, a keyboard, a touch panel or the like, and accepts operations from the user to the golf swing analysis apparatus 2.

The storage unit 23 is constituted by a nonvolatile storage device such as a hard disk. Sensor data that is sent from the sensor unit 1 is saved to the storage unit 23, in addition to the analysis program 3 being stored therein. The storage unit 23 also stores data (hereinafter, coefficient data) 28 showing a regression coefficient that is used in estimating the strike point. The coefficient data 28 will be discussed in detail later. The communication unit 25 is a communication interface that enables communication between the golf swing analysis apparatus 2 and an external apparatus, and receives data from the sensor unit 1.

The control unit 24 can be constituted by a CPU, a ROM, a RAM and the like. The control unit 24, by reading out and executing the analysis program 3 stored in the storage unit 23, operates in a virtual manner as a time specification unit 24A, a mishit determination unit 24B, a data derivation unit 24C, a pattern classification unit 24D, a feature amount calculation unit 24E, a strike point estimation unit 24F, and a display control unit 24G. The operations of the units 24A to 24G will be discussed in detail later.

1-2. Golf Swing Analysis Processing

Next, golf swing analysis processing by the swing analysis system 100 will be described. This analysis processing includes two types of processing, namely, data collection processing for collecting sensor data representing the behavior of the grip 42 with the sensor unit 1, and strike point estimation processing for estimating the strike point at the time of a golf swing with the golf swing analysis apparatus 2, based on the sensor data. Hereinafter, these types of processing will be described in order.

1-2-1. Data Collection Processing

In data collection processing, the golfer 7 swings the golf club 4 provided with the sensor unit 1. At this time, sensor data of the accelerations $a_x$, $a_y$ and $a_z$, the angular velocities $\omega_x$, $\omega_y$ and $\omega_z$ and the geomagnetisms $m_x$, $m_y$ and $m_z$ during the golf swing are detected by the sensor unit 1. Also, this sensor data is transmitted to the golf swing analysis apparatus 2 via the communication device 10 of the sensor unit 1. On the other hand, on the golf swing analysis apparatus 2 side, the data derivation unit 24C receives this data via the communication unit 25, and stores the received data in the storage unit 23. In the present embodiment, at least time-series sensor data from address to finish is collected.

Figure 4:
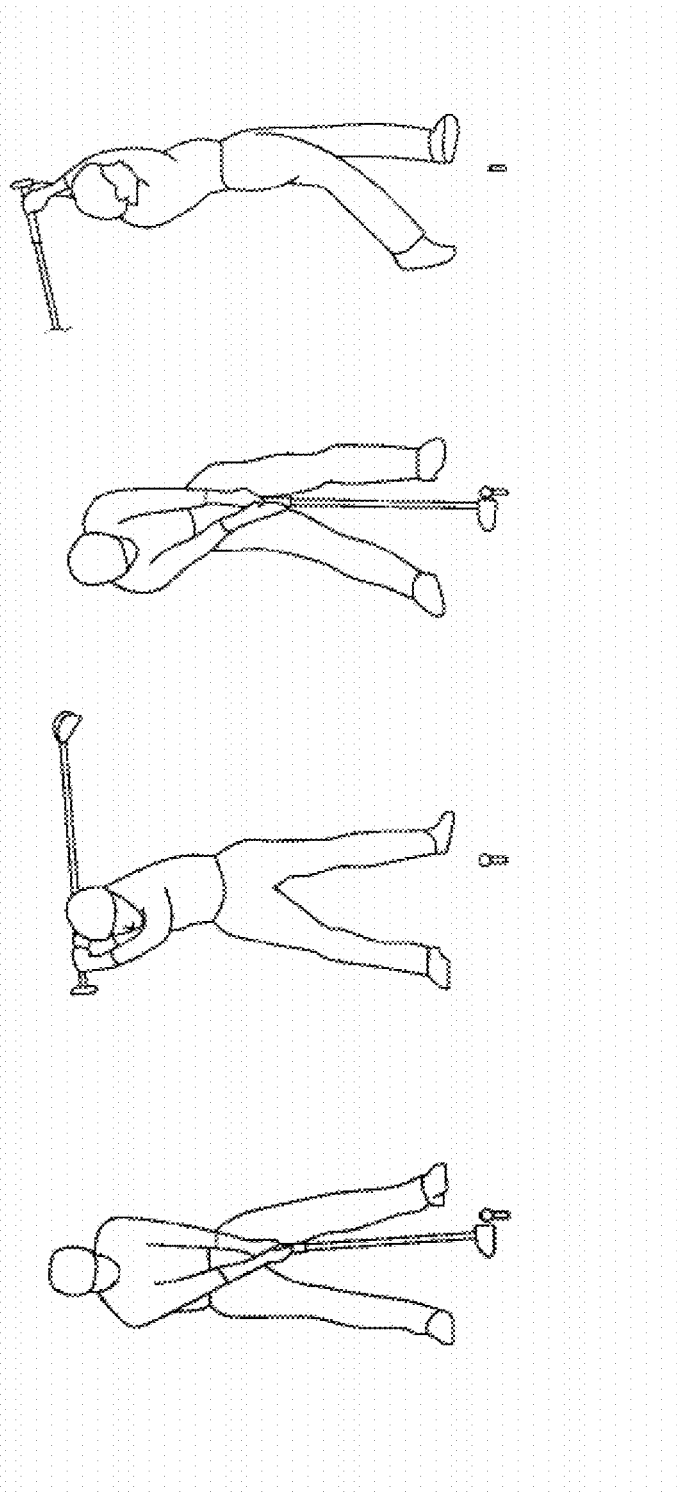
FIG. 4A is a diagram showing an address state.
FIG. 4B is a diagram showing a top state.
FIG. 4C is a diagram showing an impact state.
FIG. 4D is a diagram showing a finish state.

Note that the swing action of a golf club typically proceeds in order of address, top, impact and finish. Address refers to an initial state with the head 41 of the golf club 4 placed near the ball, as shown in FIG. 4A, and top refers to a state where the head 41 is swung all the way up after the golf club 4 is taken back from address, as shown in FIG. 4B. Impact refers to the state at the moment the head 41 impacts the ball after the golf club 4 is swung down from top, as shown in FIG. 4C, and finish refers to the state where the golf club 4 is swung through to the front after impact, as shown in FIG. 4D.

1-2-2. Strike Point Estimation Processing

Figure 5:
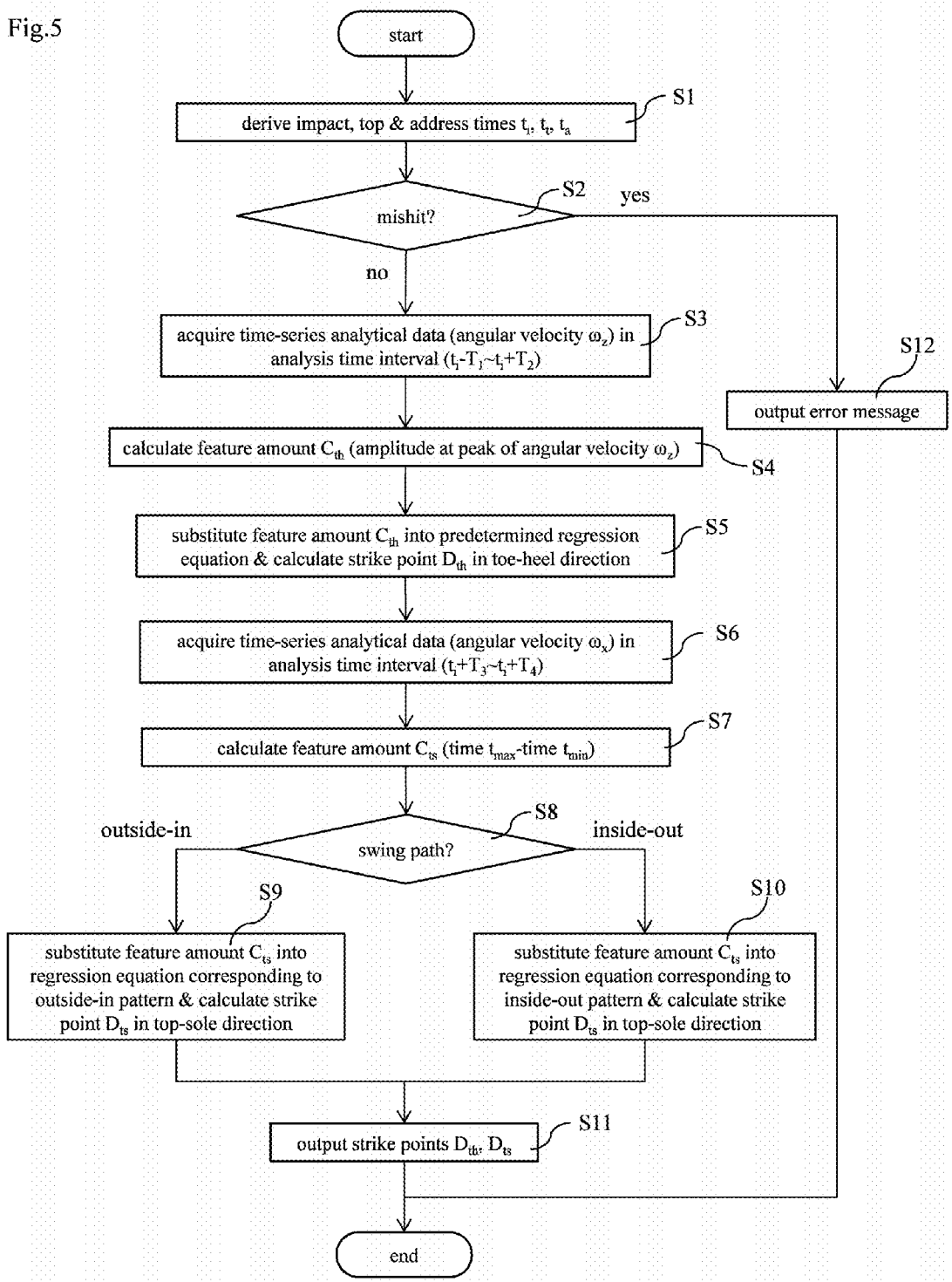
FIG. 5 is a flowchart showing the flow of strike point estimation processing according to the first embodiment.
Figure 6:
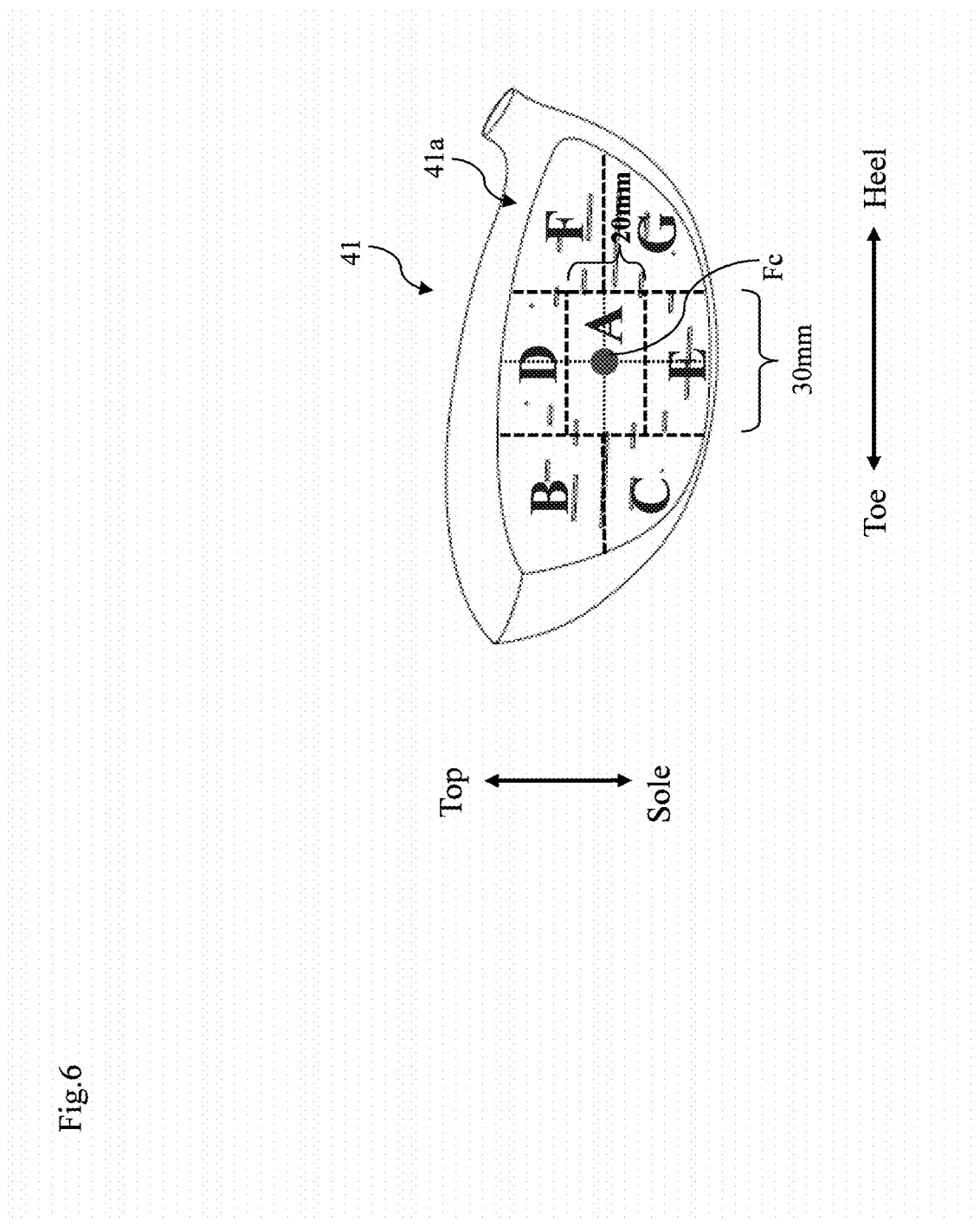
FIG. 6 is a diagram showing the face of a head.

Next, strike point estimation processing that is executed by the golf swing analysis apparatus 2 will be described, with reference to FIG. 5. In the present embodiment, as shown in FIG. 6, the face 41a is divided in a virtual manner into a plurality of regions A to G, and it is determined with which of these regions A to G the ball was hit. The region A in the center of the face 41a includes a face center Fc, which is the geometrical center of the face 41a, and also includes the sweet spot. That is, the region A substantially corresponds to the sweet area. In the present embodiment, the region A, as shown in FIG. 6, is defined as a rectangular region centered on the face center Fc, and spreading a predetermined length in the up-down direction (e.g., 20 mm) and a predetermined length in the left-right direction (e.g., 30 mm). Also, the region on the toe side relative to the region A is divided with a virtual line extending horizontally at the same height position as the face center Fc to form a region B on the upper side and a region C on the lower side. Furthermore, the region on the heel side relative to the region A is also divided with the virtual line extending horizontally at the same height position as the face center Fc to form a region F on the upper side and a region G on the lower side. Furthermore, the remaining region on the face 41a is a region D on the upper side relative to the region A and a region E on the lower side relative to the region A.

The strike point estimation processing starts when data collection processing has ended, the sensor data has been stored in the storage unit 23, and the user has instructed execution of the strike point estimation processing. In the first step S1, the time specification unit 24A derives impact, top and address times $t_i$, $t_t$ and $t_a$, based on the sensor data stored in the storage unit 23. In the present embodiment, impact time $t_i$ is derived first, top time $t_t$ is derived based on impact time $t_i$, and address time $t_a$ is derived based on top time $t_t$.

Specifically, the time at which the increment per sampling period $\Delta t$ of the angular velocity $\omega_x$ first exceeds a threshold of 300 deg/s is set as a provisional impact time. The time at which the increment per sampling period $\Delta t$ of the angular velocity $\omega_x$ exceeds 200 deg/s from a time going back a predetermined time period from this provisional impact time until the provisional impact time is detected and set as impact time $t_i$.

Figure 7:
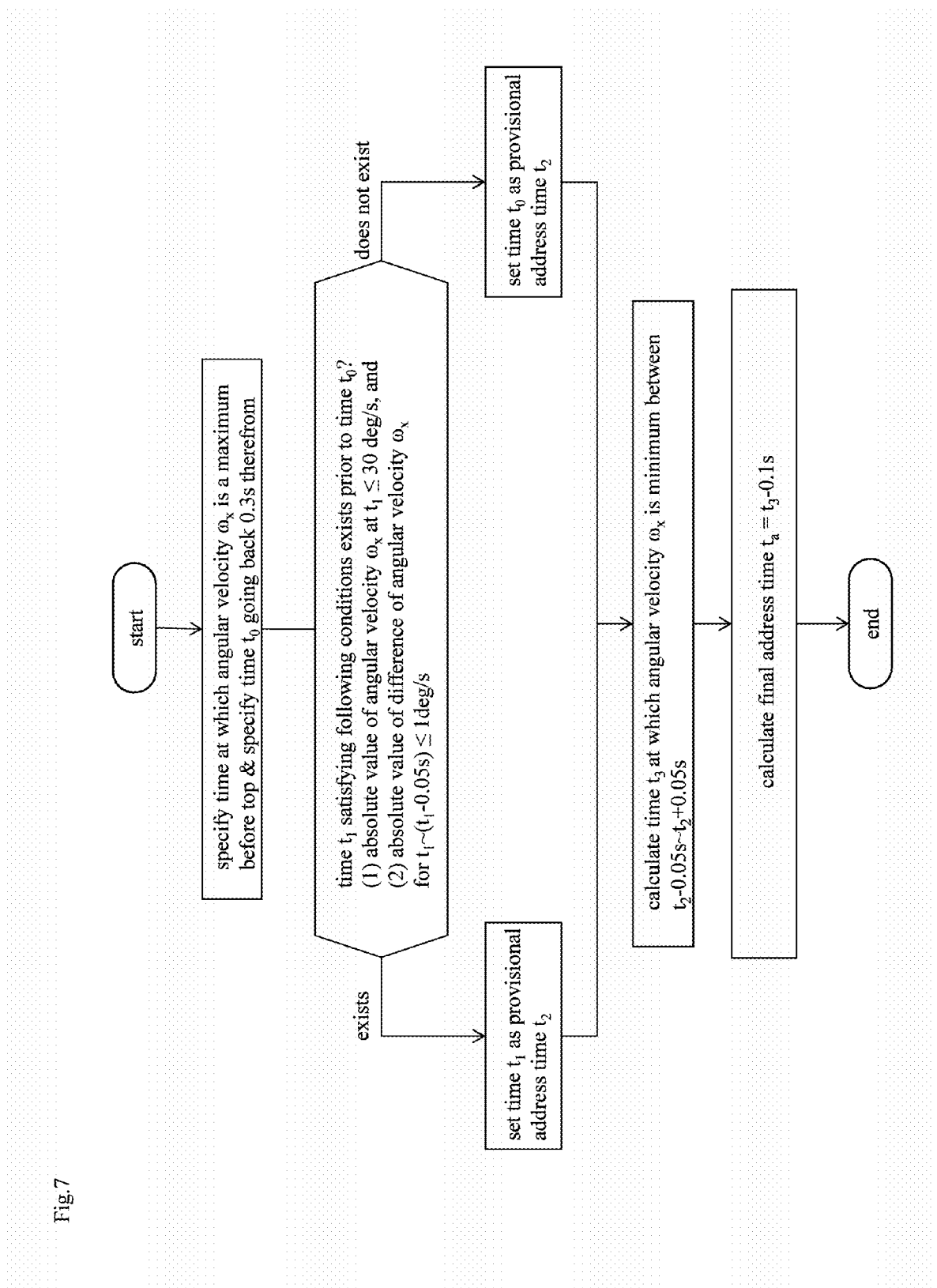
FIG. 7 is a flowchart showing the flow of processing for deriving the address time.
Figure 8A:
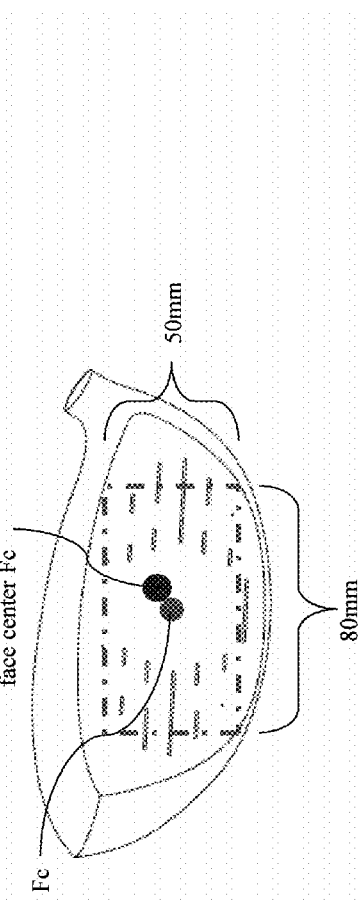
FIGS. 8A and 8B are diagrams showing acceleration data at the time of a non-mishit.
Figure 8B:
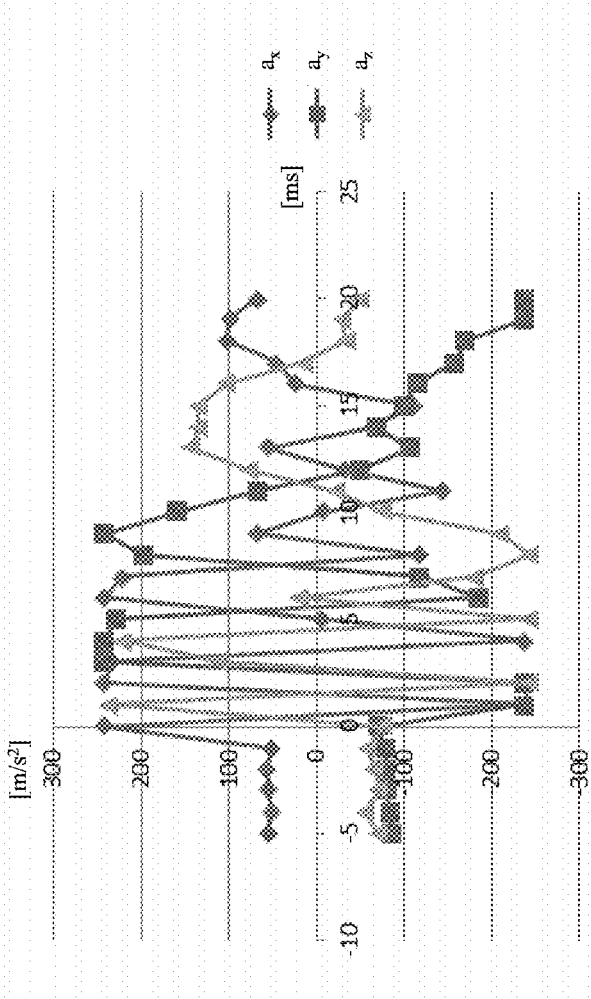
Figure 9A:
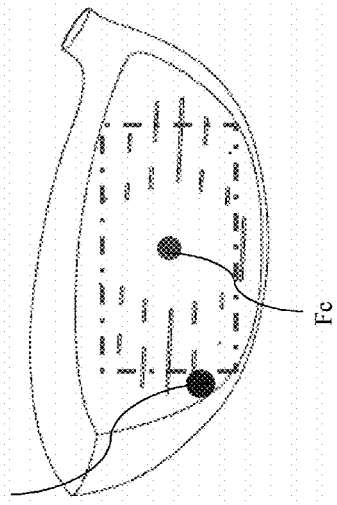
FIGS. 9A and 9B are diagrams showing acceleration data at the time of a mishit.
Figure 9B:
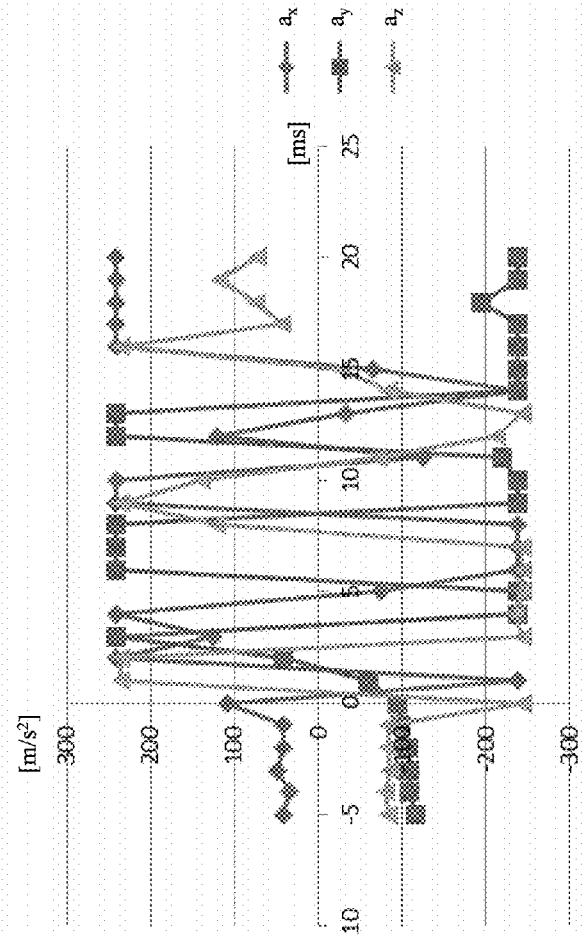

Next, the time at which the angular velocity $\omega_y$ changes from negative to positive before impact time $t_i$ is specified as top time $t_t$. Also, address time $t_a$ is calculated in accordance with the flowchart in FIG. 7. Note that as algorithms for calculating the impact, top and address times $t_i$, $t_t$ and $t_a$, various algorithms are known, and the algorithms described are merely illustrative.

In the following step S2, the mishit determination unit 24B determines whether the golf swing carried out in the data collection processing was a mishit. A mishit as referred to in the present embodiment is a shot where the ball impacts in an outer peripheral area (edge portion) of the face 41a (hereinafter, mishit area).

In step S2 according to the present embodiment, the determination of a mishit is performed based on data of the accelerations $a_x$, $a_y$ and $a_z$ included in a predetermined time interval. The predetermined time interval according to the present embodiment is a time interval until predetermined time period (e.g., 20 ms) elapses from impact time $t_i$. More specifically, the mishit determination unit 24B counts the number of data points (hereinafter, out-of-range count) having a value greater than or equal to a predetermined threshold (e.g., 200 m/s² or more or −200 m/s² or less), among the data points of the accelerations $a_x$, $a_y$ and $a_z$ that are included in the predetermined time interval. In the case where the ratio of the out-of-range count to the total number of data points of the accelerations $a_x$, $a_y$ and $a_z$ that are included in the predetermined time interval exceeds a predetermined threshold, it is determined that the golf swing is a mishit.

That is, since the edge portion of the face 41a is harder than the central region, greater acceleration generally occurs in the grip 42 in the case where the ball hits the mishit area. Accordingly, in the case where a tendency for the values of the accelerations $a_x$, $a_y$ and $a_z$ to increase is observed, it can be determined that the golf swing is a mishit. Note that this tendency need not necessarily be evaluated with a ratio such as described above, and can also be evaluated according to whether the absolute number of the out-of-range count is greater than or equal to a predetermined number, for example.

Figure 10A:
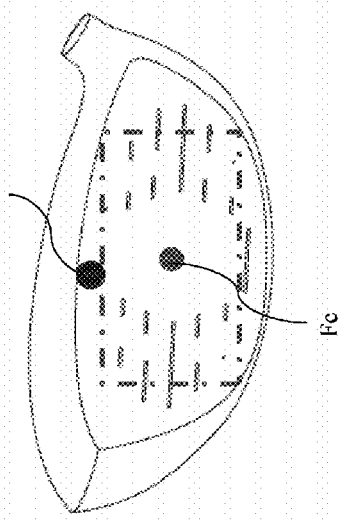
FIGS. 10A and 10B are other diagrams showing acceleration data at the time of a mishit.
Figure 10B:
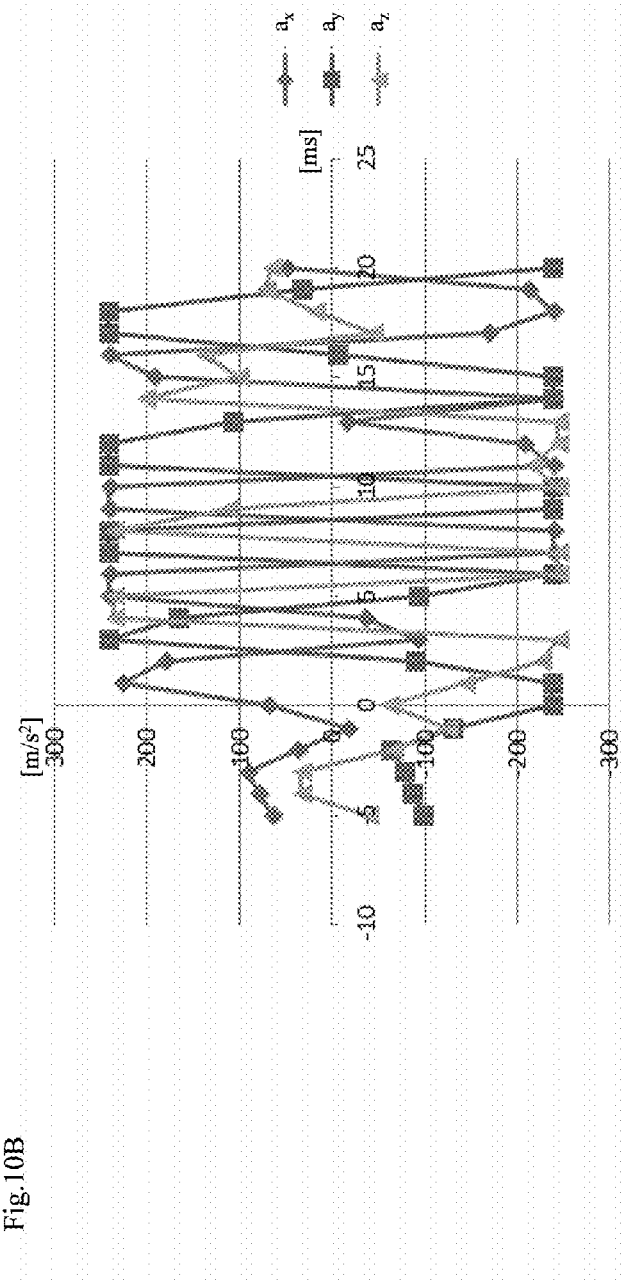

FIGS. 8A to 10B are diagrams illustrating the results of testing conducted by the inventors. FIG. 8B is a graph showing data of the accelerations $a_x$, $a_y$ and $a_z$ when hitting of the ball occurs near the face center Fc (position shown in FIG. 8A). Also, FIG. 9B is a graph showing data of the accelerations $a_x$, $a_y$ and $a_z$ when hitting of the ball occurs at a position (position shown in FIG. 9A) deviating greatly on the left side from the face center Fc, and FIG. 10B is a graph showing data of the accelerations $a_x$, $a_y$ and $a_z$ when hitting of the ball occurs at a position (position shown in FIG. 10A) deviating greatly on the upper side from the face center Fc. The horizontal axis in FIGS. 8B to 10B is a time-axis, and 0 ms indicates the timing of impact. As is evident from a comparison of these diagrams, the acceleration data in the case where the strike point deviates greatly from the face center Fc has a markedly higher out-of-range count as compared with the acceleration data in the case where the ball is hit near the face center Fc. Quantitatively, the out-of-range count in the case of FIGS. 8A and 8B was 19, the out-of-range count in the case of FIGS. 9A and 9B was 43, and the out-of-range count in the case of FIGS. 10A and 10B was 40. Note that the strike point in this testing was determined by capturing an image of the golf swing using a plurality of cameras, and performing image processing on the obtained images.

If it is determined in step S2 that the golf swing is a mishit, the processing advances to step S12, and if it is determined that the golf swing is not a mishit, the processing advances to step S3. In step S12, the display control unit 24G displays a message such as "The strike point cannot be estimated because the ball hit the edge of the face" on the display unit 21, and thereinafter the strike point estimation processing ends.

On the other hand, in step S3, the data derivation unit 24C derives time-series data (analytical data) of the angular velocity $\omega_z$ in an analysis time interval near impact, from the sensor data stored in the storage unit 23. The analysis time interval as referred to here is, in the present embodiment, a time interval from (impact time $t_i-T_1$) to (impact time $t_i+T_2$). For example, $T_1=1$ ms and $T_2=15$ ms can be set. Note that the analysis time interval may be a time interval from impact time $t_i$, or may be a time interval after impact time $t_i$.

In the following step S4, the feature amount calculation unit 24E calculates a feature amount $C_{th}$ of the waveform of the analytical data derived in step S3 to be used in estimating an impact position $D_{th}$ of the ball on the face 41a in the toe-heel direction. The feature amount $C_{th}$ according to the present embodiment is the amplitude at the peak of the waveform of the analytical data derived in step S3.

Figure 11A:
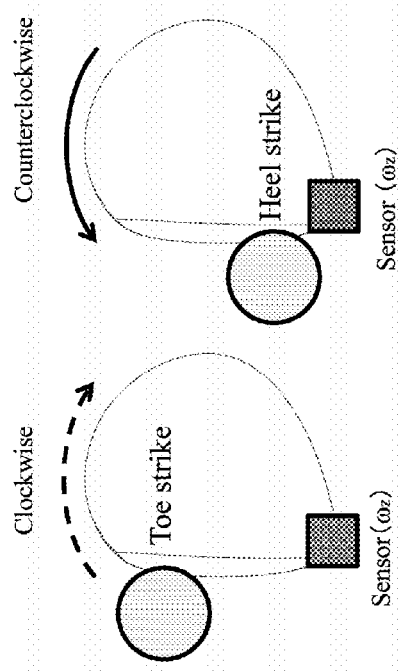
FIGS. 11A and 11B are diagrams illustrating the relationship between the strike point in the toe-heel direction and the amplitude of angular velocity about the z-axis.
Figure 11B:
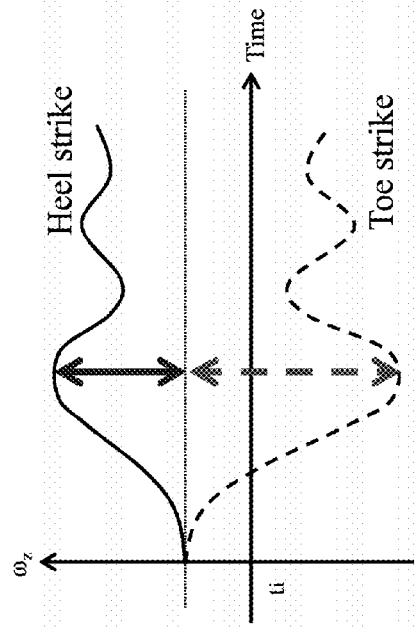

FIGS. 11A and 11B are diagrams illustrating the reason for calculating the above-mentioned feature amount $C_{th}$, in order to specify the impact position $D_{th}$ of the ball in the toe-heel direction. That is, the inventors hypothesized that the shaft 40 rotates clockwise about the z-axis which slopes relative to the toe-heel direction when the ball impacts at a position on the toe side of the face 41a, and rotates counterclockwise about the z-axis when the ball conversely impacts at a position on the heel side (see FIG. 11A). Under this hypothesis, the output value $\omega_z$ of the angular velocity sensor 12 that is fixed to the shaft 40 will take a negative value having a larger absolute value as the position at which the ball impacts shifts further to the toe side, and will take a positive value having a larger absolute value as the position at which the ball impacts shifts further to the heel side. This relationship will be as shown in FIG. 11B when represented by the waveform of the angular velocity $\omega_z$. Accordingly, the inventors realized that the amplitude of the angular velocity $\omega_z$ about the z-axis is correlated with the impact position $D_{th}$ of the ball in the toe-heel direction.

Figure 12:
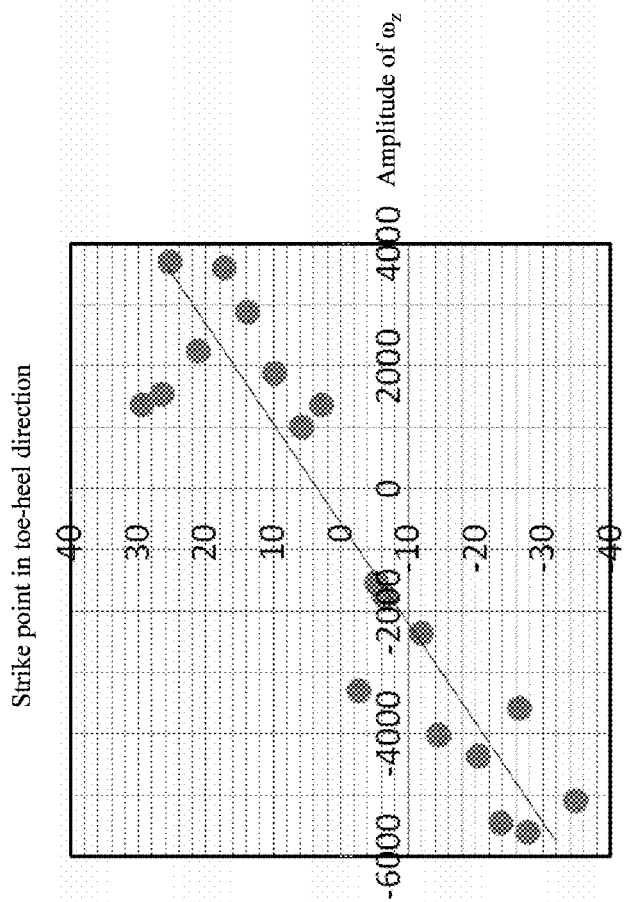
FIG. 12 is a graph showing the relationship between the strike point in the toe-heel direction and the amplitude of angular velocity about the z-axis.

The inventors verified this hypothesis through testing. To illustrate this specifically, FIG. 12 is a graph in which data collected when one golfer swung one golf club is plotted in a plane whose vertical axis is the strike point $D_{th}$ and whose horizontal axis is the amplitude of the angular velocity $\omega_z$. More precisely, the horizontal axis is the amplitude at the peak of the angular velocity $\omega_z$ in the analysis time interval of step S3. Also, the data shown in this graph is data collected at the time that approximately three balls were hit with each of the areas A to G shown in FIG. 6. Having calculated a correlation coefficient R of the strike point $D_{th}$ and the amplitude of the angular velocity $\omega_z$, a high value of R=0.9193 was obtained, thereby confirming the likelihood of the hypothesis. The regression equation at this time is as shown in FIG. 12. Also, the strike point $D_{th}$ was calculated by a system that uses a plurality of cameras, similarly to when the testing of FIGS. 8A to 10B was performed.

Figure 13:
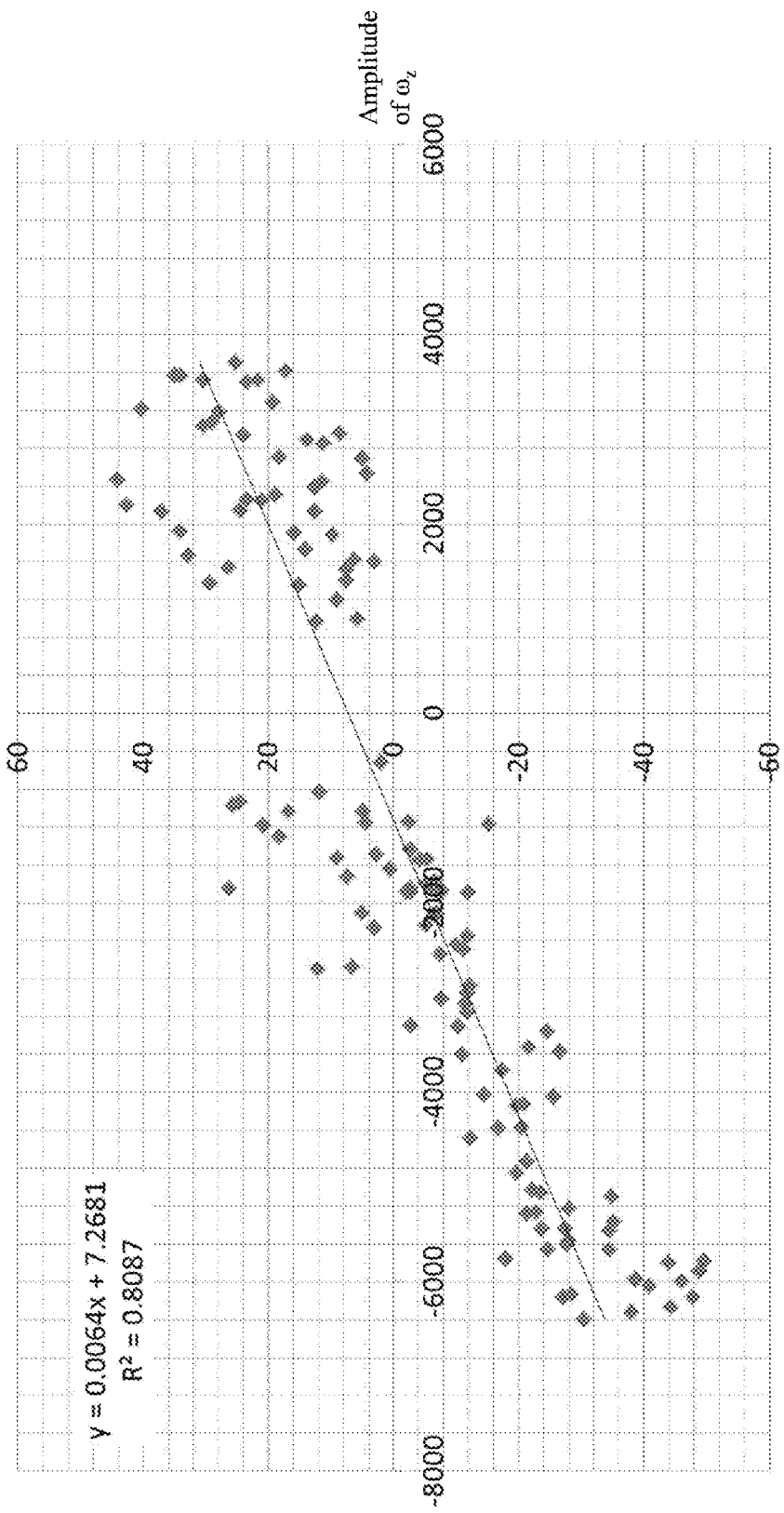
FIG. 13 is another graph showing the relationship between the strike point in the toe-heel direction and the amplitude of angular velocity about the z-axis.

FIG. 13 also shows similar verification results. FIG. 13 is a graph in which data collected when five golfers swung the same golf club is plotted in a plane whose vertical axis is the strike point $D_{th}$ and whose horizontal axis is the amplitude of the angular velocity $\omega_z$. More precisely, the horizontal axis is the amplitude at the peak of the angular velocity $\omega_z$ in the analysis time interval of step S3. Furthermore, the data shown in this graph is also data collected at the time that approximately the same number of balls were hit with each of the areas A to G. Also, the strike point $D_{th}$ was calculated by a system that uses a plurality of cameras, similarly to when the testing of FIGS. 8A to 10B was performed. The correlation coefficient R of the strike point $D_{th}$ and the amplitude of the angular velocity $\omega_z$ was also high at R=0.8993 in this case. The regression equation at this time is as shown in FIG. 13.

Figure 14:
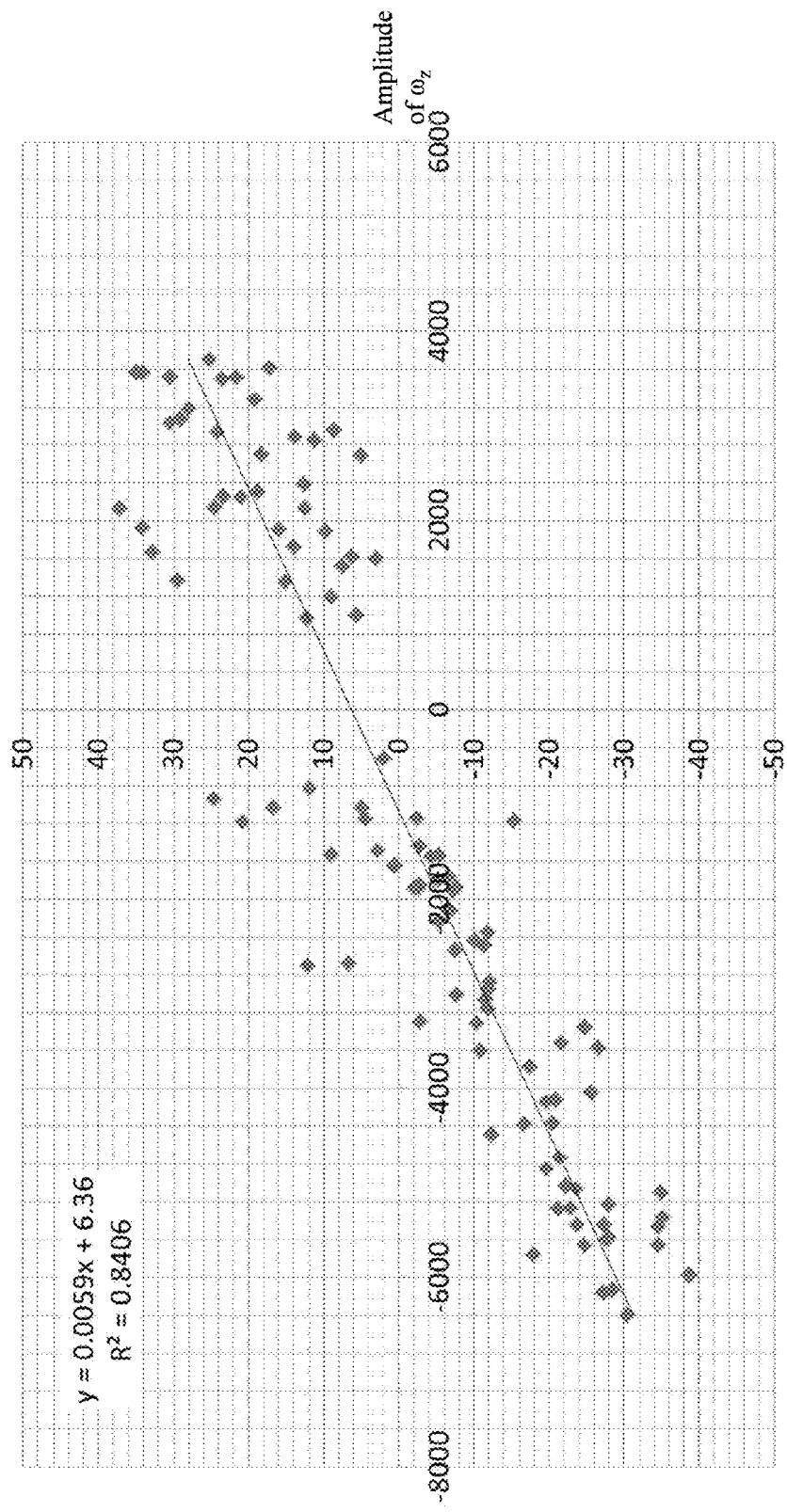
FIG. 14 is another graph showing the relationship between the strike point in the toe-heel direction and the amplitude of angular velocity about the z-axis.

Data collected at the time of a mishit is also included in the data of FIGS. 12 and 13. In view of this, the inventors further proceeded with verification, and having calculated the correlation coefficient R again after excluding, from the data shown in FIG. 13, data collected when the ball impacts within the mishit area (centered on the face center Fc) shown with dashed-dotted lines in FIGS. 8A and 8B, an even higher value of R=0.9168 was obtained. The regression equation at this time is as shown in FIG. 14.

The above verification confirmed that the strike point $D_{th}$ in the toe-heel direction is a value corresponding to the amplitude of the angular velocity $\omega_z$ immediately after impact, such as the above-mentioned feature amount $C_{th}$.

In the following step S5, the strike point estimation unit 24F estimates the impact position $D_{th}$ of the ball in the toe-heel direction on the face 41a, according to the feature amount $C_{th}$ calculated in step S4. More specifically, in the present embodiment, the impact position $D_{th}$ is calculated, in accordance with the following equation in which the impact position $D_{th}$ is the objective variable and the feature amount $C_{th}$ is an explanatory variable.

$$D_{th}=k_1 \cdot C_{th}+k_2$$

Here, coefficients $k_1$ and $k_2$ are the above-mentioned coefficient data 28. The values of the coefficients $k_1$ and $k_2$ are the values of the coefficients of a regression equation determined in advance after having conducted similar testing to the verification of FIGS. 12 to 14 on the golf club 4, and are prestored in the storage unit 23. Note that, in the present embodiment, since mishit determination is performed in step S2, the values of the coefficients $k_1$ and $k_2$ are preferably values derived with respect to a data group from which data collected at the time of a mishit has been omitted, similarly to the case of FIG. 14. Also, at the time of regression analysis for determining the coefficients $k_1$ and $k_2$, data collected at the time of a mishit may be sorted out with a similar method to step S2.

In the following step S6, the data derivation unit 24C derives time-series data (analytical data) of the angular velocity $\omega_x$ in an analysis time interval near impact, from the sensor data stored in the storage unit 23. The analysis time interval as referred to here is, in the present embodiment, a period from (impact time $t_i+T_3$) to (impact time $t_i+T_4$). For example, $T_3$=5 ms and $T_4$=10 ms can be set. Note that the analysis time interval may include impact time $t_i$ or may include a time interval before impact time $t_i$.

In the following step S7, the feature amount calculation unit 24E calculates a feature amount $C_{ts}$ of the waveform of the analytical data derived in step S6 to be used in specifying an impact position $D_{ts}$ of the ball in the top-sole direction on the face 41a. The feature amount $C_{ts}$ according to the present embodiment is a value obtained by subtracting time $t_{min}$ at which the amplitude is a minimum from time $t_{max}$ at which the amplitude is a maximum in the waveform of the analytical data derived in step S6.

Figure 15A:
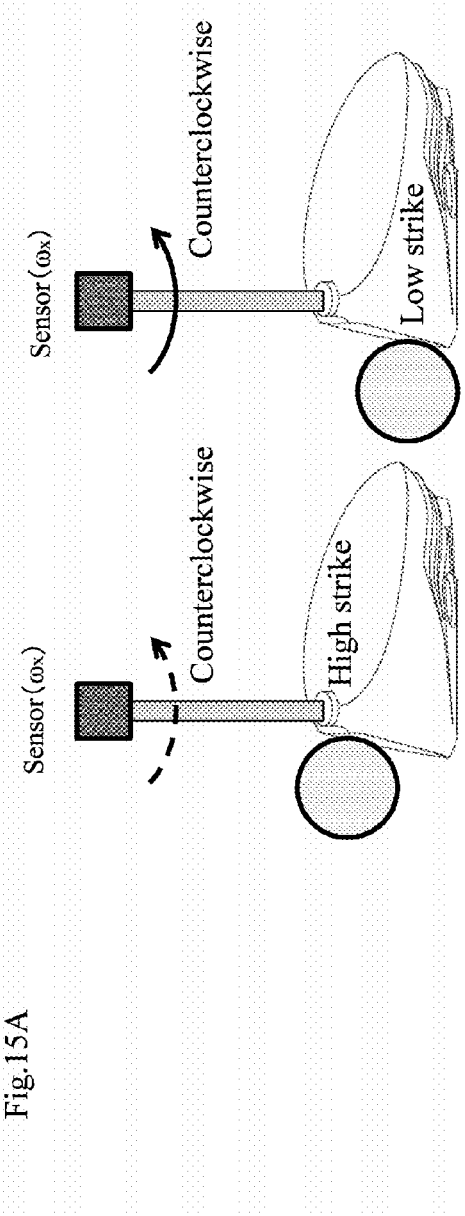
FIGS. 15A and 15B are diagrams illustrating the relationship between the strike point in the top-sole direction and an index dependant on the period of angular velocity about the x-axis.
Figure 15B:
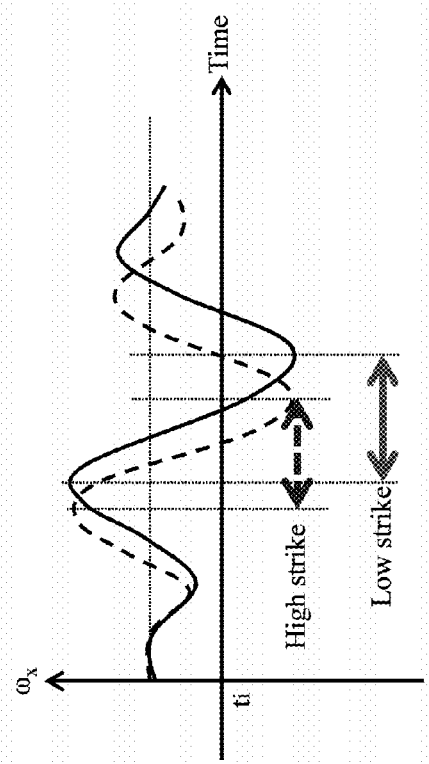

FIGS. 15A and 15B are diagrams illustrating the reason for calculating the above-mentioned feature amount $C_{ts}$, in order to specify the impact position $D_{ts}$ of the ball in the top-sole direction. It is thought that the rotation about the x-axis of the grip 42 is slowed down by impact. On the other hand, it is thought that the distal end of the shaft 40 on the head 41 side bends (deflects) counterclockwise at impact (see FIG. 15A). That is, the inventors hypothesized that the behavior of such a shaft 40 results in a second-order bending mode occurring in the shaft 40. Under this hypothesis, an impact at a position further up the face 41a shortens the distance from the strike point to the sensor 12, as compared with an impact at position lower down. Accordingly, it is thought that this increases the mode frequency of the shaft 40 (beam) at the impact time, and shortens the period of the waveform of the angular velocity $\omega_x$ about the x-axis that slopes relative to (is substantially orthogonal to) the top-sole direction. This relationship will be as shown in FIG. 15B when represented by the waveform of the angular velocity $\omega_x$. Accordingly, the inventors realized that the period of the waveform of the angular velocity $\omega_x$ about an x-axis or a length of time (hereinafter, may be referred to merely as a "period" for simplicity) that is dependent on this period is correlated with the impact position $D_{ts}$ of the ball in the top-sole direction.

Figure 16:
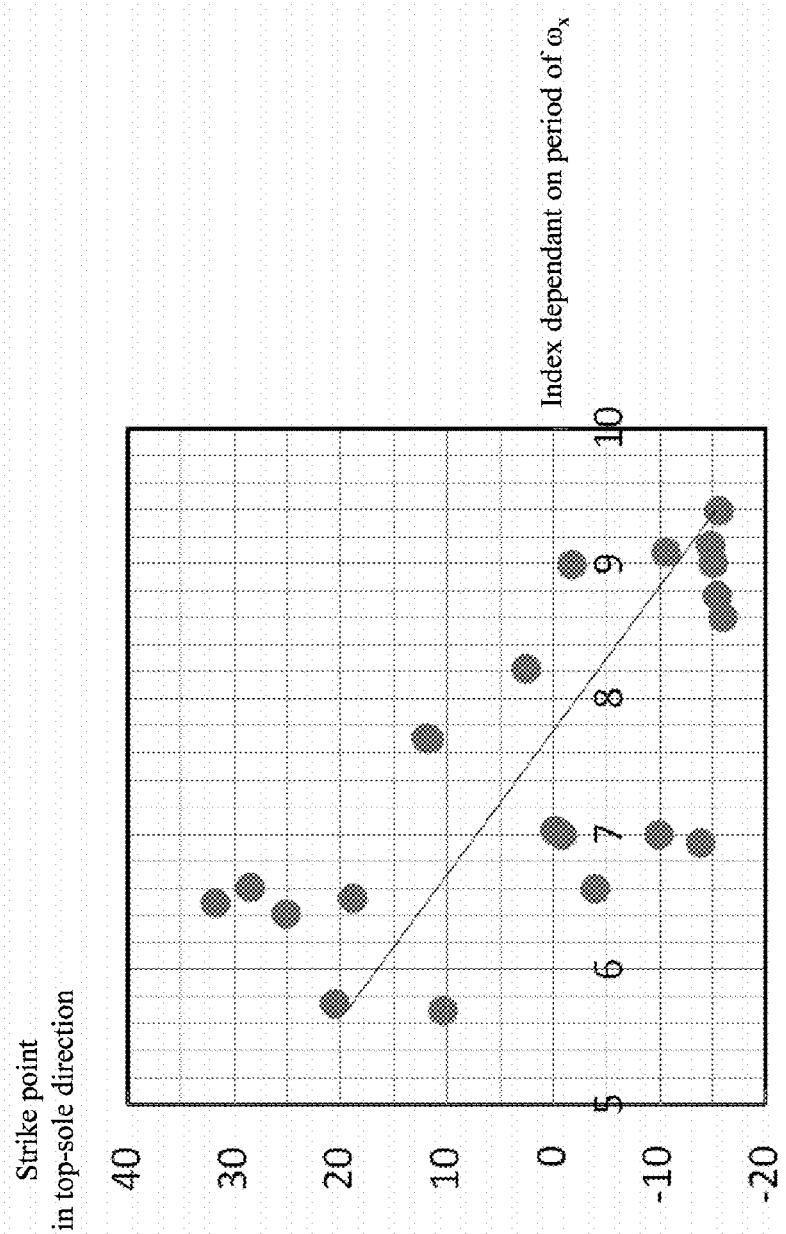
FIG. 16 is a graph showing the relationship between the strike point in the top-sole direction and an index dependant on the period of angular velocity about the x-axis.

The inventors verified the above hypothesis through testing. To illustrate this specifically, FIG. 16 is a graph in which data collected when one golfer swung one golf club is plotted in a plane whose vertical axis is the strike point $D_{ts}$ and whose horizontal axis is the period of the angular velocity $\omega_x$. More precisely, the horizontal axis is the time at which the minimum peak occurs after impact in the analysis time interval of step S6. Also, the data shown in this graph is data collected at the time that approximately three balls were hit with each of the areas A to G shown in FIG. 6. Having calculated the correlation coefficient R of the strike point $D_{ts}$ and the period of the angular velocity $\omega_x$, a high value of R=0.7017 was obtained, thereby confirming the likelihood of the hypothesis. The regression equation at this time is as shown in FIG. 16. The strike point $D_{ts}$ was also calculated by a system using a plurality of cameras, similarly to the testing of FIGS. 8A to 10B.

FIGS. 17A and 17B also show similar verification results. FIGS. 17A and 17B are graphs in which data collected when five golfers swung the same golf club is plotted in a plane whose vertical axis is the strike point $D_{ts}$ and whose horizontal axis is the period of the angular velocity $\omega_x$. More precisely, the horizontal axis is $t_{max}-t_{min}$. Also, the data that is shown in this graph is data collected when approximately the same number of balls are hit with each of the areas A to G. The strike point $D_{ts}$ was also calculated by a system using a plurality of cameras, similarly to the testing of FIGS. 8A to 10B.

Note that two graphs are shown in FIGS. 17A and 17B, namely, a graph in the case where the golf swing describes an inside-out path, and a graph in the case where the golf swing describes an outside-in path. That is, FIGS. 17A and 17B classify the above-mentioned data into an inside-out path and an outside-in path, and show the results obtained from verifying the correlation between the strike point $D_{ts}$ and the period of the angular velocity $\omega_x$, for each of these paths. In this case, the correlation coefficient R was R=0.7406 or R=0.8272, and was higher than the case of FIG. 16. The regression equations at this time are as shown in FIGS. 17A and 17B.

Figure 18A:
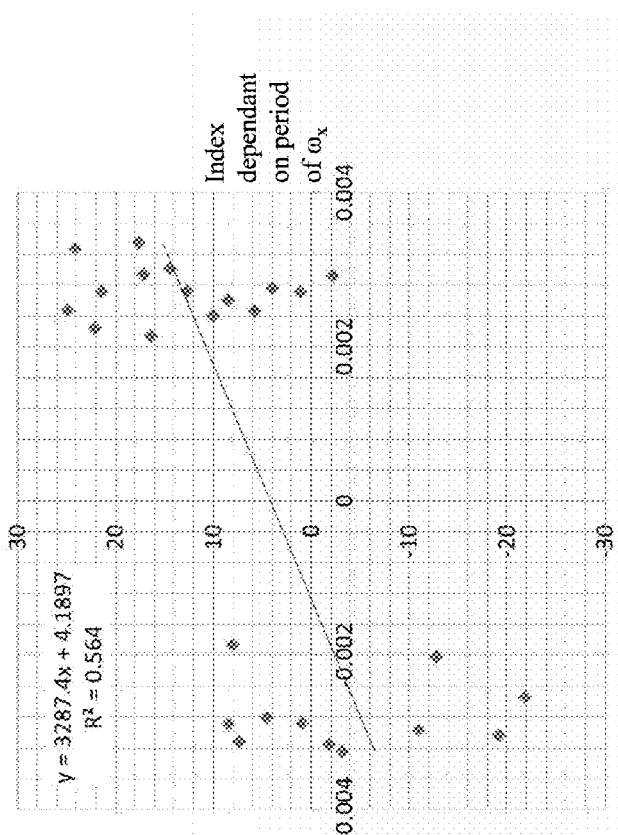
FIGS. 18A and 18B are other graphs showing the relationship between the strike point in the top-sole direction and an index dependant on the period of angular velocity about the x-axis.
Figure 18B:
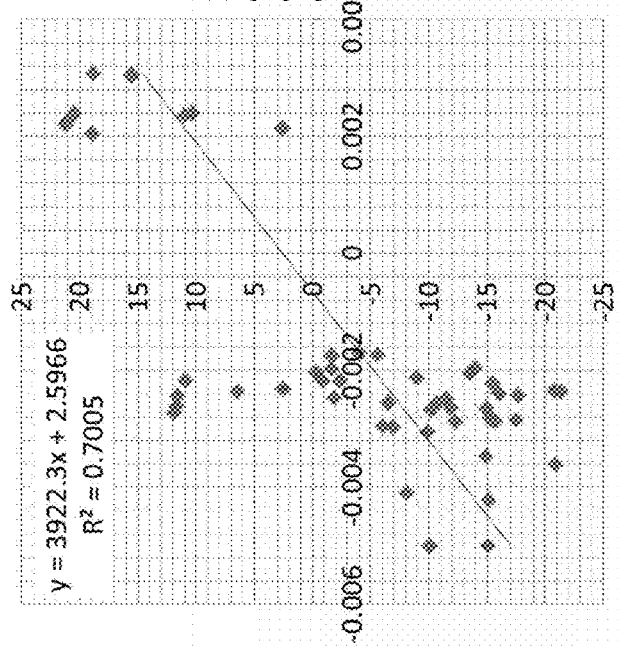

The data at the time of a mishit is also included in the data of FIGS. 16, 17A and 17B. In view of this, the inventors further proceeded with verification, and having calculated the correlation coefficient R again after excluding, from the data shown in FIGS. 17A and 17B, data collected when the ball impacts within the mishit area (centered on the face center Fc) shown with dashed-dotted lines in FIGS. 8A and 8B, even higher values of R=0.7510 or R=0.8370 were obtained. The regression equations at this time are as shown in FIGS. 18A and 18B.

The above verification confirmed that the strike point $D_{ts}$ in the top-sole direction is a value corresponding to a value that is dependent on the period of the angular velocity $\omega_x$ immediately after impact, such as the above-mentioned feature amount $C_{ts}$.

In the next step S8, the pattern classification unit 24D classifies the behavior of the head 41 at the time of a golf swing into a plurality of patterns, based on the sensor data stored in the storage unit 23. More specifically, in the present embodiment, the path of golf swing is derived and it is determined whether the path is an outside-in path or an inside-out path. In the case of the former, the processing advances to step S9, and in the case of the latter, the processing advances to step S10.

In steps S9 and S10, the strike point estimation unit 24F estimates the impact position $D_{ts}$ of the ball in the top-sole direction on the face 41a, according to the feature amount $C_{ts}$ calculated in step S7. More specifically, both of the steps are steps for calculating the impact position $D_{ts}$, in accordance with the following equation in which the impact position $D_{ts}$ is the objective variable and the feature amount $C_{ts}$ is an explanatory variable. The values of the coefficients $k_3$ and $k_4$ that are used in step S9 are, however, for an outside-in path, and the values of the coefficients $k_3$ and $k_4$ that are used in step S10 are for an inside-out path.

$$D_{ts} = k_3 \cdot C_{ts} + k_4$$

Note that the coefficients $k_3$ and $k_4$ are the above-mentioned coefficient data 28. The values of the coefficients $k_3$ and $k_4$ are the values of the coefficients of a regression equation that is determined in advance after having conducted similar testing to the verification of FIGS. 17A, 17B, 18A and 18B on the golf club 4, and are prestored in the storage unit 23. Note that, in the present embodiment, since mishit determination is performed in step S2, the values of the coefficients $k_3$ and $k_4$ are preferably values derived with respect to a data group from which data collected at the time of a mishit has been omitted, similarly to the case of FIGS. 18A and 18B. Also, at the time of regression analysis for determining the coefficients $k_3$ and $k_4$, data collected at the time of a mishit may be sorted out with a similar method to step S2.

The processing advances to step S11 when steps S9 and S10 end. In step S11, the display control unit 24G displays information on the strike points $D_{th}$ and $D_{ts}$ calculated in step S5 and steps S9 and S10 on the display unit 21. Also, the display control unit 24G judges which of the areas A to G the strike point belongs to, and displays information showing such an area on the display unit 21. The strike point estimation processing ends when step S11 ends.

1-2-3. Head Path Derivation Processing

Figure 19:
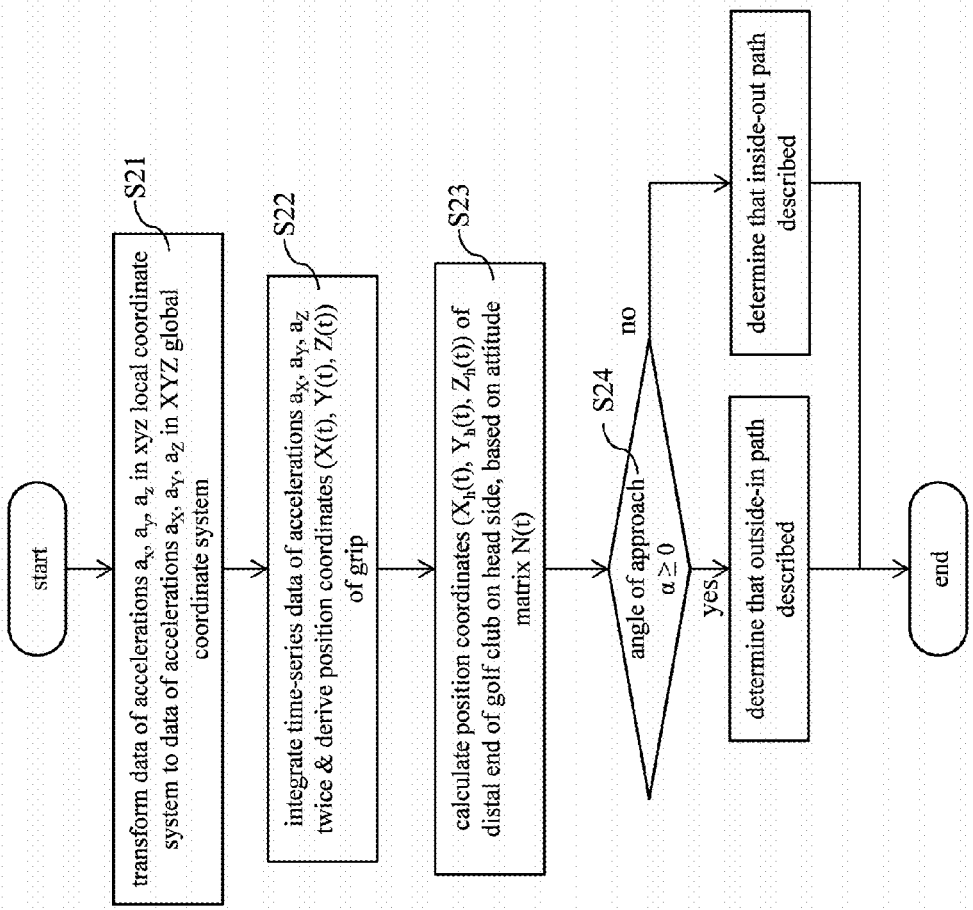
FIG. 19 is a flowchart showing the flow of path specification processing.

Hereinafter, exemplary path specification processing for specifying a pattern of the path of the golf swing in step S8 will be shown, with reference to FIG. 19.

First, in the path specification processing, the time-series sensor data relating to the accelerations $a_x$, $a_y$ and $a_z$ in the xyz local coordinate system stored in the storage unit 23 is transformed into values in an XYZ global coordinate system (step S21). Note that the XYZ global coordinate system is a three-axis orthogonal coordinate system defined as shown in FIG. 1. That is, the Z-axis extends vertically upward from below, the X-axis extends from the back of the golfer 7 toward his or her abdomen, and the Y-axis extends in a direction from the ball hitting point toward the target point in parallel to the horizontal plane.

Specifically, in step S21, an attitude matrix N(t) at an arbitrary time t after address is calculated. Here, assume that the attitude matrix is represented by the following equation. The attitude matrix N(t) is a matrix for transforming the XYZ global coordinate system at time t into the xyz local coordinate system.

$$N(t) = \begin{pmatrix} a & b & c \\ d & e & f \\ g & h & i \end{pmatrix}^T \qquad \text{Equation 1}$$

The nine components of the attitude matrix N(t) are as follows:

Component a: cosine of the angle formed by the X-axis of the global coordinate system and the x-axis of the local coordinate system Component b: cosine of the angle formed by the Y-axis of the global coordinate system and the x-axis of the local coordinate system Component c: cosine of the angle formed by the Z-axis of the global coordinate system and the x-axis of the local coordinate system Component d: cosine of the angle formed by the X-axis of the global coordinate system and the y-axis of the local coordinate system Component e: cosine of the angle formed by the Y-axis of the global coordinate system and the y-axis of the local coordinate system Component f: cosine of the angle formed by the Z-axis of the global coordinate system and the y-axis of the local coordinate system Component g: cosine of the angle formed by the X-axis of the global coordinate system and the z-axis of the local coordinate system Component h: cosine of the angle formed by the Y-axis of the global coordinate system and the z-axis of the local coordinate system Component i: cosine of the angle formed by the Z-axis of the global coordinate system and the z-axis of the local coordinate system Here, a vector (a, b, c) represents the unit vector in the x-axis direction, a vector (d, e, f) represents the unit vector in the y-axis direction, and a vector (g, h, i) represents the unit vector in the z-axis direction.

Also, the attitude matrix N(t) can be represented by the following equation in accordance with the thinking of the Z-Y-Z system of Euler angles. Note that $\phi$, $\theta$ and $\psi$ are the angles of rotation about the Z-axis, the Y-axis, and the Z-axis.

Equation 2

$$N(t) = \begin{bmatrix} \cos\phi\cos\theta\cos\varphi - \sin\phi\sin\varphi & -\cos\phi\cos\theta\sin\varphi - \sin\phi\cos\varphi & \cos\phi\sin\theta \\ \sin\phi\cos\theta\cos\varphi + \cos\phi\sin\varphi & -\sin\phi\cos\theta\sin\varphi + \cos\phi\cos\varphi & \sin\phi\sin\theta \\ -\sin\theta\cos\varphi & \sin\theta\sin\varphi & \cos\theta \end{bmatrix}$$

In calculating the attitude matrix N(t) after address, first an attitude matrix $N(t_a)$ at address time $t_a$ is calculated. Specifically, $\phi$ and $\theta$ at the address time are calculated, in accordance with the following equations. Note that the following equations utilize the fact that, at the address time, the golf club 4 is stationary and only gravity in the vertical direction is detected by the acceleration sensor 11. The accelerations $a_x$, $a_y$ and $a_z$ in the following equations are values at the address time.

$$\phi = \tan^{-1}\left(\frac{a_y}{a_x}\right) \quad \text{Equation 3}$$

$$\theta = \tan^{-1}\left(\frac{\sqrt{a_x^2 + a_y^2}}{a_z}\right) \quad \text{Equation 4}$$

Next, ψ at the address time is calculated, in accordance with the following equation.

$$\varphi = \tan^{-1}\left(\frac{-m_{yi}}{m_{xi}}\right) \quad \text{Equation 5}$$

Note that the values of $m_{xi}$ and $m_{yi}$ in the above equation are calculated in accordance with the following equation. Also, the geomagnetisms $m_x$, $m_y$ and $m_z$ in the following equation are values at the address time.

$$\begin{bmatrix} m_{xi} \\ m_{yi} \\ m_{zi} \end{bmatrix} = \begin{bmatrix} \cos\theta\cos\phi & -\cos\theta\sin\phi & \sin\theta \\ \sin\phi & \cos\phi & 0 \\ -\sin\theta\cos\phi & \sin\theta\sin\phi & \cos\theta \end{bmatrix} \begin{bmatrix} m_x \\ m_y \\ m_z \end{bmatrix} \quad \text{Equation 6}$$

As described above, $\phi$, $\theta$ and ψ at the address time are calculated based on the accelerations $a_x$, $a_y$ and $a_z$ and the geomagnetisms $m_x$, $m_y$ and $m_z$ in the xyz local coordinate system. The attitude matrix $N(t_a)$ at the address time is calculated by substituting the values of $\phi$, $\theta$ and ψ into equation 2.

Next, the attitude matrix N(t) after address is calculated by updating the attitude matrix $N(t_a)$ at the address time momentarily at intervals of the sampling period Δt. To illustrate this specifically, first, the attitude matrix N(t) is represented by the following equation, using the four variables $q_1$, $q_2$, $q_3$ and $q_4$ ($q_4$ being the scalar part) of a quaternion.

Equation 7

$$N(t) = \begin{pmatrix} q_1^2 - q_2^2 - q_3^2 + q_4^2 & 2(q_3q_4 + q_1q_2) & 2(q_1q_3 - q_2q_4) \\ 2(q_1q_2 - q_3q_4) & -q_1^2 + q_2^2 - q_3^2 + q_4^2 & 2(q_1q_4 + q_2q_3) \\ 2(q_2q_4 + q_1q_3) & 2(q_2q_3 - q_1q_4) & -q_1^2 - q_2^2 + q_3^2 + q_4^2 \end{pmatrix}$$

Accordingly, the four variables q1, q2, q3 and q4 of the quaternion can be calculated from equations 1 and 7, in accordance with the following equation.

$$q_4 = \pm\frac{1}{2}\sqrt{1 + a + e + i} \quad \text{Equation 8}$$
$$q_1 = (h - f)/4q_4$$
$$q_2 = (c - g)/4q_4$$
$$q_3 = (d - b)/4q_4$$

Here, the values of a to i defining the attitude matrix $N(t_a)$ at the address time are known. Therefore, first, the four variables q1, q2, q3 and q4 of the quaternion at the address time are calculated, in accordance with the above equation.

A quaternion q' after a short amount of time has elapsed from time t is then represented by the following equation using the quaternion q at time t.

$$q' = qdq \quad \text{Equation 9}$$
$$dq = \int \frac{d}{dt}q dt$$

Also, a first order differential equation representing the time variation of the four variables q1, q2, q3 and q4 of the quaternion is represented by the following equation.

$$\frac{d}{dt}\begin{pmatrix} q_1 \\ q_2 \\ q_3 \\ q_4 \end{pmatrix} = \frac{1}{2}\begin{pmatrix} 0 & \omega_z & -\omega_y & \omega_x \\ -\omega_z & 0 & \omega_x & \omega_y \\ \omega_y & -\omega_x & 0 & \omega_z \\ -\omega_x & -\omega_y & -\omega_z & 0 \end{pmatrix}\begin{pmatrix} q_1 \\ q_2 \\ q_3 \\ q_4 \end{pmatrix} \quad \text{Equation 10}$$

The quaternion at time t can be sequentially updated to a quaternion at the following time t+Δt by using equations 9 and 10. Here, the quaternions after address are calculated. The attitude matrix N(t) after address is calculated by sequentially substituting the four variables q1, q2, q3 and q4 of the quaternions after address into equation 7.

Next, the time-series data of the accelerations $a_x$, $a_y$ and $a_z$ in the xyz local coordinate system after address is transformed into time-series data in the XYZ global coordinate system, based on the attitude matrix N(t) after address. The accelerations $a_X$, $a_Y$ and $a_Z$ after transformation are calculated in accordance with the following equation.

$$(a_x, a_y, a_z)^T = [N(t)]^T(a_x, a_y, a_z)^T \quad \text{Equation 11}$$

In the following step S22, velocities $v_X$, $v_Y$ and $v_Z$ in the XYZ global coordinate system after address are derived, by integrating the time-series data of the accelerations $a_X$, $a_Y$ and $a_Z$. At this time, offsetting is preferably performed so that the velocities $v_X$, $v_Y$ and $v_Z$ from address to impact will be 0 m/s at the top. For example, the offsetting at the arbitrary time t is performed by subtracting (velocities $v_X$, $v_Y$ and $v_Z$ at top time $t_t$)×t/($t_t - t_a$) from the velocities $v_X$, $v_Y$ and $v_Z$ at the arbitrary time t.

Also, the time-series data of position coordinates (X(t), Y(t), Z(t)) of the grip 42 in the XYZ global coordinate system after address is derived by integrating the time-series data of speed $v_X$, $v_Y$, and $v_Z$.

Next, in step S23, position coordinates $(X_h(t), Y_h(t), Z_h(t))$ at the distal end of the golf club 4 on the head side in the XYZ global coordinate system after address are calculated. Specifically, the position coordinates $(X_h(t), Y_h(t), Z_h(t))$ are calculated in accordance with the following equation, using the attitude matrix N(t). Note that L is the length of the golf club 4, and (0, 0, L) represent the position of the distal end of the golf club 4 on the head side in the xyz local coordinate system.

$$(X_h(t)Y_h(t)Z_h(t))^T = [N(t)]^T (000L)^T \quad \text{Equation 12}$$

Next, the position coordinates $(X_h(t), Y_h(t), Z_h(t))$ at the distal end of the golf club 4 are corrected by being translated by the position coordinates (X(t), Y(t), Z(t)) of the grip 42, in accordance with the following equation. Hereinafter, the position coordinates at the distal end of the golf club 4 after correction will also be represented as $(X_h(t), Y_h(t), Z_h(t))$.

$$(X_h(t), Y_h(t), Z_h(t)) = (X(t), Y(t), Z(t)) + (X_h(t), Y_h(t), Z_h(t)) \quad \text{Equation 13}$$

Figure 20B:
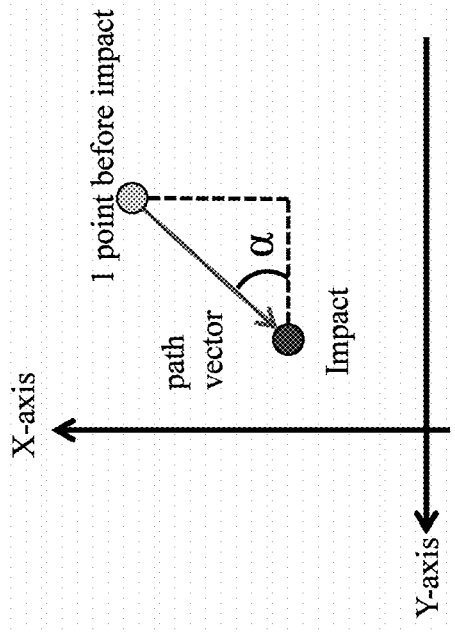
FIGS. 20A and 20B are diagrams illustrating an algorithm of path specification processing.
Figure 20A:
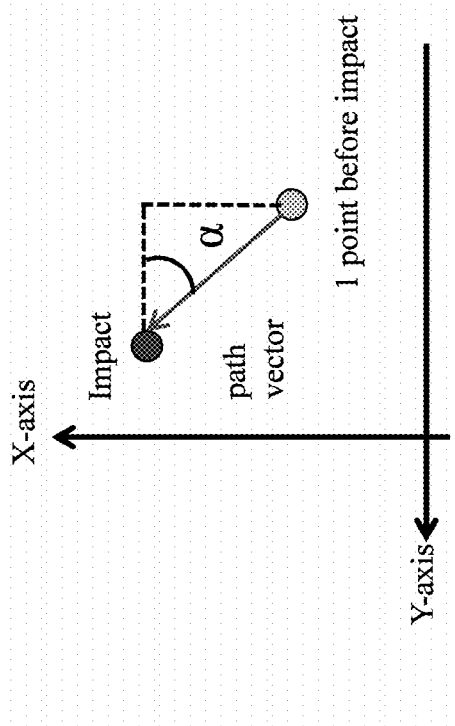

Next, in step S24, an angle of approach a of the golf club relative to a direction (target line direction) parallel to the Y-axis in a X-Y plane applied from time $t_{i-1}$ immediately before impact to impact time $t_i$ is calculated (see FIGS. 20A and 20B). α is calculated, in accordance with the following equation.

$$\alpha = \tan^{-1}\left(\frac{X(t_{i-1}) - X(t_i)}{Y(t_i) - Y(t_{i-1})}\right) \quad \text{Equation 14}$$

In step S24, it is determined that the golf swing describes an outside-in path if α=0 or α>0, and describes inside-out path if α<0.

2. Second Embodiment

Hereinafter, a swing analysis system that is provided with a golf swing analysis apparatus according to a second embodiment will be described. The swing analysis system according to the present embodiment has many points in common with the analysis system 100 according to the first embodiment, and mainly differs in that different strike point estimation processing is executed. Accordingly, for simplicity, the following description will focus on the differences between both embodiments, and configuration that is the same will be given the same reference signs and description thereof omitted.

The main difference in the strike point estimation processing according to the first and second embodiments is that, in the first embodiment, the impact positions $D_{th}$ and $D_{ts}$ of the ball are respectively calculated from single feature amounts $C_{th}$ and $C_{ts}$ using a single regression equation, whereas, in the second embodiment, the impact positions $D_{th}$ and $D_{ts}$ of the ball are respectively calculated from a plurality of feature amounts $C_{th1}, C_{th2}, \ldots, C_{thN}$ and $C_{ts1}, C_{ts2}, \ldots, C_{tsM}$ (where N and M are integers of two or more) using a multiple regression equation. The types of feature amounts also differ. The feature amounts for strike point estimation according to the second embodiment include feature amounts of the spectrums of the accelerations $a_x$, $a_y$ and $a_z$ and the angular velocities $\omega_x$, $\omega_y$ and $\omega_z$. Hereinafter, this processing will be specifically described.

2-1. Strike Point Estimation Processing

FIG. 21 shows a flowchart showing the flow of strike point estimation processing according to the present embodiment. In the present embodiment, coordinates ($D_{th}$, $D_{ts}$) of the strike point in a $D_{th}$-$D_{ts}$ plane that is defined on the face 41a are specified. In the $D_{th}$-$D_{ts}$ plane, the direction from the toe side to the heel side is the positive $D_{th}$-axis direction, and the direction from the sole side to the top side is the positive $D_{ts}$-axis direction, with the origin being at the face center Fc.

The strike point estimation processing in the present embodiment also starts when the data collection processing has ended, the sensor data has been stored in the storage unit 23, and the user has instructed execution of the strike point estimation processing. The initial steps S1 and S2 are similar to the first embodiment. Also, the execution of step S12 if it is determined in step S2 that the golf swing is a mishit is similar to the first embodiment. On the other hand, in the present embodiment, in the case where it is determined in step S2 that the golf swing is not a mishit, the processing advances to step S31.

In step S31, the data derivation unit 24C derives time-series data (analytical data) of the accelerations $a_x$, $a_y$ and $a_z$ and the angular velocities $\omega_x$, $\omega_y$ and $\omega_z$ in an analysis time interval near impact, from the sensor data stored in the storage unit 23. The analysis time interval as referred to here is, in the present embodiment, a time interval from impact time $t_i$ until (impact time $t_i + T_5$). For example, $T_5 = 500$ ms can be set. Note that the analysis time interval may include a time interval before impact time $t_i$.

In the following step S32, the feature amount calculation unit 24E performs spectral analysis on the analytical data of the accelerations $a_x$, $a_y$ and $a_z$ and the angular velocities $\omega_x$, $\omega_y$ and $\omega_z$. Specifically, a fast Fourier transform is performed on the analytical data derived in step S31 representing the waveforms of the accelerations $a_x$, $a_y$ and $a_z$ and the angular velocities $\omega_x$, $\omega_y$ and $\omega_z$, and spectrums (including amplitude spectrums and phase spectrums) for each of the accelerations $a_x$, $a_y$ and $a_z$ and the angular velocities $\omega_x$, $\omega_y$ and $\omega_z$ are derived. Note that, in the present embodiment, spline interpolation of the analytical data derived in step S31 is performed before performing spectral analysis. Spectral analysis can thereby be performed based on accurate waveforms of the accelerations $a_x$, $a_y$ and $a_z$ and the angular velocities $\omega_x$, $\omega_y$ and $\omega_z$, even in the case where out-of-range data is included in the analytical data derived in step S31. Also, in the present embodiment, the analytical data that has undergone spline interpolation is subdivided. Highly accurate spectral analysis results can thereby be obtained, even if the sampling period Δt of the sensor data is coarse. For example, in the case where sampling period Δt=1 ms, the analytical data are subdivided into 0.1 ms intervals.

In the following step S33, the feature amount calculation unit 24E calculates feature amounts $C_{th1}, C_{th2}, \ldots, C_{thN}$ and $C_{ts1}, C_{ts2}, \ldots, C_{tsM}$ of the waveforms of the analytical data derived in step S31. The feature amounts $C_{th1}, C_{th2}, \ldots, C_{thN}$ are feature amounts for estimating the impact position $D_{th}$ of the ball in the toe-heel direction, and the feature amounts $C_{ts1}, C_{ts2}, \ldots, C_{tsM}$ are feature amounts for estimating the impact position $D_{ts}$ of the ball in the top-sole direction. Also, these feature amounts $C_{th1}, C_{th2}, \ldots, C_{thN}$ and $C_{ts1}, C_{ts2}, \ldots, C_{tsM}$ include feature amounts of the spectrums of the analytical data derived in step S32. The feature amounts $C_{th1}, C_{th2}, \ldots, C_{thN}$ and $C_{ts1}, C_{ts2}, \ldots, C_{tsM}$ will be collectively discussed in detail later.

In the following steps S34 to S36, the pattern classification unit 24D classifies the impact positions of the ball on the face 41a into a plurality of regions, based on the results of the spectral analysis in step S32. The plurality of regions as referred to here are, in the present embodiment, three regions in the toe-heel direction, namely, a region on the toe side, a region on the heel side, and a region near the face center Fc.

Figure 22:
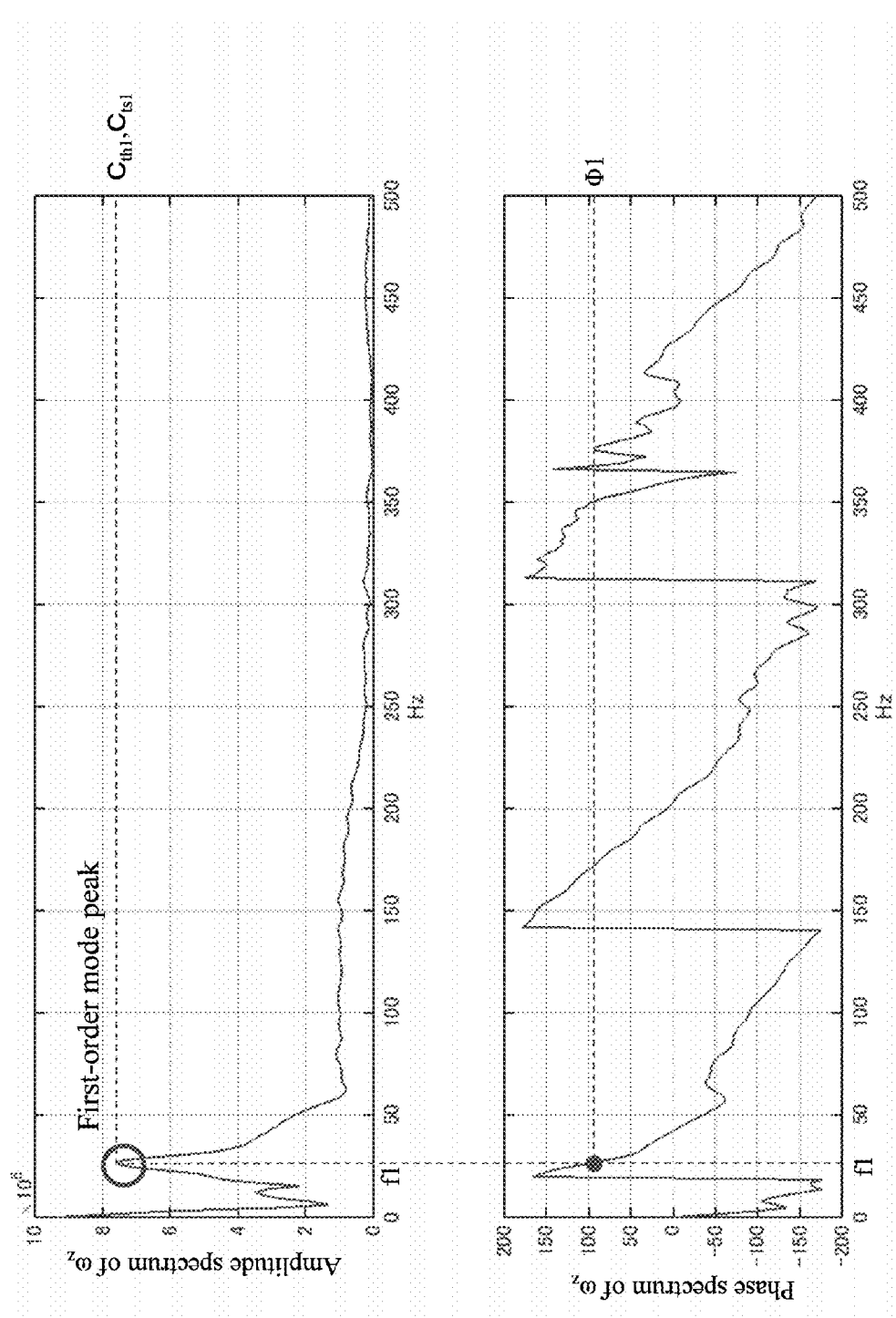
FIG. 22 is a diagram illustrating a first feature amount according to the second embodiment.

More specifically, first, in step S34, the pattern classification unit 24D derives a first-order mode peak frequency f1, that is, a first-order natural frequency f1, based on the amplitude spectrum of the analytical data of the angular velocity $\omega_z$ (see FIG. 22). If f1 is greater than or equal to a predetermined value, which is 40 Hz in the present embodiment, it is determined that the impact position of the ball is included in a region near the face center Fc, and the processing is advanced to step S41. If this is not the case, the processing is advanced to step S35. As will be discussed in detail later, in step S41 and the following step S42, strike point estimation is performed using a regression equation suitable for strike point estimation in the region near the face center Fc. Note that in the case where the impact of the ball occurs near the face center Fc in the toe-heel direction, the torsion mode tends not to occur in the head 41 or the shaft 40. Also, although there are differences according to the type of golf club, the first-order peak frequency in the torsion mode will generally be roughly 25 Hz. Accordingly, in the case where the first-order peak frequency f1 diverges greatly from this value, it can be estimated that the ball impacted near the face center Fc in the toe-heel direction. Step S34 utilizes this principle.

In step S35, the pattern classification unit 24D derives a phase angle $\phi 1$ corresponding to the first-order mode peak frequency f1, based on the phase spectrum of the analytical data of the angular velocity $\omega_z$ (see FIG. 22). In the case where $\phi 1$ is within a predetermined range (in the present embodiment, $-30° \le \phi 1 \le 30$), it is determined that the impact position of the ball is included in a region near the face center Fc, and the processing is advanced to step S41. If this is not the case, the processing is advanced to step S36. Note that it is thought that, in the case where the ball impacts at a position shifted to the toe side from the face center Fc in the toe-heel direction and in the case where the ball impacts at a position shifted to the heel side from the face center Fc in the toe-heel direction, the waveform of analytical data occurs depending on the torsion period in which the phase angles $\phi 1$ are shifted 90 degrees to each other. In contrast, in the case where the ball impacts near the face center Fc, the phase angle $\phi 1$ will be near 0 degrees. Accordingly, in the case where the phase angle $\phi 1$ is near 0 degrees, which here is $-30° \le \phi 1 \le 30°$, it can be estimated that the ball impacted near the face center Fc in the toe-heel direction.

In step S36, the pattern classification unit 24D determines whether the phase angle $\phi 1$ corresponding to the first-order mode peak frequency f1 is greater than or equal to a predetermined value, which is 0 degrees in the present embodiment. In the case of the former, it is determined that the impact position of the ball is included in the region on the toe side, and the processing is advanced to step S37. In the case of the latter, it is determined that the impact position of the ball is included in the region on the heel side, and the processing is advanced to step S39. As will be discussed in detail later, in step S37 and the following step S38, strike point estimation is performed using a regression equation suitable for strike point estimation in the region on the toe side, and in step S39 and the following step S40, strike point estimation is performed, using a regression equation suitable for strike point estimation in the region on the heel side. Note that it is thought that a waveform of analytical data in which the phase angle $\phi 1$ is positive occurs in the case where the ball impacts at a position shifted to the toe side from the face center Fc, and that a waveform of the analytical data in which the phase angle $\phi 1$ is negative occurs in the case where the ball impacts at a position shifted to the heel side. Accordingly, it can be estimated on which of the toe side or the heel side of the face center Fc the ball impacted by whether the phase angle $\phi 1$ is positive or negative.

In steps S37, S39 and S41, the strike point estimation unit 24F estimates the impact position $D_{th}$ of the ball in the toe-heel direction on the face 41a, according to the feature amounts $C_{th1}, C_{th2}, \ldots, C_{thN}$ calculated in step S33. More specifically, in all of the steps, the impact position $D_{th}$ is calculated in accordance with the following equation in which the impact position $D_{th}$ is the objective variable and the feature amounts $C_{th1}, C_{th2} \ldots, C_{thN}$ are explanatory variables. However, the values of the coefficients $k_{th0}, k_{th1}, k_{th2}, \ldots, k_{thN}$ that are used in step S37 are coefficients of a multiple regression equation suitable for strike point estimation in the case where the strike point of the ball is included in the region on the toe side. The values of the coefficients $k_{th0}, k_{th1}, k_{th2}, \ldots, k_{thN}$ that are used in step S39 are coefficients of a multiple regression equation suitable for strike point estimation in the case where the strike point of the ball is included in the region on the heel side. The values of the coefficients $k_{th0}, k_{th1}, k_{th2}, \ldots, k_{thN}$ that are used in step S41 are values of a multiple regression equation suitable for strike point estimation in the case where the strike point of the ball is included in the region near the face center Fc.

$$D_{th}=k_{th0}+k_{th1} \cdot C_{th1}+k_{th2} \cdot C_{th2}+ \ldots +k_{thN} \cdot C_{thN} \qquad (1)$$

The values of the coefficients $k_{th0}, k_{th1}, k_{th2}, \ldots, k_{thN}$ are calculated through testing and prestored in the storage unit 23 as the coefficient data 28. Specifically, the coefficient $k_{th0}, k_{th1}, k_{th2}, \ldots, k_{thN}$ are specified by taking a large number of test hits, calculating the impact position $D_{th}$ and the feature amounts $C_{th1}, C_{th2}, \ldots, C_{thN}$ at the time of each test hit, and performing multiple regression analysis thereon. The strike point $D_{th}$ is calculated by a system using a plurality of cameras, similarly to the testing of FIGS. 8A to 10B, for example. Also, in this testing, the data at the time of each test hit is classified as being included to the region on the toe side, being included to the region on the heel side, or being included in the region near the face center Fc, in accordance with the same algorithm as steps S34 to S36. Multiple regression analysis is then executed for each of these three cases, and the coefficients $k_{th0}, k_{th1}, k_{th2}, \ldots, k_{thN}$ for use in strike point estimation suitable for each case are calculated. Also, in the present embodiment, since mishit determination is performed in step S2, it is preferable to execute multiple regression analysis on a data group that omits data collected at the time of a mishit.

Similarly, in steps S38, S40 and S42 that follow steps S37, S39 and S41, the strike point estimation unit 24F estimates the impact position $D_{ts}$ of the ball in the top-sole direction on the face 41a, according to the feature amounts $C_{ts1}, C_{ts2}, \ldots, C_{tsM}$ calculated in step S33. More specifically, in all of these steps, the impact position $D_{ts}$ is calculated in accordance with the following equation in which the impact position $D_{ts}$ is the objective variable and the feature amounts $C_{ts1}, C_{ts2}, \ldots, C_{tsM}$ are explanatory variables. The values of the coefficients $k_{ts0}, k_{ts1}, k_{ts2}, \ldots, k_{tsM}$ that are used in step S38 are, however, coefficients of a multiple regression equation suitable for strike point estimation in the case where the strike point of the ball is included in the region on the toe side. The values of the coefficients $k_{ts0}, k_{ts1}, k_{ts2}, \ldots, k_{tsM}$ that are used in step S40 are coefficients of a multiple regression equation suitable for strike point estimation in the case where the strike point of the ball is included in the region on the heel side. The values of the coefficients $k_{ts0}$, $k_{ts1}$, $k_{ts2}$, ..., $k_{tsM}$ that are used in step S42 are coefficients of a multiple regression equation suitable for strike point estimation in the case where the strike point of the ball is included in the region near the face center Fc.

$$D_{ts} = k_{ts0} + k_{ts1} \cdot C_{ts1} + k_{ts2} \cdot C_{ts2} + \ldots + k_{tsM} \cdot C_{tsM} \quad (2)$$

The values of the coefficients $k_{ts0}$, $k_{ts1}$, $k_{ts2}$, ..., $k_{tsM}$ are calculated through testing and prestored in the storage unit 23 as the coefficient data 28. Specifically, the coefficients $k_{ts0}$, $k_{ts1}$, $k_{ts2}$, ..., $k_{tsM}$ are specified by taking a large number of test hits, calculating the impact position $D_{ts}$ and the feature amounts $C_{ts1}$, $C_{ts2}$, ..., $C_{tsM}$ at the time of each test hit, and performing multiple regression analysis thereon. The strike point $D_{ts}$ is calculated by a system using a plurality of cameras, similarly to the testing of FIGS. 8A to 10B, for example. Also, in this testing, the data at the time of each test hit is classified, based on this strike point $D_{ts}$, as being one of the case where the strike point is included in the region on the toe side, the case where the strike point included to the region on the heel side, and the case where the strike point is included in the region near the face center Fc. Multiple regression analysis is executed for each of these three cases, and the coefficients $k_{ts0}$, $k_{ts1}$, $k_{ts2}$ ... $k_{tsM}$ for use in strike point estimation and suitable for each of these cases are calculated. Also, in the present embodiment, since mishit determination is performed in step S2, it is preferable to perform multiple regression analysis on a data group that omits data collected at the time of a mishit.

Note that all of the feature amounts $C_{th1}$, $C_{th2}$, ..., $C_{thN}$ that are used in estimating the strike point $D_{th}$ do not necessarily need to have a high correlation with the strike point $D_{th}$. Even if there are some feature amounts that have a low correlation, the coefficients $k_{thi}$ of the multiple regression equation corresponding to such feature amounts are, in that case, set to a small value. Accordingly, the accuracy of estimated value of the strike point $D_{th}$ is maintained, as long as there are at least some feature amounts that have a high correlation. Feature amounts $C_{thi}$ having a low correlation may, of course, be omitted from the multiple regression equation. The same also applies to the feature amounts $C_{ts1}$, $C_{ts2}$, ..., $C_{tsM}$ for estimating the strike point $D_{ts}$.

The processing advances to step S11 when steps S38, S40 and S42 end. In step S11, the display control unit 24G causes the display unit 21 to display information on the strike point $D_{th}$ and $D_{ts}$ calculated in steps S37 to S42. The strike point estimation processing ends when step S11 ends.

2-2. Feature Amounts

Hereinafter, the feature amounts $C_{ts1}$, $C_{th2}$, ..., $C_{thN}$ and $C_{ts1}$, $C_{ts2}$ ..., $C_{tsM}$ according to the present embodiment will be described. In the present embodiment, N=M=7, and the feature amounts $C_{thi} = C_{tsi}$ (i=1, 2, ..., 7).

2-2-1. First-Order Peak Amplitude of Spectrum of Angular Velocity $\omega_z$

The first feature amount $C_{th1} = C_{ts1}$ according to the present embodiment is the first-order mode peak amplitude of the spectrum of the angular velocity, that is, $\omega_z$, about the axis in the shaft 40 direction (see FIG. 22). This feature amount represents the torsion component of the shaft 40. Also, the testing conducted by the inventors confirmed that this feature amount has a high correlation with the strike point $D_{th}$ in the left-right direction. Note that, in this testing, the acceleration and angular velocity measurement data was acquired by getting one golfer to swing a golf club equipped at the grip end with an acceleration sensor and an angular velocity sensor a large number of times (about 30 balls in total). At this time, measurement was performed for $t_i$−2 s to $t_i$+0.5 s at a sampling period $\Delta t$=1 ms. The measurement data was acquired with the strike points dispersed throughout the areas A to G shown in FIG. 6. The feature amounts $C_{th1}$, $C_{th2}$, ..., $C_{thN}$ and $C_{ts1}$, $C_{ts2}$, ..., $C_{tsM}$ were calculated, based on this measurement data. Also, the golf swing was simultaneously captured using a plurality of cameras, and the strike points specified thereby were set as true values. The correlation between the true values of these strike points and the feature amount $C_{th1} = C_{ts1}$ was then investigated. Note that the verification results relating to the correlation of the second to seventh feature amounts that will be described below were also obtained though this testing.

2-2-2. Second-Order Peak Amplitude of Spectrum of Acceleration $a_y$

Figure 23:
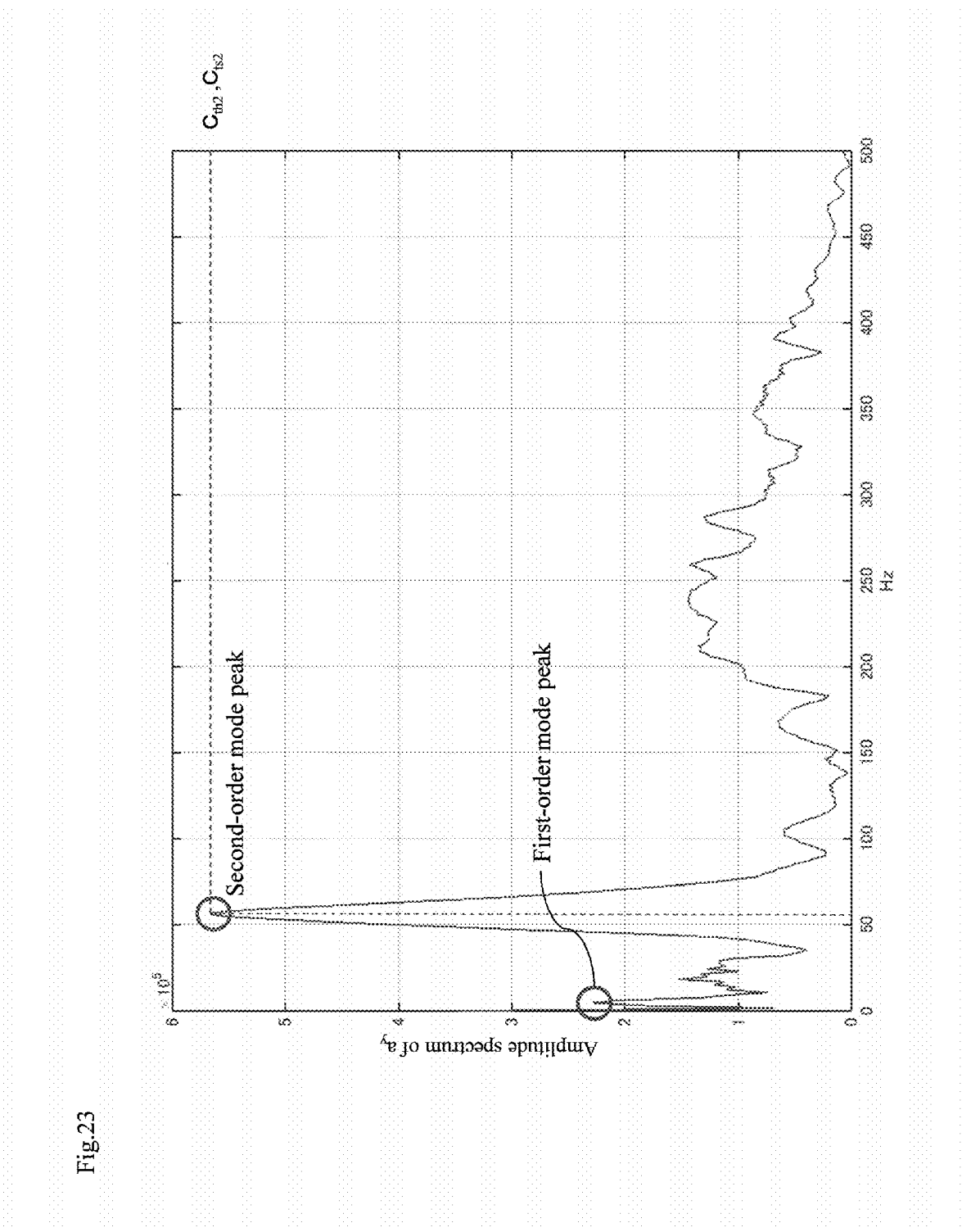
FIG. 23 is a diagram illustrating a second feature amount according to the second embodiment.

The second feature amount $C_{th2} = C_{ts2}$ according to the present embodiment is the second-order mode peak amplitude of the spectrum of the acceleration, that is, $a_y$, in the target line direction (see FIG. 23). This feature amount represents the deflection component of the shaft 40. Also, the testing conducted by the inventors confirmed that this feature amount has a high correlation with both the strike point $D_{ts}$ in the up-down direction and the strike point $D_{th}$ in the left-right direction.

2-2-3. Second-Order Peak Amplitude of Spectrum of Angular Velocity $\omega_x$

Figure 24:
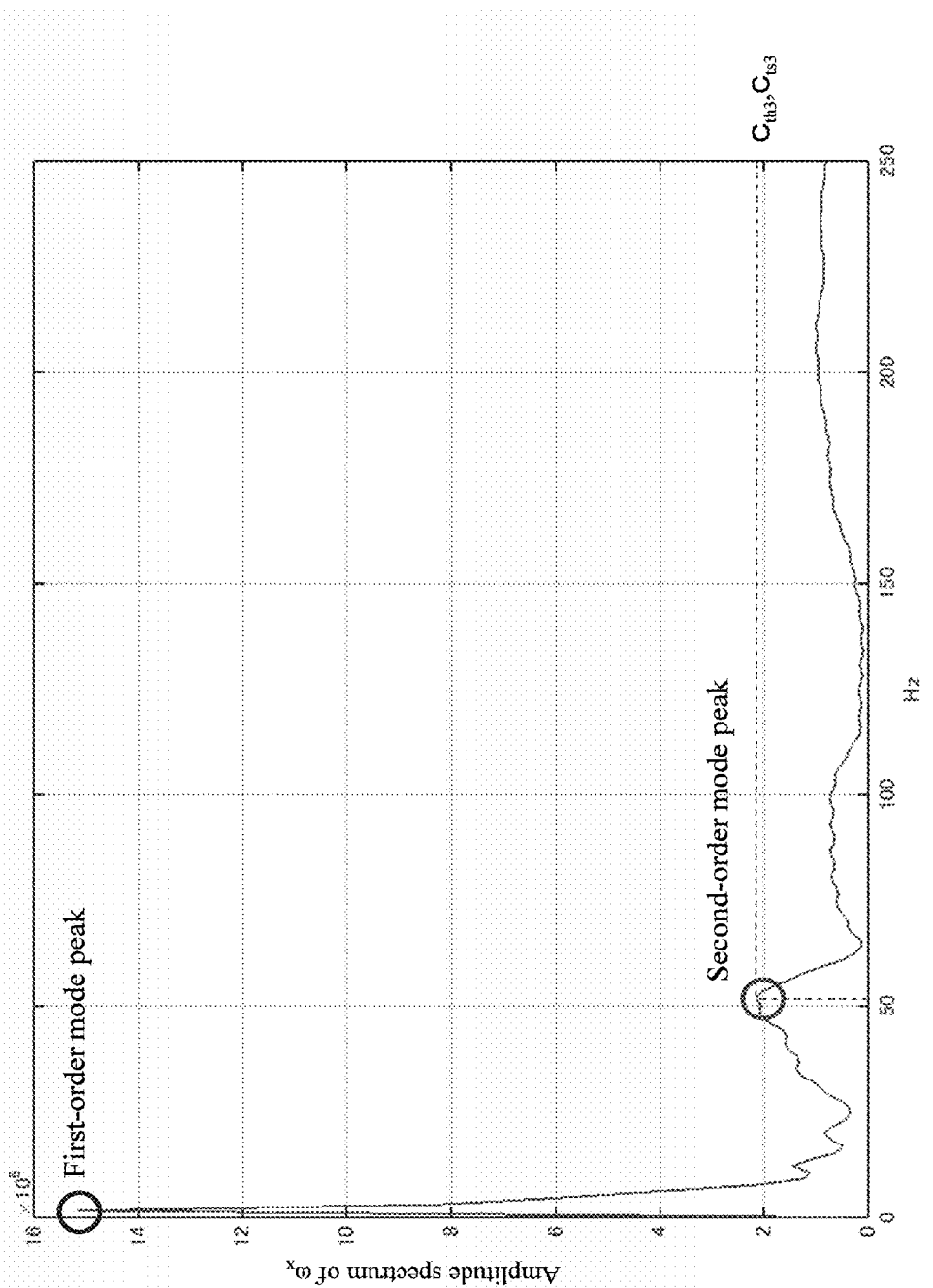
FIG. 24 is a diagram illustrating a third feature amount according to the second embodiment.

The third feature amount $C_{th3} = C_{th3}$ according to the present embodiment is the second-order mode peak amplitude of the spectrum of the angular velocity, that is, $\omega_x$, about the axis in the toe-heel direction (see FIG. 24). This feature amount represents the deflection component of the shaft 40. Also, the testing conducted by the inventors confirmed that this feature amount has a high correlation with both the strike point $D_{ts}$ in the up-down direction and the strike point $D_{th}$ in the left-right direction. Also, the correlation with the strike point $D_{ts}$ in the up-down direction was particularly high.

Figure 25:
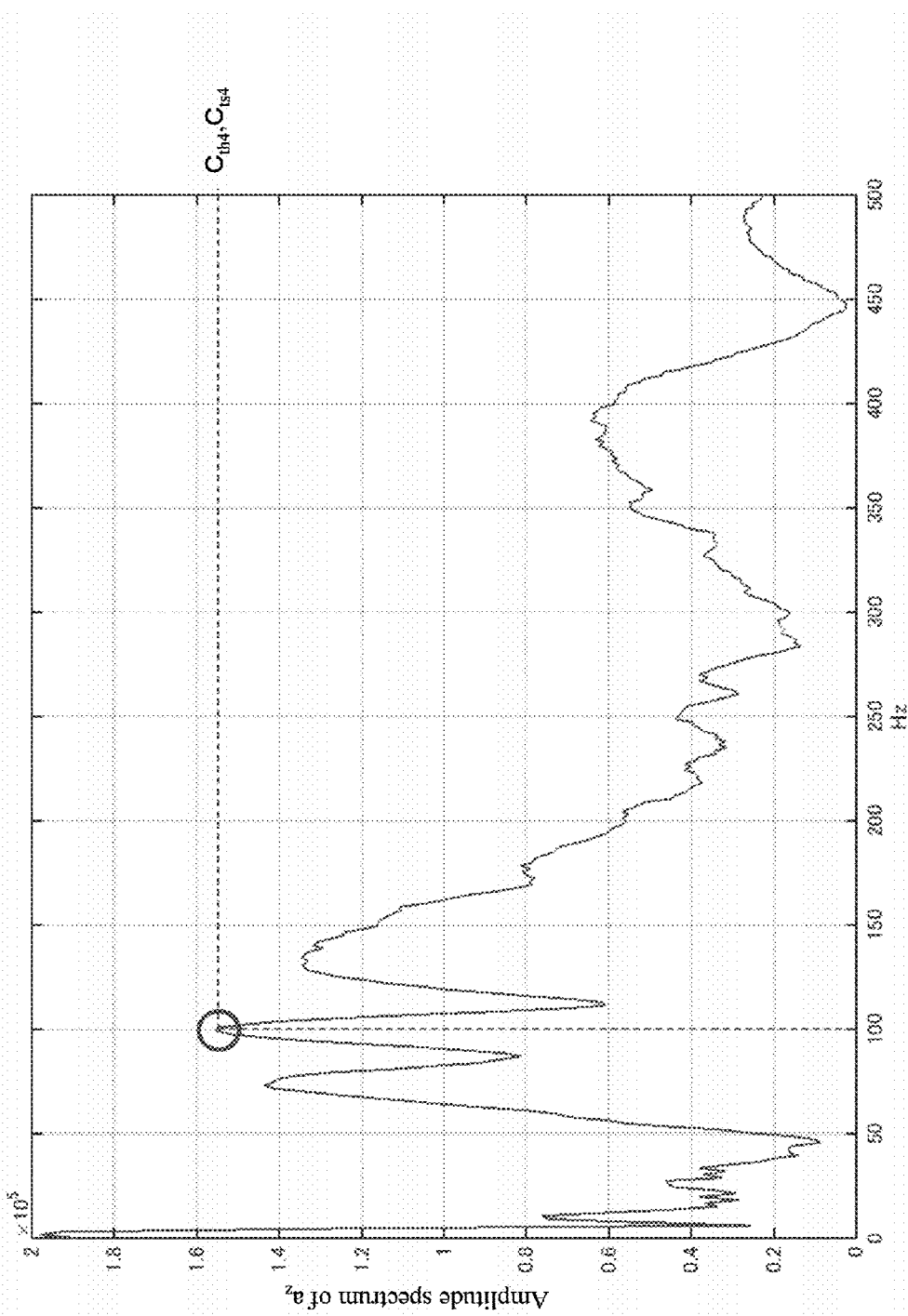
FIG. 25 is a diagram illustrating a fourth feature amount according to the second embodiment.

2-2-4. Maximum Magnitude in Predetermined Frequency Band of Spectrum of Acceleration $a_z$ The fourth feature amount $C_{th4} = C_{ts4}$ according to the present embodiment is the maximum magnitude in a predetermined frequency band (around 50-100 Hz) of the spectrum of the acceleration, that is, $a_z$, in the shaft 40 direction (see FIG. 25). This feature amount represents the oscillation component in the lengthwise direction of the shaft 40. Also, the testing conducted by the inventors confirmed that this feature amount has a high correlation with the strike point $D_{ts}$ in the up-down direction.

2-2-5. Maximum Value of Angular Velocity $\omega_y$ Immediately after Impact

Figure 26:
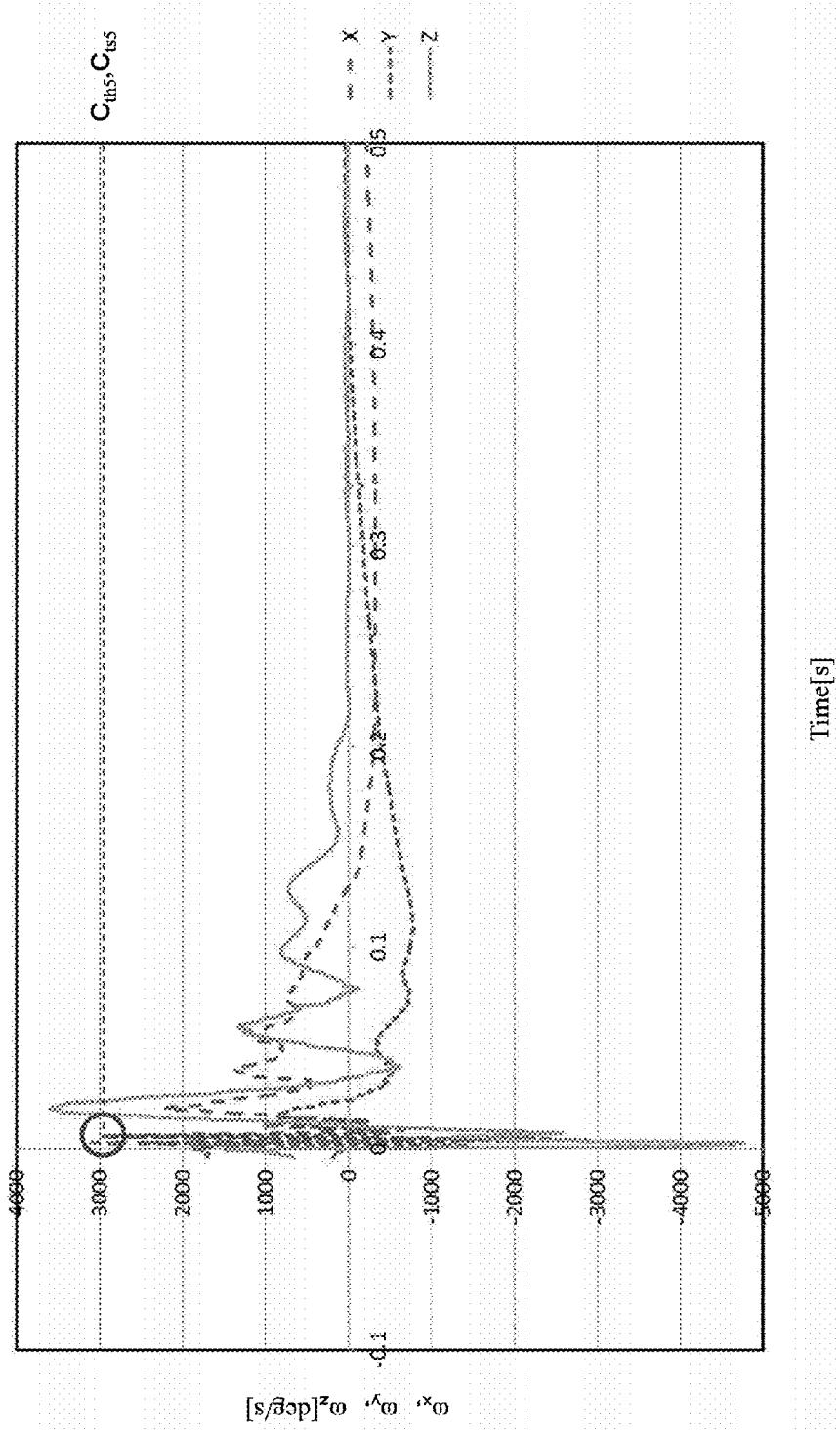
FIG. 26 is a diagram illustrating a fifth feature amount according to the second embodiment.

The fifth feature amount $C_{th5} = C_{ts5}$ according to the present embodiment is the maximum value immediately after impact (e.g., for 0.1 s from time $t_i$) of the angular velocity, that is, $\omega_y$, about the axis in the target line direction (see FIG. 26). This feature amount represents the shearing component of the head 41. Also, the testing conducted by the inventors confirmed that this feature amount has at least a certain amount of correlation with both the strike point $D_{ts}$ in the up-down direction and the strike point $D_{th}$ in the left-right direction.

2-2-6. Angular Velocity $\omega_x$ at Time of Impact

The sixth feature amount $C_{th6} = C_{ts6}$ according to the present embodiment is the angular velocity about the axis in the toe-heel direction at the impact time, that is, $\omega_x$, at the impact time. This feature amount serves as an index for evaluating the type and ability of a golfer.

2-2-7. Angular Velocity $\omega_z$ at Time of Impact

The seventh feature amount $C_{th7}=C_{ts7}$ according to the present embodiment is the angular velocity about the axis in the shaft 40 direction at the impact time, that is, $\omega_z$ at the impact time. This feature amount serves as an index for evaluating the type and ability of a golfer.

2-2-8. Verification

Hereinafter, the results of verifying the accuracy of strike point estimation in the case of using the above seven feature amounts $C_{th1}$, $C_{th2}$, ..., $C_{thN}$ and $C_{ts1}$, $C_{ts2}$, ..., $C_{tsM}$ will be described.

The inventors created the multiple regression equations (1) and (2) to be used in steps S37 to S42, based on the measurement data at the time of the golf swing obtained by the above testing for verifying the correlation between the feature amount and the strike point. The feature amounts $C_{th1}$, $C_{th2}$, ..., $C_{thN}$ and $C_{ts1}$, $C_{ts2}$, ..., $C_{tsM}$ obtained by the same testing were substituted into these multiple regression equations (1) and (2), and the estimated values of the strike points $D_{th}$ and $D_{ts}$ were calculated. FIGS. 27 to 29 are graphs showing the relationship between the strike points $D_{th}$ and $D_{ts}$ (true values) specified from the images captured by the plurality of cameras and the strike points $D_{th}$ and $D_{ts}$ (estimated values) specified from the multiple regression equations (1) and (2). FIG. 27 is a graph based on measurement data with respect to which it was determined that the strike points $D_{th}$ and $D_{ts}$ are in the region on the toe side with a similar method to steps S34 to S36. Similarly, the graphs of FIGS. 28 and 29 are based on measurement data with respect to which it was determined that the strike points $D_{th}$ and $D_{ts}$ are respectively in the region on the heel side and the region near the face center Fc. Also, determination coefficients between the true values and the estimated values are shown in FIGS. 27 to 29. It is evident from FIGS. 27 to 29 that the true values and estimated values of the strike points $D_{th}$ and $D_{ts}$ roughly coincide. Accordingly, a high estimation accuracy of the strike points $D_{th}$ and $D_{ts}$ according to the present embodiment was confirmed.

Also, with the same measurement data as FIGS. 27 to 29, the percentage of cases where the true value and estimated value of the strike point fall within ±10 mm was 96% for the strike point $D_{th}$ and 82% for the strike point $D_{ts}$. This also confirmed the high estimation accuracy of the strike points $D_{th}$ and $D_{ts}$ according to the present embodiment.

3. Third Embodiment

Hereinafter, a swing analysis system that is provided with a golf swing analysis apparatus according to a third embodiment will be described. The swing analysis system according to the present embodiment has many points in common with the first and second embodiments, particularly the analysis system 100 according to the second embodiment, and mainly differs in that different strike point estimation processing is executed. Accordingly, for simplicity, the following description will focus on the differences between both embodiments, and configuration that is the same will be given the same reference signs and description thereof omitted.

In the third embodiment, similarly to the second embodiment, multiple regression analysis is used, in order to specify the impact positions $D_{th}$ and $D_{ts}$. In the third embodiment, however, the impact position in the top-sole direction on the face 41a is classified into a plurality of areas, according to a phase angle φ2 discussed later (step S52), and multiple regression equations corresponding to the classifications are prepared. Also, in the third embodiment, $C_{th8}$ to $C_{th11}$ and $C_{ts8}$ to $C_{ts11}$ are added as feature amounts, in addition to above-mentioned $C_{th1}$ to $C_{th7}$ and $C_{ts1}$ to $C_{ts7}$. Furthermore, in the third embodiment, the details of the mishit determination also differ. Hereinafter, these differences will be specifically described.

3-1. Strike Point Estimation Processing

Figure 30:
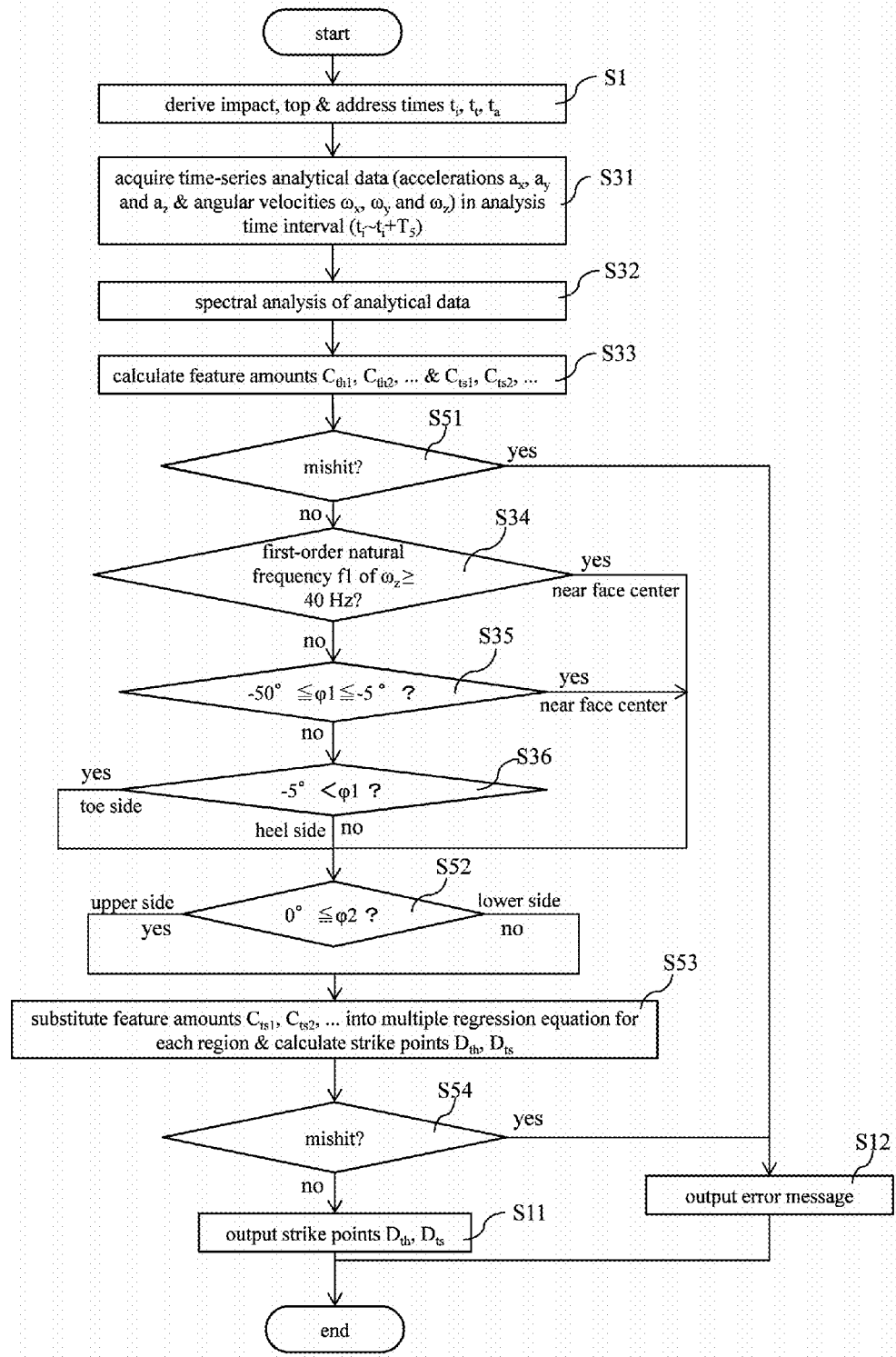
FIG. 30 is a flowchart showing the flow of strike point estimation processing according to a third embodiment.

FIG. 30 shows a flowchart showing the flow of strike point estimation processing according to the present embodiment. Here, coordinates ($D_{th}$, $D_{ts}$) of the strike point in a $D_{th}$–$D_{ts}$ plane that is defined on the face 41a are specified.

The strike point estimation processing in the present embodiment also starts when the data collection processing ends, the sensor data is stored in the storage unit 23, and the user instructs execution of the strike point estimation processing. The first step S1 is the same as in the first and second embodiments. Thereafter, in the present embodiment, steps S31 to S33 that are similar to the second embodiment are executed. In the present embodiment, however, $C_{th8}$ to $C_{th11}$ and $C_{ts8}$ to $C_{ts11}$ are also calculated in step S33, in addition to above-mentioned $C_{th1}$ to $C_{th7}$ and $C_{ts1}$ to $C_{ts7}$. The details of $C_{th8}$ to $C_{th11}$ and $C_{ts8}$ to $C_{ts11}$ will be discussed later in the section on feature amounts.

The processing advances to step S51 when step S33 ends. In step S51, mishit determination is performed by the mishit determination unit 24B. Specifically, the mishit determination unit 24B determines whether the feature amounts $C_{th1}$ to $C_{th5}$, $C_{th8}$ to $C_{th10}$ and $C_{ts1}$ to $C_{ts5}$, $C_{ts8}$ to $C_{ts10}$ calculated in step S33 are within the respective predetermined ranges. It is determined that the golf swing is a mishit, if the feature amounts $C_{th1}$ to $C_{th5}$, $C_{th8}$ to $C_{th10}$ and $C_{ts1}$ to $C_{ts5}$, $C_{ts8}$ to $C_{ts10}$ are outside the predetermined ranges. Note that, in the present embodiment, it is determined that the golf swing is a mishit, if at least one of the feature amounts $C_{th1}$ to $C_{ts5}$, $C_{th8}$ to $C_{th10}$ and $C_{ts1}$, to $C_{ts5}$, $C_{ts8}$ to $C_{ts10}$ is outside the predetermined range.

That is, the above feature amounts $C_{thN}$ and $C_{tsM}$ will take an abnormal value in the case of a mishit, and will fall within the predetermined ranges as long as the golf swing is not a mishit. Accordingly, the testing is repeated a large number of times in advance, and thresholds (minimum and maximum values when not a mishit) that separate the case where there is a mishit from the case where there is not a mishit are detected for each of the above feature amounts $C_{thN}$ and $C_{tsM}$ and the detected thresholds are stored in the storage unit 23 as thresholds to be used in step S51. Mishits can thereby be accurately detected.

If it is determined in step S51 that the golf swing is a mishit, the processing advances to step S12, and an error message such as described above is displayed, after which the processing ends. On the other hand, if it is determined that the golf swing is not a mishit, steps S34 to S36 are executed. Note that the above-mentioned thresholds of the phase angle φ1 that are used in steps S35 and S36 are illustrative. As other examples, in the present embodiment, in step S35, it can be determined that the impact position of the ball is included in the region near the face center Fc in the case where $-50° \leq φ1 \leq -5°$. Also, in step S36, it can be determined that the impact position of the ball is included in the region on the toe side in the case where $φ1 > -5°$, and that the impact position of the ball is included in the region on the heel side in the case where $φ1 < -50°$.

Figure 31:
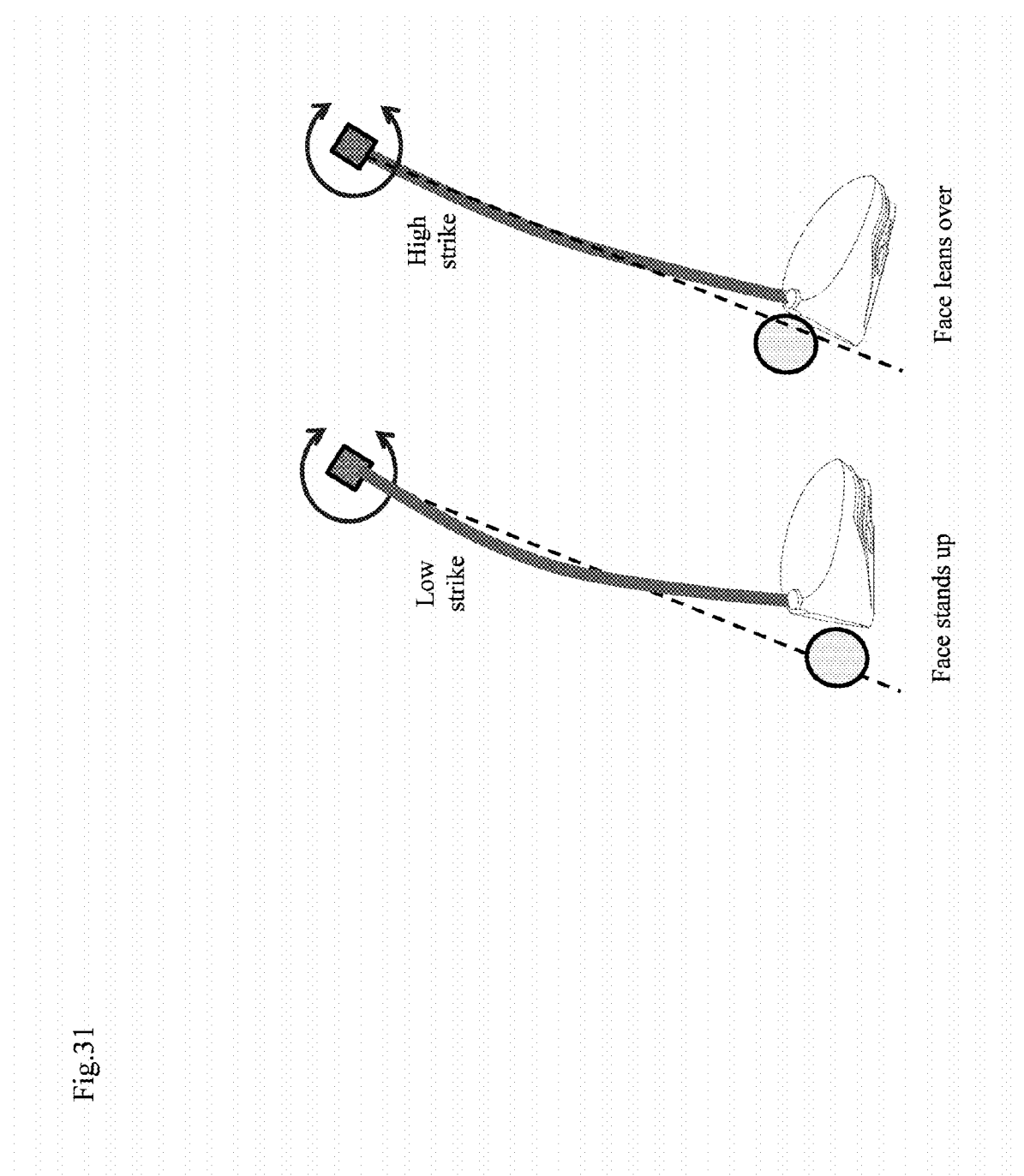
FIG. 31 is a diagram illustrating the behavior of the head in the case of a high strike and a low strike.
Figure 32:
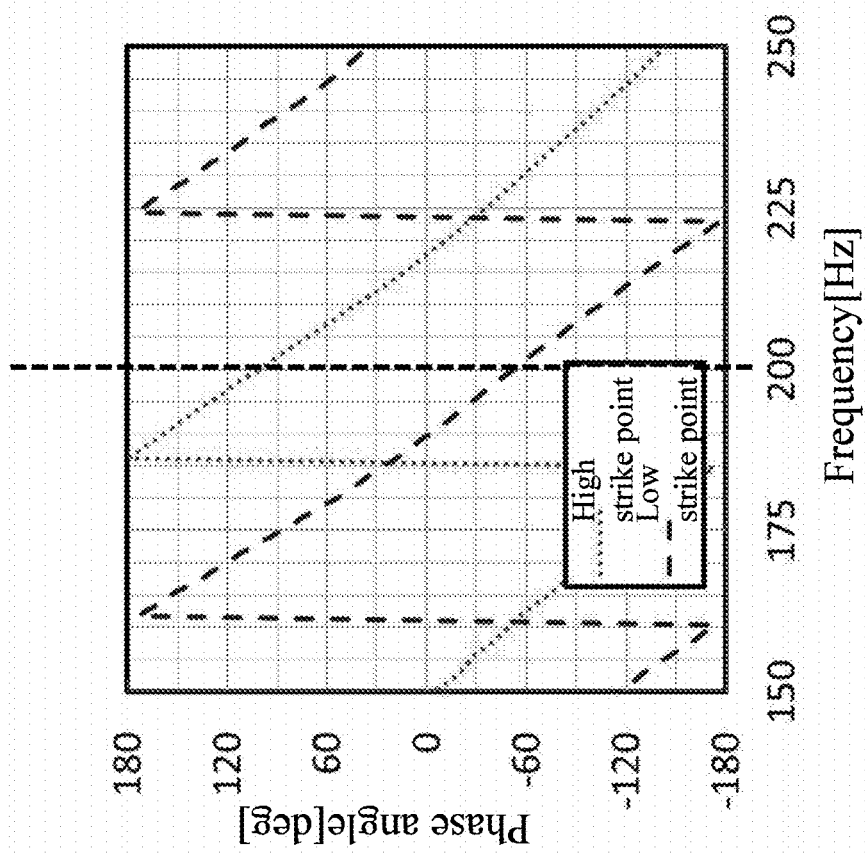
FIG. 32 is a graph showing a phase spectrum in the case of a high strike and a low strike.

The processing advances to step S52 after steps S34 to S36. In step S52, the pattern classification unit 24D derives a phase angle φ2 corresponding to a predetermined frequency (in the present embodiment, 200 Hz) which is greater than or equal to 150 Hz, based on the phase spectrum of the analytical data of the angular velocity $\omega_x$. This phase angle $\phi2$ is a phase angle near a high-order mode (typically, third-order mode or greater) of the spectrum of the angular velocity $\omega_x$. The pattern classification unit 24D determines that the impact position of the ball is included in the region on the top side (upper side), in the case where $\phi2$ is greater than or equal to a predetermined value (in the present embodiment, $0°\le\phi2$.) On the other hand, the pattern classification unit 24D determines that the impact position of the ball is included in the region on the sole side (lower side) in the case where $\phi2$ is smaller than the predetermined value (in the present embodiment, $0°>\phi2$). Note that the face 41a leans over more in the case where the strike point has shifted to the upper side from the face center Fc, and the face 41a stands up more in the case where the strike point has shifted to the lower side (see FIG. 31). A graph of the phase angle of the angular velocity $\omega_x$ in the case of a high strike and the low strike is as shown in FIG. 32. Accordingly, focusing on the phase angle $\phi2$ at a predetermined frequency, a high strike point or a low strike point can be estimated depending on whether the phase angle $\phi2$ is greater than or equal to a predetermined value or not.

Note that, in step S52, a phase angle corresponding to a predetermined frequency greater than or equal to 150 Hz (in the present embodiment, 200 Hz) of the phase spectrum of the analytical data of the acceleration $a_y$ can also be used as the phase angle $\phi2$, instead of the phase angle based on the angular velocity $\omega_x$.

Having passed through steps S34 to S36 and step S52, the impact position of the ball is classified into one of six regions, which are defined by dividing into three regions in the toe-heel direction and dividing into two regions in top-sole direction. The six regions are the regions of the upper toe, upper center, upper heel, lower toe, lower center, and lower heel.

In the following step S53, the strike point estimation unit 24F estimates the impact position $D_{th}$ of the ball in the toe-heel direction on the face 41a, according to the feature amounts $C_{th1}$, $C_{th2}$, ..., $C_{thN}$ calculated in step S33. The specific processing contents are similar to steps S37 to S42. That is, the impact position $D_{th}$ is calculated in accordance with the above-mentioned equation (1) in which the impact position $D_{th}$ is the objective variable and the feature amounts $C_{th1}$, $C_{th2}$, ..., $C_{thN}$ are explanatory variables, and the impact position $D_{ts}$ is calculated in accordance with the equation (2) in which the impact position $D_{ts}$ is the objective variable and the feature amounts $C_{ts1}$, $C_{ts2}$, ..., $C_{tsM}$ are explanatory variables. The values of the coefficients $k_{th0}$, $k_{th1}$, $k_{th2}$, ... $k_{thN}$ and $k_{ts0}$, $k_{ts1}$, $k_{ts2}$, ..., $k_{tsM}$ that are used in step S53 are, however, the coefficients of multiple regression equations suitable for strike point estimation in the regions classified in steps S34 to S36 and step S52. Note that the values of the coefficients $k_{th0}$, $k_{th1}$, $k_{th2}$, ..., $k_{thN}$ and $k_{ts0}$, $k_{ts1}$, $k_{ts2}$, ..., $k_{tsM}$ as referred to here are calculated by similar testing to the second embodiment, and prestored in the storage unit 23 as the coefficient data 28.

In the following step S54, mishit determination is again performed by the mishit determination unit 24C. That is, in the case where the strike points $(D_{th}, D_{ts})$ derived in step S53 are outside of a predetermined range (for example, in the case where $-40\text{ mm}\le D_{th}\le 40\text{ mm}$ and $-30\text{ mm}\le D_{ts}\le 30\text{ mm}$ are not satisfied), it is determined that the golf swing is a mishit and the processing advances to step S12. On the other hand, if this is not the case, it is determined that the golf swing is not a mishit, the processing progresses to step S11 and information on the strike point $(D_{th}, D_{ts})$ derived in step S53 is displayed on the display unit 21. After step S11 and S12 are completed, the strike point estimation processing ends.

3-2. Feature Amount

Hereinafter, the feature amounts $C_{th1}$, $C_{th2}$, ..., $C_{thN}$ and $C_{ts1}$, $C_{ts2}$, ..., $C_{tsM}$ according to the present embodiment will be described. In the present embodiment, N=M=11, and feature amounts $C_{thi}=C_{tsi}$ (i=1, 2, ..., 11). Since the feature amounts $C_{th1}$ to $C_{th7}$ and $C_{ts1}$ to $C_{ts7}$ are similar to the above, hereinafter, the feature amounts $C_{th8}$ to $C_{th11}$ and $C_{ts8}$ to $C_{ts11}$ will be described.

3-2-1. Amplitude of Angular Velocity $\omega_x$

The eighth feature amount $C_{th8}=C_{ts8}$ according to the present embodiment is the amplitude of the angular velocity, that is, $\omega_x$, about the axis in the toe-heel direction. In the present embodiment, this is the difference between the maximum value and the minimum value in a predetermined time interval (for 0.1 s from impact). Note that having performed similar verification to the second to seventh feature amounts, it is confirmed that this feature amount has a high correlation with the strike point $D_{ts}$ in the up-down direction.

3-2-2. Amplitude of Angular Velocity $\omega_y$

The ninth feature amount $C_{th9}=C_{ts9}$ according to the present embodiment is the amplitude of the angular velocity, that is, $\omega_y$, about the axis in the face-back direction. In the present embodiment, this is the difference between the maximum value and the minimum value in a predetermined time interval (for 0.1 s from impact). Note that having performed similar verification as the second to seventh feature amounts, it is confirmed that this feature amount has a high correlation with the strike point $D_{th}$ in the left-right direction.

3-2-3. Amplitude of Angular Velocity $\omega_z$

The tenth feature amount $C_{th10}=C_{ts10}$ according to the present embodiment is the amplitude of the angular velocity, that is, $\omega_z$, about the z-axis. In the present embodiment, this is the difference between the maximum value and the minimum value in a predetermined time interval (for 0.1 s from impact). Note that having performed similar verification as the second to seventh feature amounts, it is confirmed that this feature amount has a high correlation with the strike point $D_{th}$ in the left-right direction.

3-2-4. Head Speed $v_h$ at Time of Impact

Figure 33:
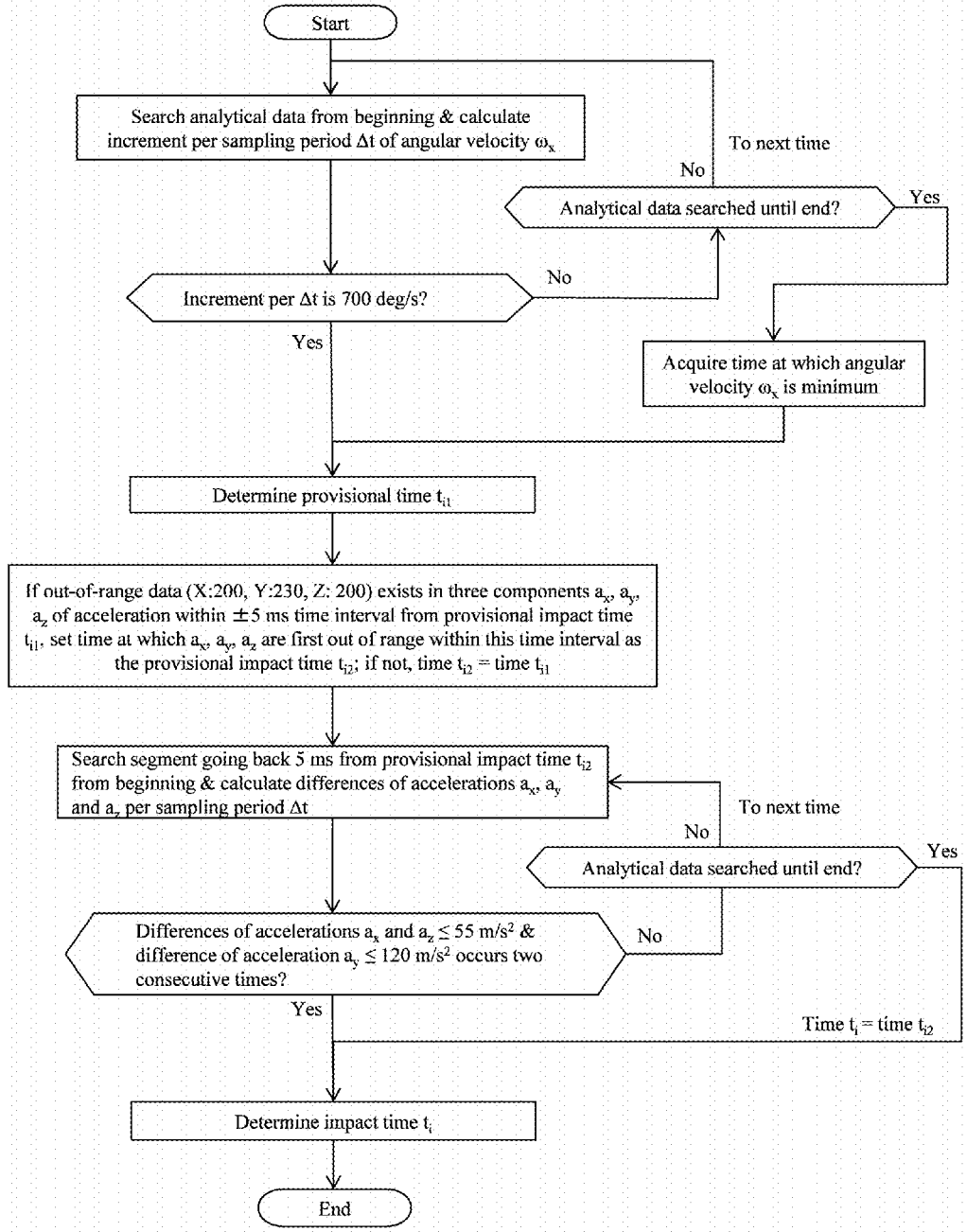
FIG. 33 is a flowchart showing the flow of time-of-impact determination processing.

The eleventh feature amount $C_{th11}=C_{ts11}$ according to the present embodiment is a head speed $v_h$ at the impact time. The head speed $v_h$ can be calculated if data of the accelerations $a_x$, $a_y$, and $a_z$ and the angular velocities $\omega_x$, $\omega_y$, and $\omega_z$ exists, and various calculation methods are known. Any method may be used, although, in the present embodiment, the method shown in FIG. 33 is used as a particularly preferable method.

Specifically, first, the analytical data of a predetermined time interval (from address to finish) is searched from the beginning in time series, and the increment of the angular velocity $\omega_x$ per sampling period $\Delta t$ is derived. The first time that the increment of the angular velocity $\omega_x$ per sampling period $\Delta t$ becomes greater than or equal to a predetermined value (e.g., 700 deg/s) is set as a provisional impact time $t_{i1}$. In the case where, however, such a time does not exist within the predetermined time interval, the time at which the angular velocity $\omega_x$ is a minimum within the predetermined time interval is set as the provisional impact time $t_{i1}$.

Next, if there is a place at which the accelerations $a_x$, $a_y$, and $a_z$ are out of range (e.g., $|a_x|\ge 200\text{ m/s}^2$, $|a_y|\ge 230\text{ m/s}^2$, or $|a_z|\ge 200\text{ m/s}^2$) within a predetermined time interval (e.g: range of $t_{i1}+5$ ms) based on the provisional impact time $t_{i1}$, the time at which the accelerations $a_x$, $a_y$, and $a_z$ are first out of range within this time interval is set as the provisional impact time $t_{i2}$. On the other hand, if there are no places where the accelerations $a_x$, $a_y$, and $a_z$ are out of range, provisional impact time $t_{i2}$=time $t_{i1}$ is set.

Next, the analytical data of a predetermined time interval (e.g., range going back 5 ms from $t_{i2}$) based on the provisional impact time $t_{i2}$ is searched from the beginning in time series, and the differences of the accelerations $a_x$, $a_y$ and $a_z$ per sampling period $\Delta t$ are derived. The first time at which the differences of the accelerations $a_x$ and $a_z$ are 55 m/s² or below and the difference of the acceleration $a_y$ is 120 m/s² or below two consecutive times is searched for, and if found, this time is determined as impact time $t_i$. On the other hand, in the case where such a time does not exist within the predetermined time interval, the provisional impact time $t_{i2}$ is determined as impact time $t_i$.

3-2-5. Verification

Hereinafter, the results of verifying the accuracy of strike point estimation processing according to the third embodiment will be described. The inventors collected test data of test swings for a total of 270 balls by ten golfers. The test data as referred to here includes the strike points $D_{th}$ and $D_{ts}$ (true values) specified by the above-mentioned system using a plurality of cameras, in addition to above-mentioned sensor data.

Figure 34:
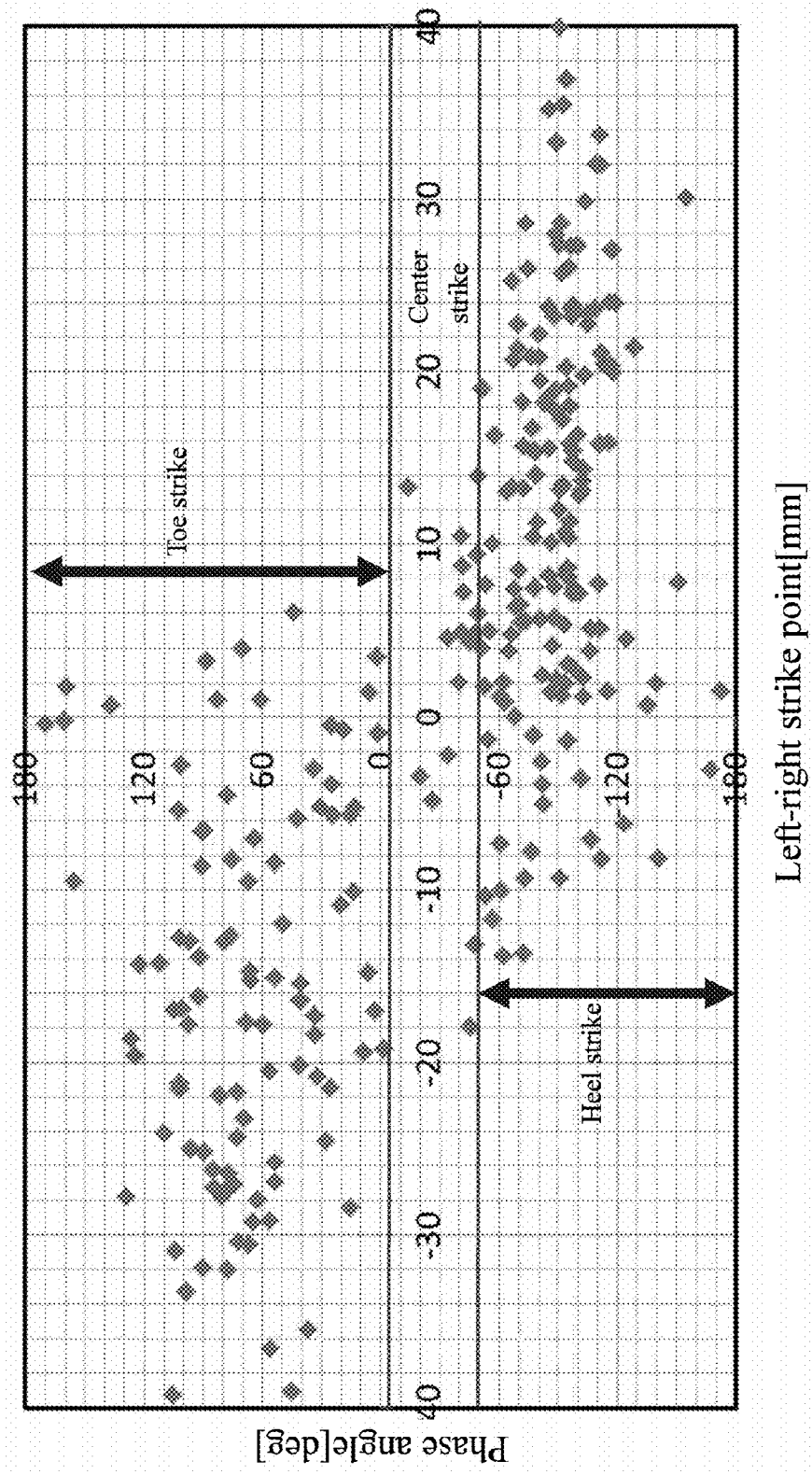
FIG. 34 is a graph showing the relationship between left-right strike points (true values) and a phase angle $\phi 1$.
Figure 35:
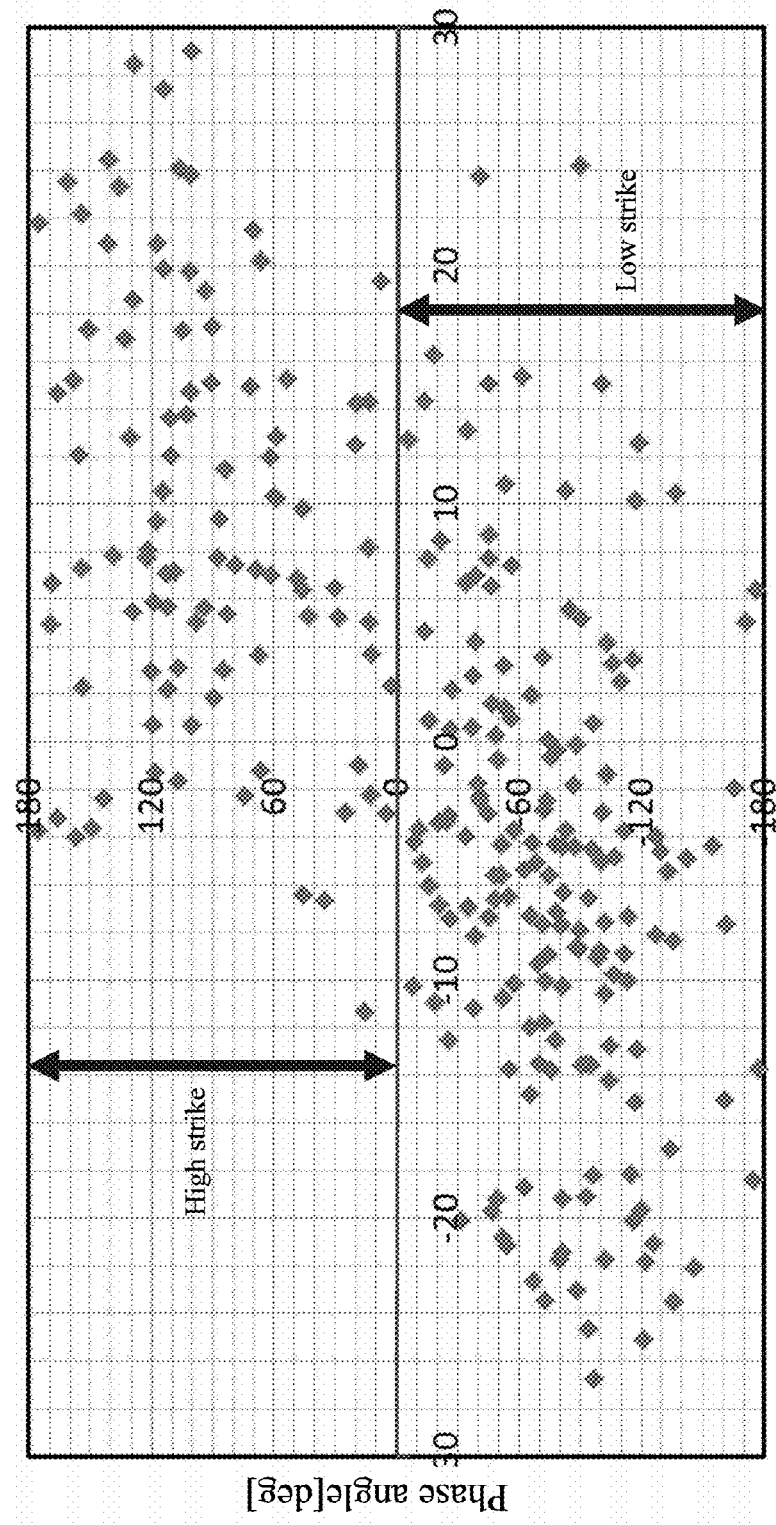
FIG. 35 is a graph plotting the relationship between up-down strike points (true values) and a phase angle $\phi 2$.
Figure 36B:
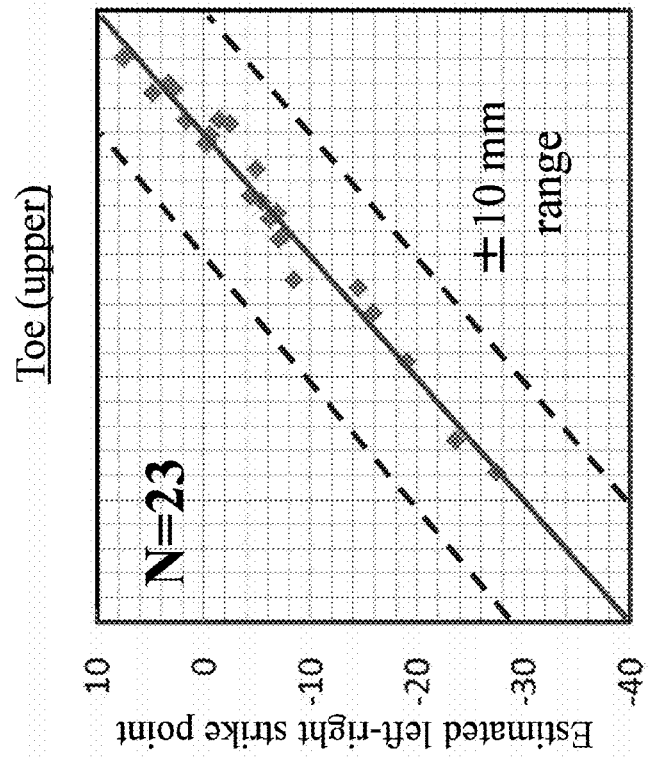
FIG. 36B is a graph plotting the relationship between estimated values and true values of left-right strike points with respect to data classified as upper center.
Figure 36A:
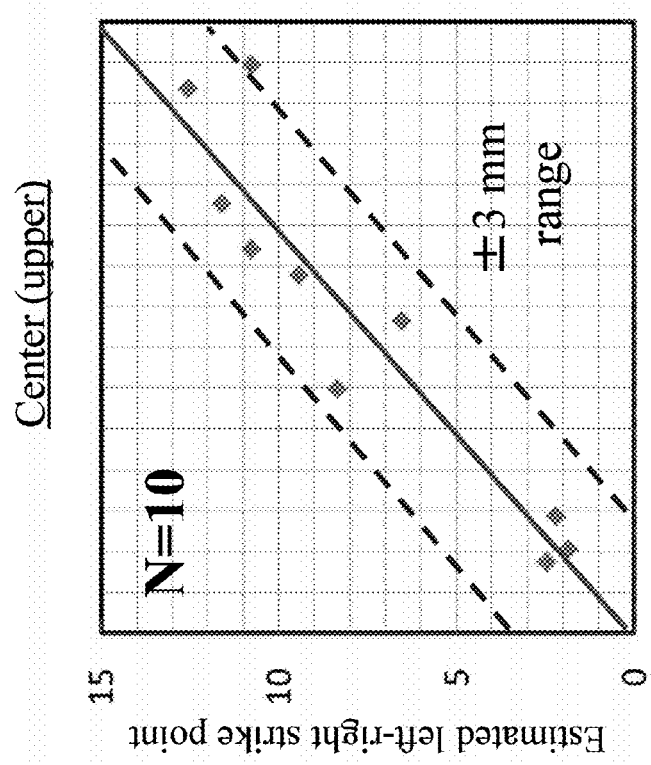
FIG. 36A is a graph plotting the relationship between estimated values and true values of left-right strike points with respect to data classified as upper toe.
Figure 36C:
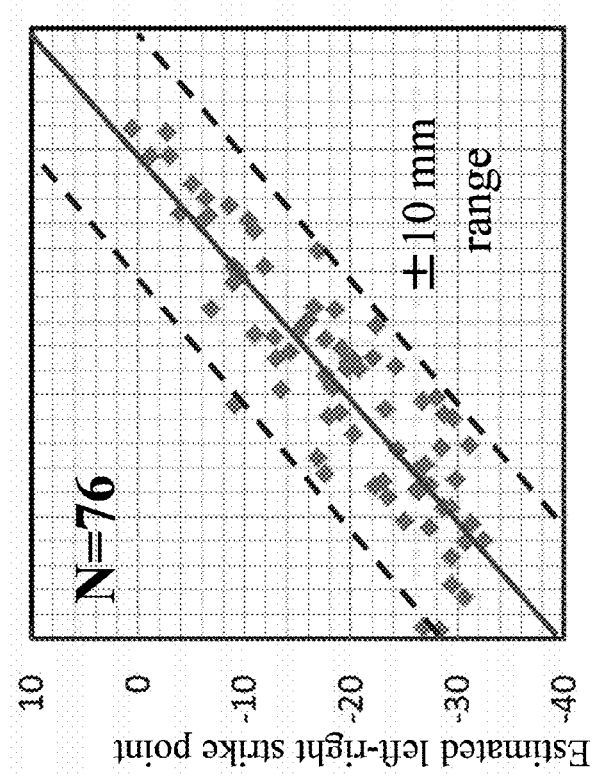
FIG. 36C is a graph plotting the relationship between estimated values and true values of left-right strike points with respect to data classified upper heel.
Figure 36D:
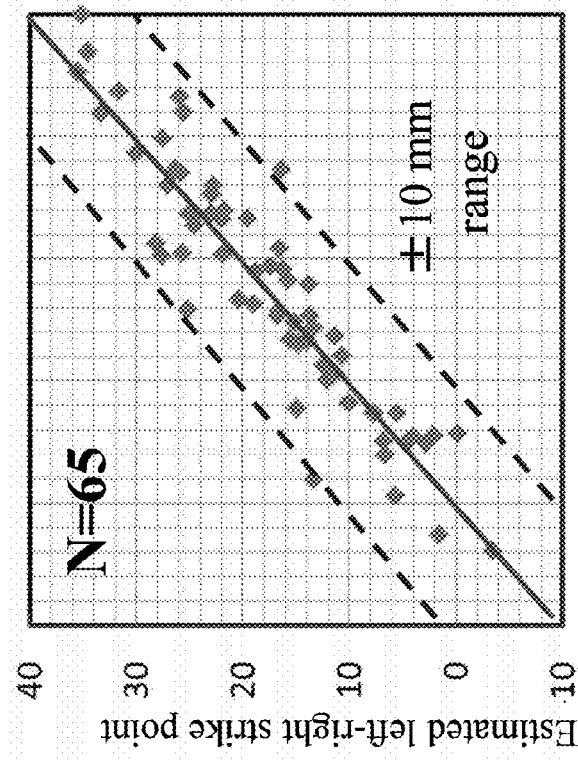
FIG. 36D is a graph plotting the relationship between estimated values and true values of left-right strike points with respect to data classified as lower toe.
Figure 36F:
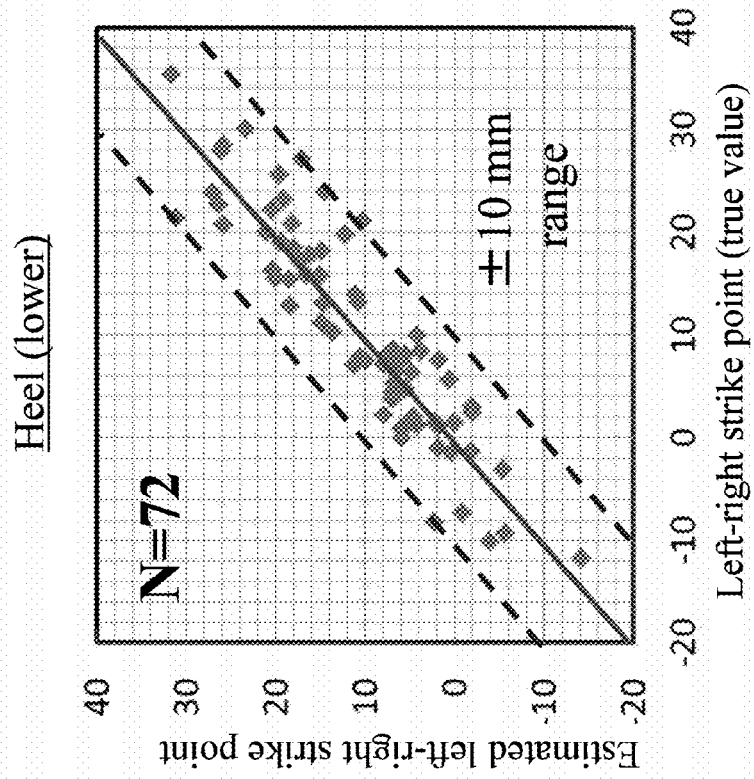
FIG. 36F is a graph plotting the relationship between estimated values and true values of left-right strike points with respect to data classified as lower heel.
Figure 36E:
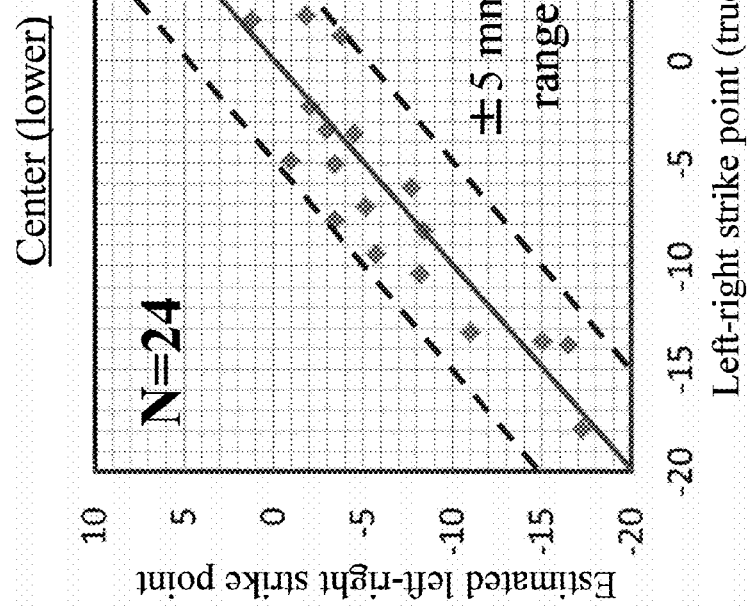
FIG. 36E is a graph plotting the relationship between estimated values and true values of left-right strike points with respect to data classified as lower center.
Figure 37A:
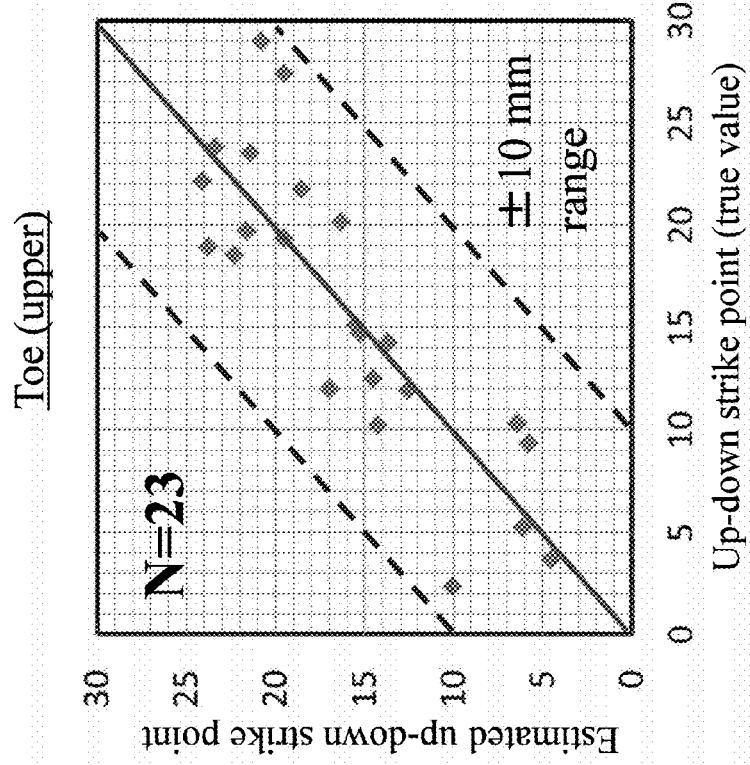
FIG. 37A is a graph plotting the relationship between estimated values and true values of up-down strike points with respect to data classified as upper toe.
Figure 37B:
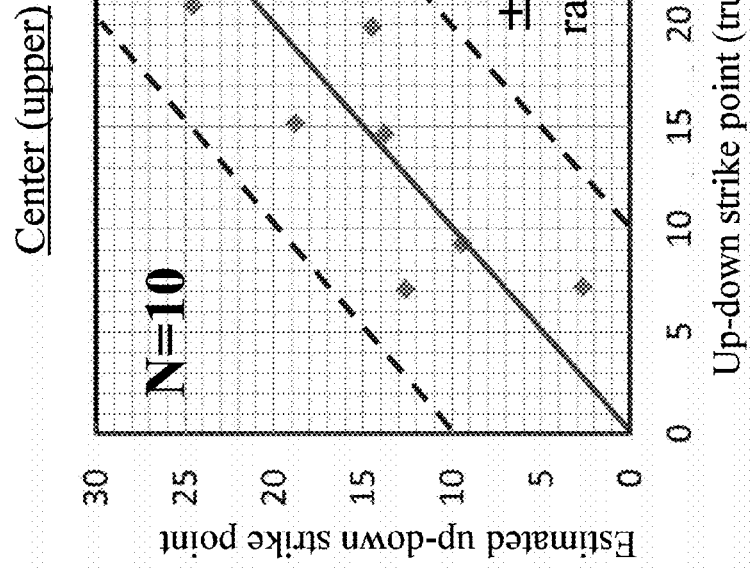
FIG. 37B is a graph plotting the relationship between estimated values and true values of up-down strike points with respect to data classified as upper center.
Figure 37C:
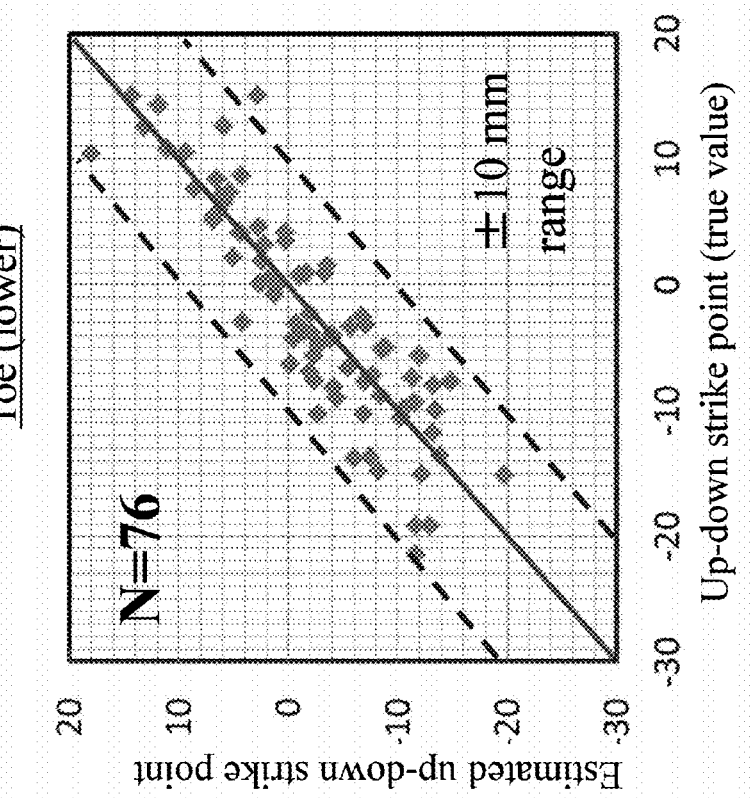
FIG. 37C is a graph plotting the relationship between estimated values and true values of up-down strike points with respect to data classified upper heel.
Figure 37D:
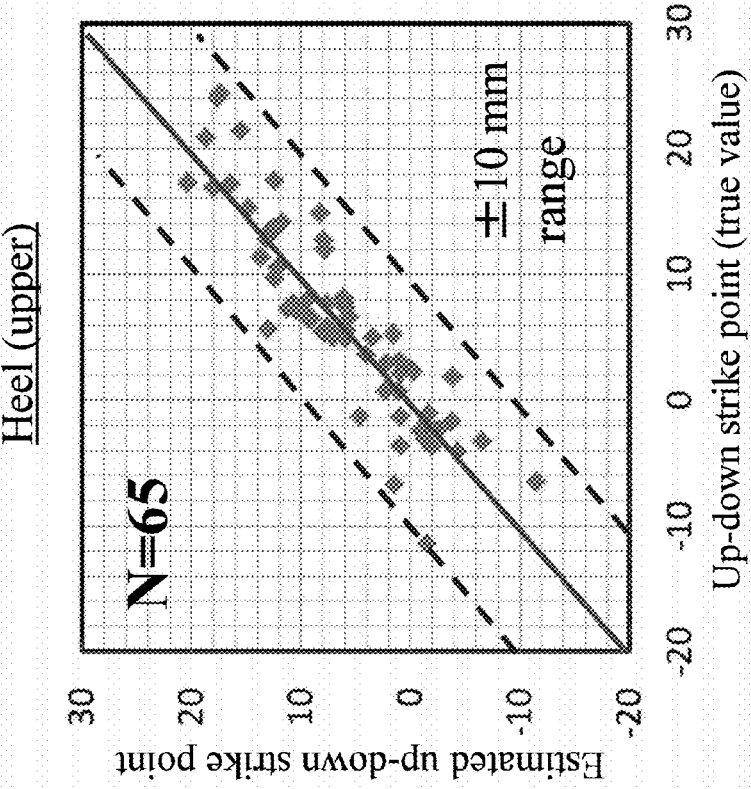
FIG. 37D is a graph plotting the relationship between estimated values and true values of up-down strike points with respect to data classified as lower toe.

FIG. 34 is a graph plotting the relationship between the left-right strike point $D_{th}$ (true value) and the phase angle $\phi 1$, based on the above test data for 270 balls, and FIG. 35 is a graph plotting the relationship between the up-down strike point $D_{ts}$ (true value) and the phase angle $\phi 2$, based on the above test data for 270 balls. It is evident from FIG. 34 that a toe strike (strike point is included in the region on the toe side), a center strike (strike point is included in the region near the face center Fc), and a heel strike (strike point is included in the region on the heel side) can be roughly classified with the thresholds of −50 degrees and −5 degrees in relation to $\phi 1$. Similarly, it is evident from FIG. 35 that a high strike (strike point is included in the upper region) and a low strike (strike point is included in a lower region) are roughly classified with the threshold of 0 degrees, in relation to $\phi 2$. Accordingly, the advantage of steps S35, S36 and S52 is confirmed.

Also, having executed strike point estimation processing according to the third embodiment on the above test data of the 270 balls, and verified the relationship between the strike points $D_{th}$ and $D_{ts}$ (estimated values) obtained as a result and the strike points $D_{th}$ and $D_{ts}$ (true values), the results are as shown in FIGS. 36A to 36F and FIGS. 37A to 37F. FIGS. 36A to 36F are graphs plotting the relationship between estimated values and true values of the left-right strike point $D_{th}$ within the respective classifications, after having classified the test data into the six regions of upper toe, upper center, upper heel, lower toe, lower center and lower heel using steps S34 to S36 and step S52. FIGS. 37A to 37F are graphs plotting the relationship between estimated values and true values of the up-down strike point Du within the respective classifications, after having classified the test data into the same six regions using steps S34 to S36 and step S52. The correctness rate in the case of counting the case where errors are within a range of 10 mm as correct is shown in each graph, and very high correctness rate of 97% overall is confirmed.

Figure 38:
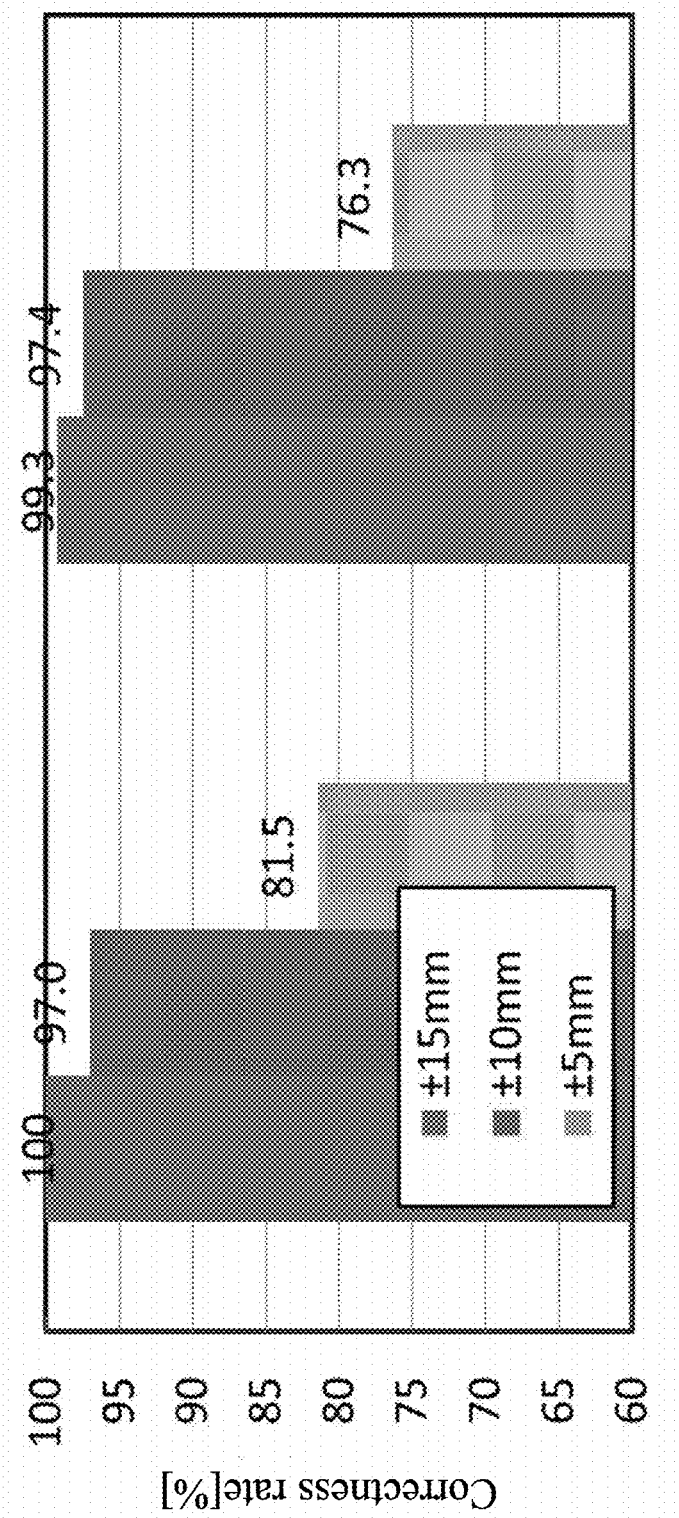
FIG. 38 is a graph showing the correctness rate of strike point estimation.

FIG. 38 is a graph showing the overall correctness rates when considering the case where the error is within a range of ±15 mm and the case where the error is within a range of ±5 mm as correct, in addition to considering the case where the error is within a range of ±10 mm as correct. This diagram shows the high accuracy of strike point estimation processing according to the third embodiment.

Figure 39:
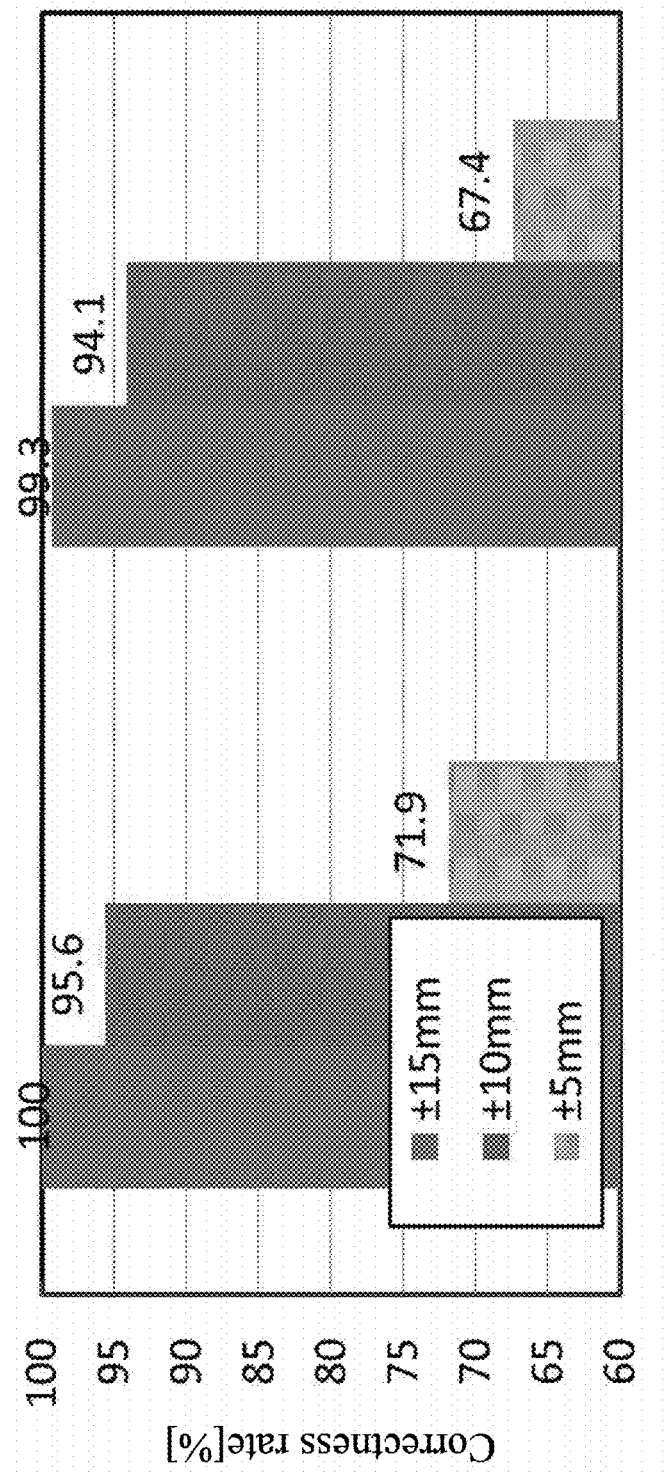
FIG. 39 is a graph showing the correctness rate of strike point estimation under different conditions.
Figure 40:
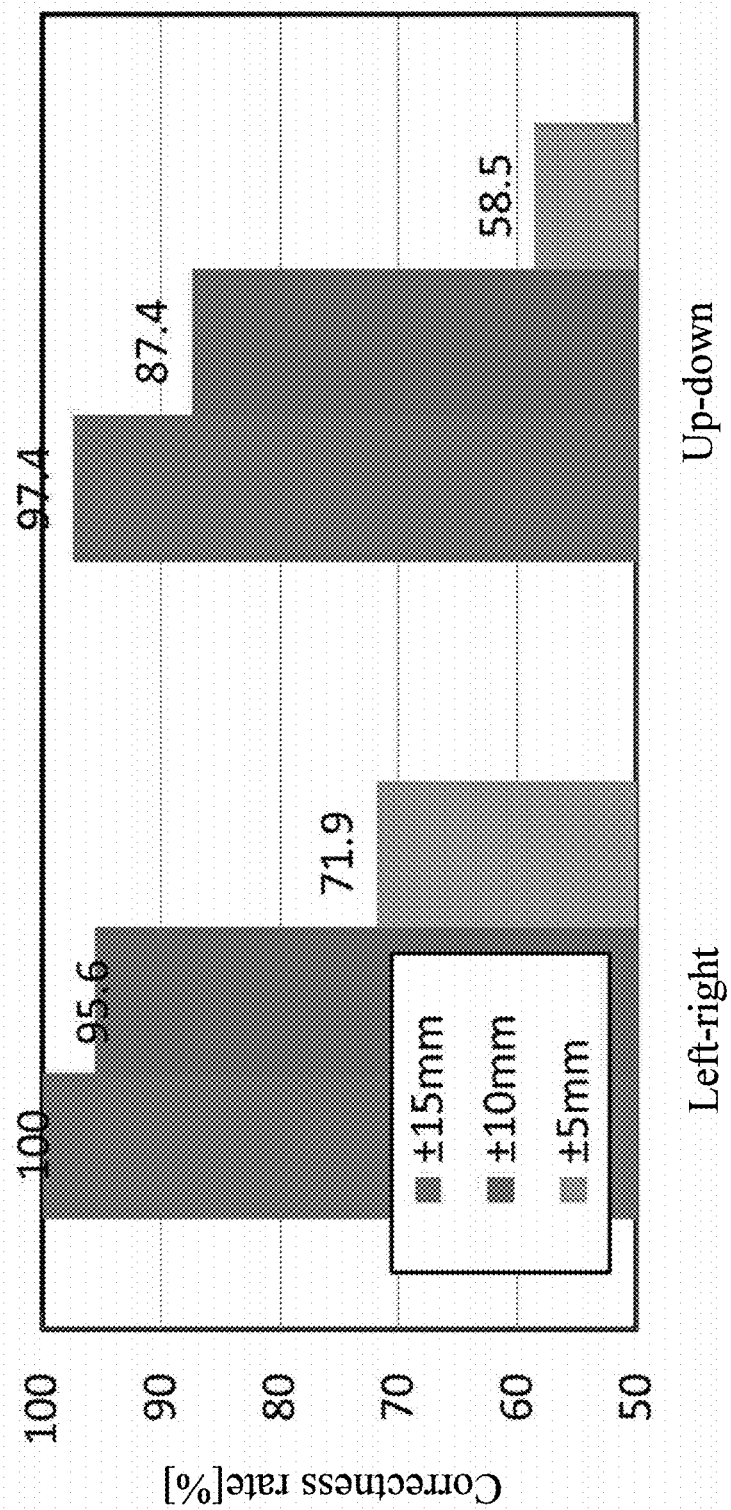
FIG. 40 is a graph showing the correctness rate of strike point estimation under different conditions.

FIG. 39 is a graph showing the correctness rates of the strike points $D_{th}$ and $D_{ts}$ in the case where multiple regression analysis based on the feature amounts $C_{th1}$-$C_{th7}$, $C_{th11}$ and $C_{ts1}$-$C_{ts7}$, and $C_{ts11}$ was performed without omitting step S52 in the strike point estimation processing according to the third embodiment. On the other hand, FIG. 40 is a graph showing the correctness rates of the strike points $D_{th}$ and $D_{ts}$ in the case where multiple regression analysis based on the feature amounts $C_{th1}$ to $C_{th7}$, $C_{th11}$ and $C_{ts1}$ to $C_{ts7}$, and $C_{ts11}$ was performed while omitting step S52 in the strike point estimation processing according to the third embodiment. These graphs confirm the advantage of the classification in step S52.

4. Modifications 4-1

The feature amounts $C_{th}$ and $C_{ts}$ for deriving the strike points $D_{th}$ and $D_{ts}$ are not limited to the above-mentioned examples. For example, acceleration data can be used as the feature amounts $C_{th}$ and $C_{ts}$ instead of angular velocity data, and preferably the data of $a_x$ and $a_z$ can be used.

Also, the amplitude at the peak of the waveform of the angular velocity $\omega_y$ about the y-axis in the analysis time interval can be used as analytical data for deriving the feature amount $C_{th}$. Also, the integral of the angular velocities $\omega_y$ and $\omega_z$ of a predetermined analysis time interval after impact can be used as the feature amount $C_{th}$, rather than the amplitude at the peak.

The angular velocity $\omega_y$ can also be used as the feature amount $C_{ts}$, instead of the angular velocity $\omega_x$. Also, instead of or in addition to this, the feature amount used in the testing of FIG. 16, that is, the length of time from impact time $t_i$ to the time at which the minimum peak appears in the subsequent predetermined analysis time interval can be used as the feature amount $C_{ts}$.

Similarly, the feature amounts $C_{th1}$, $C_{th2}$, ..., $C_{thN}$ and $C_{ts1}$, $C_{ts2}$, ..., $C_{tsM}$ for deriving the strike points $D_{th}$ and $D_{ts}$ are also not limited to the above-mentioned example. For example, the feature amounts $C_{th}$ and $C_{ts}$ according to the first embodiment and this modification can be configured as explanatory variables of the multiple regression equations according to the second and third embodiments. In contrast, the feature amount according to the second and third embodiments can be configured as explanatory variables of the single regression equations according to the first embodiment, as long as a certain amount of correlation is confirmed. Also, for example, the following indices (1) to (8) can also be configured as feature amount for estimating the strike points $D_{th}$ and $D_{ts}$.

(1) First-order mode peak amplitude of the spectrum of $\omega_x$, i.e., angular velocity about the axis in the toe-heel direction (particularly suitable for estimating the strike point $D_{ts}$ in the up-down direction)

(2) First-order mode peak amplitude of the spectrum of $a_y$, i.e., acceleration in the target line direction (3) Second-order mode peak amplitude of the spectrum of $\omega_y$, i.e., angular velocity about the axis in the target line direction (particularly suitable for estimating the strike point $D_{ts}$ in the up-down direction)

(4) Angular velocity about the axis in the toe-heel direction immediately after impact, i.e., maximum value of $\omega_x$ immediately after impact (particularly suitable for estimating the strike point $D_{ts}$ in the up-down direction)

(5) Head speed $v_h$ at the impact time (6) At least one of peak amplitude and phase angle of a high-frequency mode (e.g., third-order or fourth-order mode) of the spectrum of $\omega_x$, i.e., angular velocity about the axis in the toe-heel direction (particularly suitable for estimating the strike point $D_{ts}$ in the up-down direction)

(7) At least one of peak amplitude and phase angle of high-frequency mode (e.g., third-order or fourth-order mode) of the spectrum of $a_y$, i.e., acceleration in the target line direction (particularly suitable for estimating the strike point $D_{ts}$ in the up-down direction)

(8) At least one of peak amplitude and phase angle of a high-frequency mode (e.g., third-order or fourth-order mode) of the spectrum of $\omega_z$, i.e., angular velocity about the shaft axis (particularly suitable for estimating the strike point $D_{th}$ in the left-right direction)

Note that the head speed $v_h$ of (5) can be calculated if data of the accelerations $a_x$, $a_y$ and $a_z$ and the angular velocities $\omega_x$, $\omega_y$, and $\omega_z$ exists, and various calculation methods are known. Any method may be used, although in the case where the acceleration sensor is shifted from the reference point on the shaft axis, it is preferable to adopt a method that removes the influence thereof. That is, after eliminating a tangential component $r\omega'$ and a centrifugal component $r\omega^2$ from the acceleration of the grip in a local coordinate system, the data is transformed into values in an XYZ global coordinate system with a method such as shown in section 1-2-3. Note that $\omega$ is the angular velocity of the grip in the local coordinate system, $\omega'$ is the differential of $\omega$, and $r$ is the distance from the center of gravity of the shaft to an acceleration sensor. Thereafter, the grip speed $v_g$ in the target line direction can be calculated by integrating the accelerations of the grip in the XYZ global coordinate system in the time interval from top to impact, while offsetting these acceleration so as to be zero at top time $t_t$. The head speed $v_h$ can be calculated by the following equation, for example. $R_1$ is the length of the golf club, and $R_2$ is the distance from the center of gravity of the head to the shaft axis.

$$v_h = v_g + R_1 \cdot \omega_x + R_2 \cdot \omega_z$$

4-2

The mishit determination of steps S2, S51 and S54 according to the above embodiments and step S12 that follows these steps can be omitted. In this case, in the first embodiment, for example, the coefficients shown in the examples of FIGS. 12, 13, 16 and 17 can be used as the coefficients $k_1$ and $k_2$. The coefficient data 28 in the case of the second embodiment can also be set as appropriate. The same also applies to the case of the third embodiment.

4-3

In the first embodiment, the branch according to the swing path of step S8 can be omitted when deriving the strike point $D_{ts}$ in the top-sole direction. In this case, the feature amount $C_{ts}$ calculated in the testing of FIG. 16 and the coefficients $k_3$ and $k_4$ can be used. Instead of or in addition to this, branching according to the swing path such as step S8 according to the above embodiment can be added when deriving the strike point $D_{th}$ in the toe-heel direction. On the other hand, branching according to the swing path of step S8 can be performed in the second and third embodiments.

4-4

Although, in the above embodiments, the sensor unit 1 having three sensors, namely, an acceleration sensor, an angular velocity sensor and a geomagnetic sensor, was used, the sensor unit 1 can also be configured differently. For example, the geomagnetic sensor can be omitted. In this case, it is possible to transform sensor data from the xyz local coordinate system into the XYZ global coordinate system by a statistical technique. Note that since such a technique is known technology (see JP 2013-56074A if necessary), detailed description thereof will be omitted here. Also, in the case of omitting the branching according to the swing path of step S8, the geomagnetic sensor is no longer particularly necessary and can be omitted. Also, the acceleration sensor can be omitted in the case of omitting the mishit determination of step S2, in addition to step S8.

Also, the attachment location of the sensor unit 1 is not limited to the grip 42, and may be attached to the shaft 40.

4-5

Although, in the above embodiments, linear regression equations were used as regression equations for deriving the strike point, nonlinear regression equations can be used. In evaluating the nonlinearity of the relationship between strike points and feature amounts, the following method can be used, for example.

(1) Provide an Nth-power variable as an explanatory variable of a single regression equation or a multiple regression equation (N≥2).

(2) Construct machine learning (neural network).

4-6

In the above embodiments, the local coordinate system of the sensor unit 1 is set as shown in FIG. 3, but can be freely set. Note that, in the case where the waveform of analytical data is not directly output from the sensor unit 1, the output values of the sensor unit 1 may be transformed by the data derivation unit 24C into values in a coordinate system including the axis of the analytical data.

4-7

Figure 42:
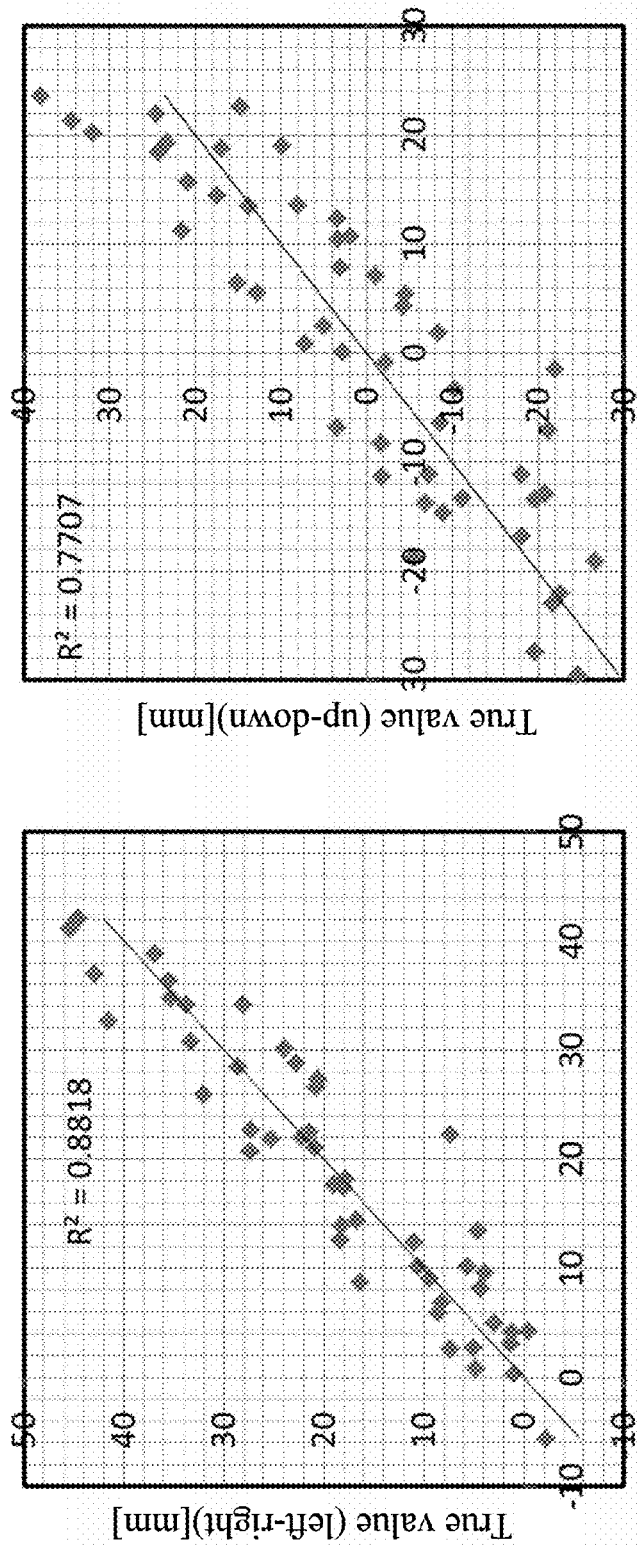
FIG. 42 is a graph showing verification results of the relationship between estimated values and true values of strike points according to the modification of FIG. 41 (in the case where the strike points are included in a region on the heel side).

In the second and third embodiments, at least one of steps S34 to S36 can be omitted. For example, step S34 and S35 can be omitted, and strike point estimation by a multiple regression equation can also be performed after having classified the strike points $D_{th}$ into two regions, namely, the region on the toe side and the region on the heel side. FIGS. 41 and 42 show the results of creating multiple regression equations after having classified the same measurement data as FIGS. 27 to 29 into these two regions, and specifying the relationship between the strike points $D_{th}$ and $D_{ts}$ (estimated values) that are based on the multiple regression equation, and the strike points $D_{th}$ and $D_{ts}$ (true values). Also, the graph of FIG. 41 is based on measurement data with respect to which the strike point $D_{th}$ was determined to be in the region on the toe side, and the graph of FIG. 42 is based on measurement data with respect to which the strike point $D_{th}$ was determined to be in the region on the heel side. Also, determination coefficients between the true values and the estimated values are shown in FIGS. 41 and 42. It is evident from FIGS. 41 and 42 that the true values and estimated values of the strike points $D_{th}$ and $D_{ts}$ roughly coincide. Accordingly, a high estimation accuracy of the strike points $D_{th}$ and $D_{ts}$ according to the present modification was confirmed.

Also, in the same measurement data as FIGS. 41 to 42, the percentage of cases where the true value and estimated value of the strike point fall within ±10 mm was 96% for the strike point $D_{th}$ and 81% for the strike point $D_{ts}$. This also confirmed the high estimation accuracy of the strike points $D_{th}$ and $D_{ts}$ according to the present embodiment.

Figure 43:
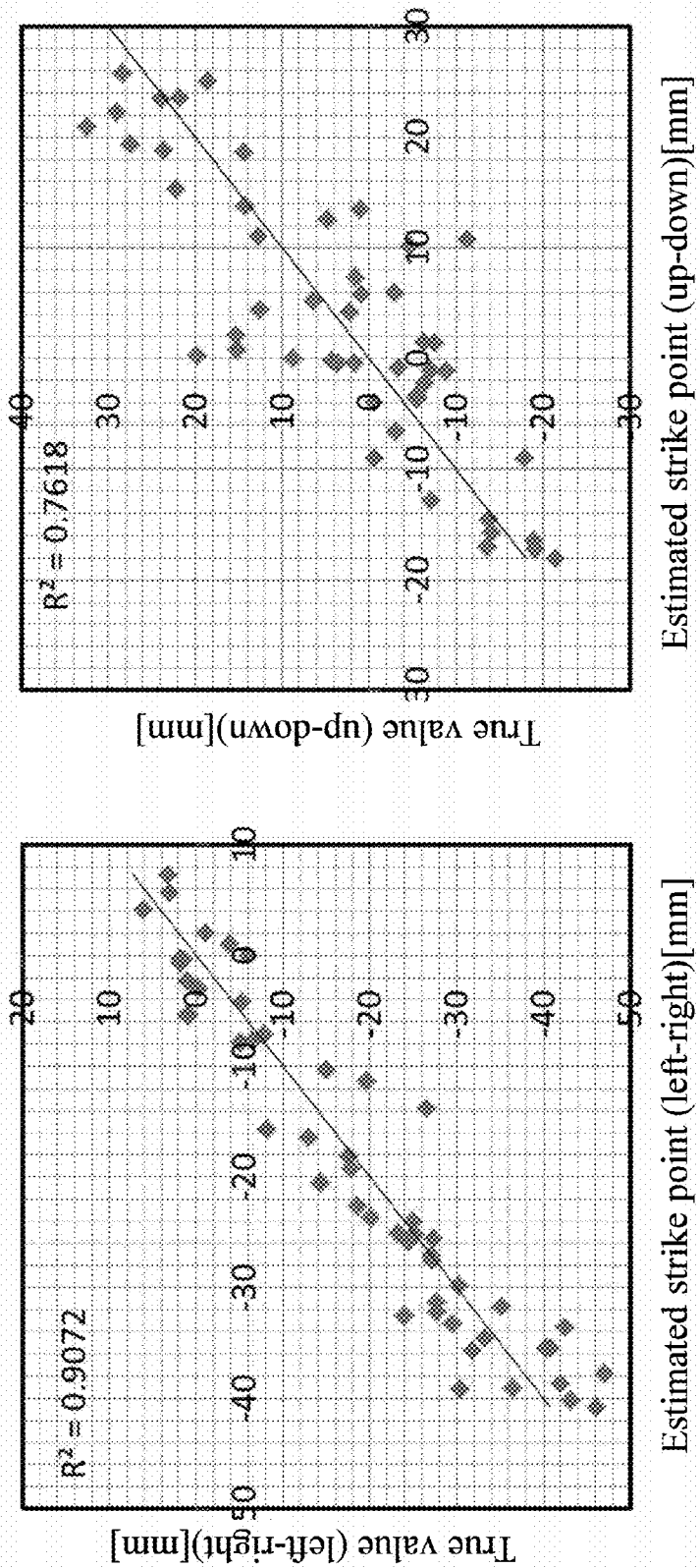
FIG. 43 is a graph showing verification results of the relationship between estimated values and true values of strike points according to another modification (in the case where the strike points are included in a region on the toe side).

Also, FIGS. 43 and 44 show another verification example in the case where steps S34 and S35 are omitted. In this example, a multiple regression equation was created with the head speed $v_h$ of the modification 3-1 being added as an explanatory variable, in addition to the seven feature amounts of the second embodiment. The graph of FIG. 43 is based on measurement data with respect to which the strike point $D_{th}$ was determined to be in the region on the toe side, and the graph of FIG. 44 is based on measurement data with respect to which the strike point $D_{th}$ was determined to be in the region on the heel side. Also, determination coefficients between the true values and the estimated values are shown in FIGS. 43 and 44. As is evident from FIGS. 43 and 44, the true values and estimated values of the strike points $D_{th}$ and $D_{ts}$ roughly coincide.

Also, in the same measurement data as FIGS. 43 and 44, the percentage of the cases where the true value and estimated value of the strike point fall within ±10 mm was 98% for the strike point $D_{th}$ and 86% for the strike point $D_{ts}$. This also confirmed the high estimation accuracy of the strike points $D_{th}$ and $D_{ts}$ according to the present modification, and the advantage of adding the head speed $v_h$ as an explanatory variable.

Also, at least one of steps S34 to S36 and S52 can be applied to the first embodiment.

The invention claimed is:

1. A golf swing analysis apparatus for analyzing a golf swing that uses a golf club having a grip, a shaft and a head, comprising:
   a derivation unit configured to derive analytical data including at least one of time-series angular velocity data and time-series acceleration data in an analysis time interval near impact, from sensor data output from at least one of an angular velocity sensor and an acceleration sensor attached to at least one of the grip and the shaft;
   a calculation unit configured to calculate a feature amount of a waveform of the analytical data; and
   an estimation unit configured to estimate an impact position of a ball on a face of the head, according to the feature amount.

2. The golf swing analysis apparatus according to claim 1, wherein the estimation unit is configured to estimate the impact position, based on a predetermined regression equation in which the feature amount is an explanatory variable and the impact position is an objective variable.

3. The golf swing analysis apparatus according to claim 1, wherein the analytical data includes the angular velocity data about a first axis that slopes relative to a first direction defined on the face,
   the calculation unit is configured to calculate a first feature amount which is the feature amount of a waveform of the angular velocity data about the first axis, and
   the estimation unit is configured to estimate the impact position in the first direction on the face, according to the first feature amount.

4. The golf swing analysis apparatus according to claim 3, wherein the first direction is a toe-heel direction, and the first axis is substantially parallel to a direction in which the shaft extends or a face-back direction.

5. The golf swing analysis apparatus according to claim 3, wherein the first direction is a top-sole direction, and the first axis is substantially parallel to a toe-heel direction or a face-back direction.

6. The golf swing analysis apparatus according to any of claim 3,
   wherein the analytical data includes the angular velocity data about a second axis that slopes relative to a second direction approximately orthogonal to the first direction defined on the face,
   the calculation unit is configured to calculate a second feature amount which is the feature amount of a waveform of the angular velocity data about the second axis, and
   the estimation unit is configured to estimate the impact position of the second direction on the face, according to the second feature amount.

7. The golf swing analysis apparatus according to claim 1, further comprising:
   a classification unit configured to classify a behavior of the head near impact into a plurality of patterns, based on the sensor data,
   wherein the estimation unit is configured to estimate the impact position, using an algorithm corresponding to a pattern classified by the classification unit.

8. The golf swing analysis apparatus according to claim 1, further comprising:
   a mishit determination unit configured to determine a mishit in which the ball impacts an edge portion of the face, based on at least the acceleration data after impact included in the sensor data,
   wherein the estimation unit is configured to estimate the impact position if it is not determined that the mishit occurred.

9. The golf swing analysis apparatus according to claim 1, wherein the feature amount is an amplitude of a waveform of the analytical data.

10. The golf swing analysis apparatus according to claim 1,
    wherein the feature amount is a length of time between feature times included in the analysis time interval, and each of the feature times is an impact time or a time at which an amplitude peak appears.

11. The golf swing analysis apparatus according to claim 1,
    wherein the calculation unit is configured to calculate a plurality of the feature amounts from the analytical data, and
    the estimation unit is configured to estimate the impact position, based on a predetermined multiple regression equation in which the plurality of the feature amounts are explanatory variables and the impact position is an objective variable.

12. The golf swing analysis apparatus according to claim 2, further comprising:
    a toe-heel classification unit configured to classify the impact position in a toe-heel direction on the face into a plurality of regions, according to at least one of a first-order mode peak frequency of an amplitude spectrum of an angular velocity about an axis in a direction in which the shaft extends and a phase angle corresponding to the peak frequency,
    wherein the estimation unit is configured to estimate the impact position, based on the regression equation or the multiple regression equation corresponding to a pattern classified by the toe-heel classification unit.

13. The analysis apparatus according to claim 12, wherein the toe-heel classification unit is configured to determine that the impact position is included near the center on the face, if the peak frequency is within a predetermined range.

14. The analysis apparatus according to claim 12, wherein the toe-heel classification unit is configured to determine that the impact position is included in a region on a toe side of the face in a case where the phase angle is greater than or equal to a predetermined value, and to determine that the impact position is included in a region on a heel side of the face in a case where the phase angle is smaller than the predetermined value.

15. The golf swing analysis apparatus according to claim 2, further comprising:
a top-sole classification unit configured to classify the impact position in a top-sole direction on the face into a plurality of regions, according to a phase angle corresponding to a predetermined frequency greater than or equal to 150 Hz of a phase spectrum of an acceleration in a face-back direction or a phase angle corresponding to a predetermined frequency greater than or equal to 150 Hz of a phase spectrum of an angular velocity about an axis in a toe-heel direction,
wherein the estimation unit is configured to estimate the impact position, based on the regression equation or the multiple regression equation corresponding to a pattern classified by the top-sole classification unit.

16. The analysis apparatus according to claim 15, wherein the top-sole classification unit is configured to determine that the impact position is included in a region on the top side of the face in a case where the phase angle is greater than or equal to a predetermined value, and to determine that the impact position is included in a region on the sole side of the face in a case where the phase angle is smaller than the predetermined value.

17. The golf swing analysis apparatus according to claim 1, wherein the calculation unit is configured to calculate a feature amount of a spectrum of the analytical data, as the feature amount of the waveform of the analytical data.

18. The golf swing analysis apparatus according to claim 17, wherein the calculation unit is configured to calculate a first-order or second-order mode peak amplitude of a spectrum of the angular velocity data, as the feature amount of the waveform of the analytical data.

19. The golf swing analysis apparatus according to claim 17, wherein the calculation unit is configured to calculate a first-order or second-order mode peak amplitude of a spectrum of the acceleration data, as the feature amount of the waveform of the analytical data.

20. The golf swing analysis apparatus according to claim 1, wherein the calculation unit is configured to calculate an amplitude of the angular velocity data, as the feature amount of the waveform of the analytical data.

21. The golf swing analysis apparatus according to claim 1 further comprising:
a mishit determination unit configured to determine a mishit in which the ball impacts an edge portion of the face, in a case where the feature amount is outside a predetermined range,
wherein the estimation unit is configured to estimate the impact position, if it is not determined that the mishit occurred.

22. A method for analyzing a golf swing that uses a golf club having a grip, a shaft and a head, comprising the steps of:
deriving analytical data including at least one of time-series angular velocity data and time-series acceleration data in an analysis time interval near impact, from sensor data output from at least one of an angular velocity sensor and an acceleration sensor attached to at least one of the grip and the shaft;
calculating a feature amount of a waveform of the analytical data; and
estimating an impact position of a ball on a face of the head, according to the feature amount.

23. A non-transitory computer readable medium storing program for analyzing a golf swing that uses a golf club having a grip, a shaft and a head, the program causing a computer to execute the steps of:
deriving analytical data including at least one of time-series angular velocity data and time-series acceleration data in an analysis time interval near impact, from sensor data output from at least one of an angular velocity sensor and an acceleration sensor attached to at least one of the grip and the shaft;
calculating a feature amount of a waveform of the analytical data; and
estimating an impact position of a ball on a face of the head, according to the feature amount.

* * * * *